United States Patent
Carlsson et al.

(10) Patent No.: US 12,039,525 B2
(45) Date of Patent: *Jul. 16, 2024

(54) VALIDATING ONLINE ACCESS TO SECURE DEVICE FUNCTIONALITY

(71) Applicant: Apple Inc., Cupertino, CA (US)

(72) Inventors: Karl Anders Carlsson, Campbell, CA (US); Anton K. Diederich, Mountain View, CA (US); Christopher Sharp, Morgan Hill, CA (US); Gianpaolo Fasoli, Redwood City, CA (US); Maciej Stachowiak, San Francisco, CA (US); Matthew C. Byington, Sunnyvale, CA (US); Nicholas J. Shearer, San Francisco, CA (US); Samuel M. Weinig, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/443,419

(22) Filed: Jul. 26, 2021

(65) Prior Publication Data

US 2022/0005028 A1    Jan. 6, 2022

Related U.S. Application Data

(63) Continuation of application No. 15/275,122, filed on Sep. 23, 2016, now Pat. No. 11,107,071.
(Continued)

(51) Int. Cl.
*G06Q 20/38* (2012.01)
*G06Q 20/12* (2012.01)
(Continued)

(52) U.S. Cl.
CPC ........ *G06Q 20/3821* (2013.01); *G06Q 20/12* (2013.01); *G06Q 20/3227* (2013.01);
(Continued)

(58) Field of Classification Search
CPC ............ G06Q 20/326; G06Q 20/3829; G06Q 20/382; G06Q 20/4016; G06F 21/36
See application file for complete search history.

(56) References Cited

U.S. PATENT DOCUMENTS 9,098,714 B2    8/2015    Sharp et al.
9,619,799 B2    4/2017    Haggerty et al.
(Continued)

FOREIGN PATENT DOCUMENTS

CN    1476575 A    2/2004
CN    101601222 A    12/2009
(Continued)

OTHER PUBLICATIONS

Anonymous: "Tokenization (data security)—Wikipedia", 8 pages, Jan. 15, 2016, retrieved on Feb. 6, 2020, https://en.wikipedia.org/w/index.php?title=Tokenization_(data_security)&oldid=699919409.
(Continued)

*Primary Examiner* — Saba Dagnew
(74) *Attorney, Agent, or Firm* — DICKINSON WRIGHT RLLP

(57) ABSTRACT

Systems, methods, and computer-readable media for validating online access to secure device functionality are provided that may use shared secrets between different subsystems and limited use validation data.

20 Claims, 12 Drawing Sheets

Related U.S. Application Data

(60) Provisional application No. 62/348,979, filed on Jun. 12, 2016, provisional application No. 62/348,960, filed on Jun. 12, 2016, provisional application No. 62/297,923, filed on Feb. 21, 2016, provisional application No. 62/289,656, filed on Feb. 1, 2016.

(51) Int. Cl.
*G06Q 20/32* (2012.01)
*G06Q 20/40* (2012.01)
*H04L 9/40* (2022.01)

(52) U.S. Cl.
CPC ......... *G06Q 20/3278* (2013.01); *G06Q 20/40* (2013.01); *H04L 63/10* (2013.01); *G06Q 2220/00* (2013.01)

(56) References Cited

U.S. PATENT DOCUMENTS

| | | | |
|---|---|---|---|
| 10,554,487 | B2 | 2/2020 | Li et al. |
| 2005/0119978 | A1 | 6/2005 | Ates |
| 2006/0235795 | A1* | 10/2006 | Johnson .................. G06Q 20/02 705/26.1 |
| 2007/0011066 | A1 | 1/2007 | Steeves |
| 2007/0067833 | A1 | 3/2007 | Colnot |
| 2009/0260064 | A1 | 10/2009 | McDowell et al. |
| 2009/0307133 | A1 | 12/2009 | Holloway et al. |
| 2011/0247063 | A1 | 10/2011 | Aabye et al. |
| 2012/0079562 | A1* | 3/2012 | Anttila .................... G06F 21/51 726/3 |
| 2012/0323735 | A1 | 12/2012 | Montero et al. |
| 2013/0103590 | A1 | 4/2013 | Johansson et al. |
| 2014/0244511 | A1* | 8/2014 | Weller ............... G06Q 20/4016 705/44 |
| 2014/0289061 | A1 | 9/2014 | Zenou |
| 2014/0289116 | A1 | 9/2014 | Polivanyi |
| 2014/0289833 | A1 | 9/2014 | Briceno et al. |
| 2015/0019443 | A1 | 1/2015 | Sheets et al. |
| 2015/0052064 | A1* | 2/2015 | Karpenko .......... G06Q 20/3227 705/71 |
| 2015/0052595 | A1 | 2/2015 | Murphy |
| 2015/0088756 | A1* | 3/2015 | Makhotin ............ G06Q 20/401 705/71 |
| 2015/0095219 | A1 | 4/2015 | Hurley |
| 2015/0095238 | A1* | 4/2015 | Khan .................... G06Q 20/382 705/71 |
| 2015/0161375 | A1* | 6/2015 | Ghosh .................... G06F 21/36 726/7 |
| 2015/0242844 | A1 | 8/2015 | Yisraelian et al. |
| 2015/0302398 | A1 | 10/2015 | Desai et al. |
| 2015/0350106 | A1 | 12/2015 | Whalley et al. |
| 2015/0371226 | A1 | 12/2015 | Hurley et al. |

FOREIGN PATENT DOCUMENTS

| | | |
|---|---|---|
| CN | 102804682 A | 11/2012 |
| CN | 103035081 A | 4/2013 |
| CN | 103745353 A | 4/2014 |
| CN | 104680371 A | 6/2015 |
| CN | 104838398 A | 8/2015 |
| CN | 204650596 U | 9/2015 |
| CN | 105139204 A | 12/2015 |
| CN | 108604338 A | 9/2018 |
| EP | 2916252 A1 | 9/2015 |
| JP | 2003016041 A | 1/2003 |
| JP | 2013539567 A | 10/2013 |
| JP | 2016502373 A | 1/2016 |

OTHER PUBLICATIONS

Chinese Patent Application No. 201780008311.4—First Office Action dated Mar. 12, 2021.
Australian Application No. 2022204472—First Office Action dated Sep. 2, 2023.
Australian Application No. 2022204472—Second Office Action dated Dec. 22, 2023.
Shi, et al., "Security management system for distributed remote access service based on CLIENT/SERVER", Journal of Chinese Computer Systems, vol. 19 No. 6, Jun. 8, 1998, 7 pages.
Deng et al., "Password-based client/server authentication protocol", Computer Engineering and Application, No. 20, Dec. 31, 2015, 6 pages.
Shi, et al., "Security management system for distributed remote access service based on client/server", Data Communications, No. 3, Sep. 30, 1997, 6 pages.
Gao et al., "Security of grid marketing", Value Engineering, vol. 33, No. 27, Sep. 28, 2014, 2 pages.
Nie et al., "A secure NFC authentication method based on ECC", Information Security and Communication Secrecy, No. 7, Jul. 10, 2013, 3 pages.
Hsu et al., "Password-Based Authenticated Key Exchange Protocol Without Trusted Third Party for Multi-Server Environments ", International Journal of Innovative Computing Information and Control, vol. 8, No. 3A, Mar. 31, 2012, 1 page.
Chinese Patent Application No. 202111358851.X—First Office Action dated Apr. 30, 2024.

* cited by examiner

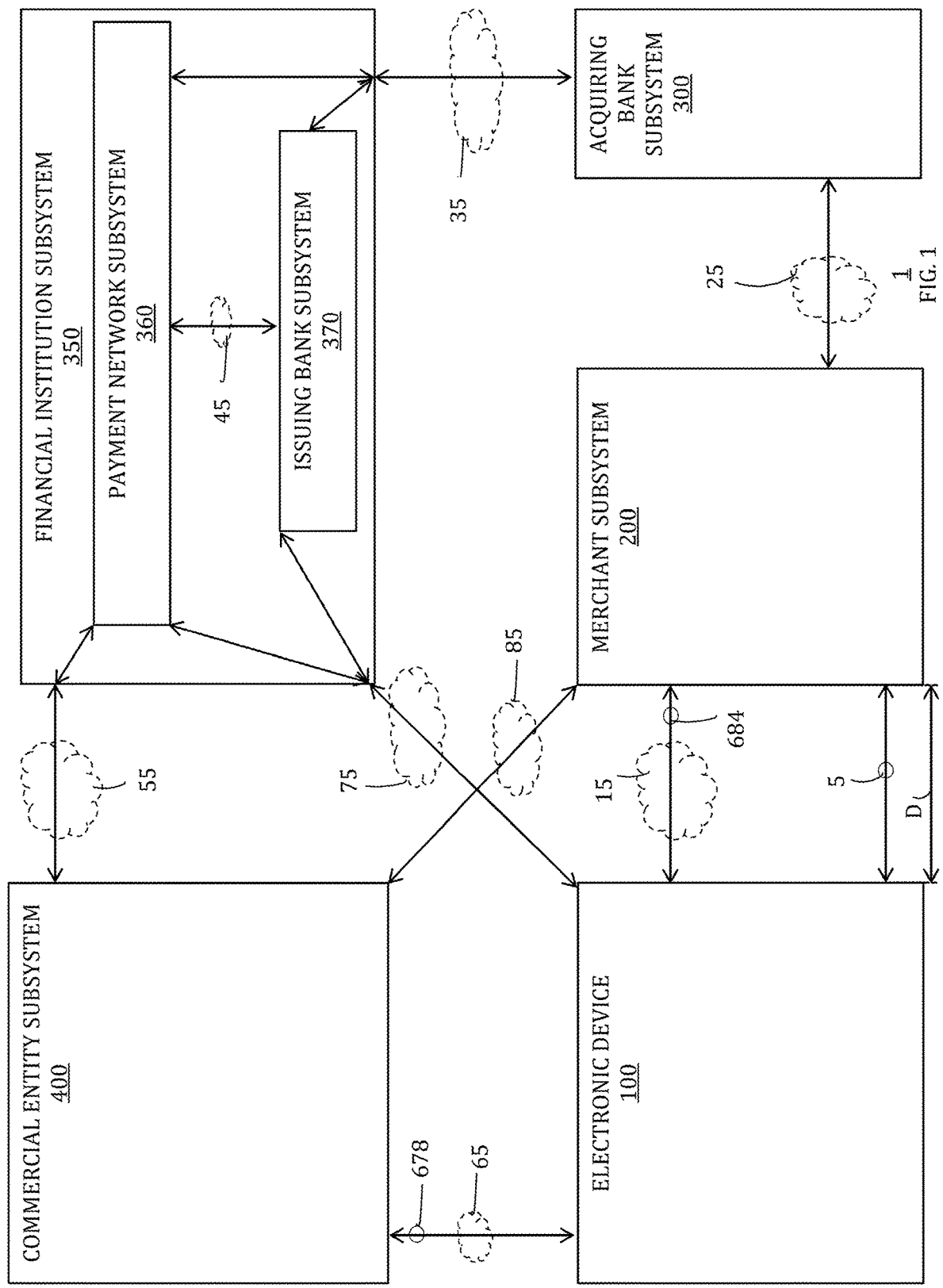

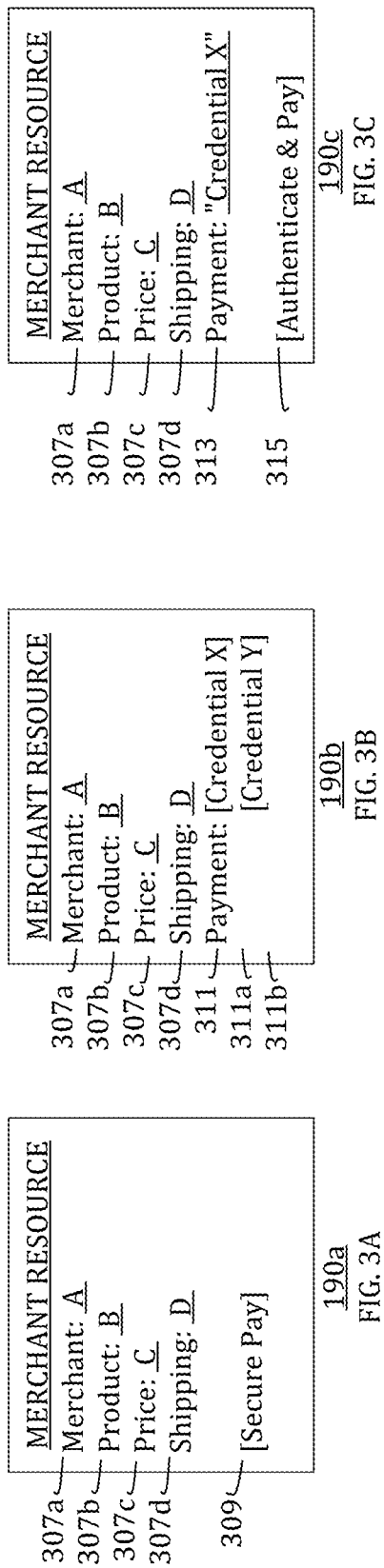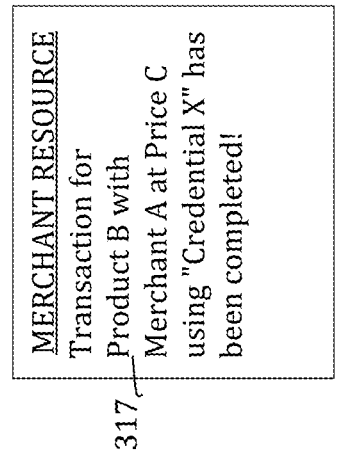

VALIDATING ONLINE ACCESS TO SECURE DEVICE FUNCTIONALITY

CROSS-REFERENCE TO RELATED APPLICATIONS

The present application is a continuation of U.S. application Ser. No. 15/275,122, filed Sep. 23, 2016, entitled "VALIDATING ONLINE ACCESS TO SECURE DEVICE FUNCTIONALITY," issued Aug. 3, 2017 as U.S. Pat. No. 11,107,071, which claims the benefit of U.S. Provisional Application No. 62/289,656 filed Feb. 1, 2016, entitled "VALIDATING ONLINE ACCESS TO SECURE DEVICE FUNCTIONALITY," U.S. Provisional Application No. 62/297,923 filed Feb. 21, 2016, entitled "VALIDATING ONLINE ACCESS TO SECURE DEVICE FUNCTIONALITY," U.S. Provisional Application No. 62/348,960 filed Jun. 12, 2016, and entitled "VALIDATING ONLINE ACCESS TO SECURE DEVICE FUNCTIONALITY," U.S. Provisional Application No. 62/348,979, filed Jun. 12, 2016, entitled "VALIDATING ONLINE ACCESS TO SECURE DEVICE FUNCTIONALITY," the contents of all of which are incorporated by reference herein in their entirety for all purposes.

FIELD

This disclosure relates to validating online access to secure device functionality and, more particularly, to validating a third party subsystem for enabling online access to secure functionality of an electronic device by the third party subsystem.

BACKGROUND

Portable electronic devices (e.g., cellular telephones) may be provided with near field communication ("NFC") components for enabling contactless proximity based communications of sensitive data with another entity (e.g., a merchant), such as data transactions that require the electronic device to generate, access, and/or share a native payment credential, such as a credit card credential, with the other entity. However, secure use of such a native payment credential by the electronic device in other types of communications (e.g., online transactions) has often been inefficient.

SUMMARY

This document describes systems, methods, and computer readable media for validating online access to secure device functionality.

As an example, a method may be provided for using a commercial entity subsystem to conduct a secure transaction between a merchant subsystem and an electronic device communicatively coupled to the merchant subsystem via a merchant online resource. The method may include, at the commercial entity subsystem, receiving, from the merchant subsystem, a validation request for the merchant online resource, validating the merchant online resource using the validation request and registration data initially made available to the commercial entity subsystem prior to the receiving, after the validating, generating validation data in association with at least a portion of the validation request, communicating, to the electronic device, the validation data, receiving, from the electronic device, device transaction data, determining that the device transaction data comprises the validation data, and, after the determining, generating secure transaction data based on the device transaction data for use by the merchant subsystem.

As another example, a method may be provided for using an administration entity subsystem to conduct a secure transaction between a processing subsystem and an electronic device communicatively coupled to the processing subsystem via an online resource run on the electronic device. The method may include, at the administration entity subsystem, receiving a validation request for the online resource, wherein the validation request includes validation request data, validating the online resource using the validation request data and registration data, wherein the registration data was initially made available to the administration entity subsystem prior to receiving the validation request, associating validation response data with at least a portion of the validation request data, after the online resource has been validated, communicating the validation response data to the electronic device, after communicating the validation response data to the electronic device, receiving device transaction data from the electronic device, validating the device transaction data using the validation response data, and, after the device transaction data has been validated, generating secure transaction data based on the device transaction data for use by the processing subsystem.

As yet another example, a method may be provided for using an administration entity subsystem to enable a secure transaction between a processing subsystem and an electronic device communicatively coupled to the processing subsystem via an online resource run on the electronic device. The method may include, at the administration entity subsystem, registering the online resource, wherein the registering includes establishing a processing shared secret between the administration entity subsystem and the processing subsystem, receiving a validation request for the online resource, wherein the validation request includes a processing identifier indicative of the online resource, and wherein the validation request further includes a validation session identifier that is unique to a potential transaction between the electronic device and the processing subsystem via the online resource, and validating the online resource indicated by the processing identifier using the validation session identifier and the processing shared secret.

As yet another example, a method may be provided for using an administration entity subsystem to conduct a secure transaction between a processing subsystem and an electronic device communicatively coupled to the processing subsystem via an online resource run on the electronic device. The method may include, at the administration entity subsystem, receiving a validation request for the online resource, wherein the validation request includes validation request data, and wherein the validation request data includes potential transaction identification information indicative of a potential transaction between the electronic device and the processing subsystem via the online resource, validating the online resource using at least a portion of the validation request data, associating validation response data with at least the potential transaction identification information, after the online resource has been validated, communicating the validation response data to the electronic device, after communicating the validation response data to the electronic device, receiving device transaction data from the electronic device, validating the device transaction data using the validation response data and the potential transaction identification information, and, after the device transaction data has been validated, generating secure transaction data based on the device transaction data for use by the processing subsystem.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIG. 1 is a schematic view of an illustrative system for validating online access to secure device functionality;

FIGS. 3A-3D are front views of screens of a graphical user interface of the example electronic device of one or more of FIGS. 1 3 illustrating processes for validating online access to secure device functionality;

DETAILED DESCRIPTION

A processing (or merchant) subsystem, with or without a partner payment service provider ("PSP") may be validated by a trusted administration (or commercial) entity subsystem prior to an online resource (e.g., a native application or website) of the processing subsystem, with or without PSP embedded payment forms, being used for securely receiving sensitive data from a user electronic device (e.g., secure element payment credential data). Moreover, in addition to validation of the online resource before the online resource may be operative to present the user device with an option to share sensitive data in a transaction with the processing subsystem, an additional session validation process may be carried out in response to selection of such an option in order to re-authorize the online resource for use in enabling the particular transaction.

Figure 1A:
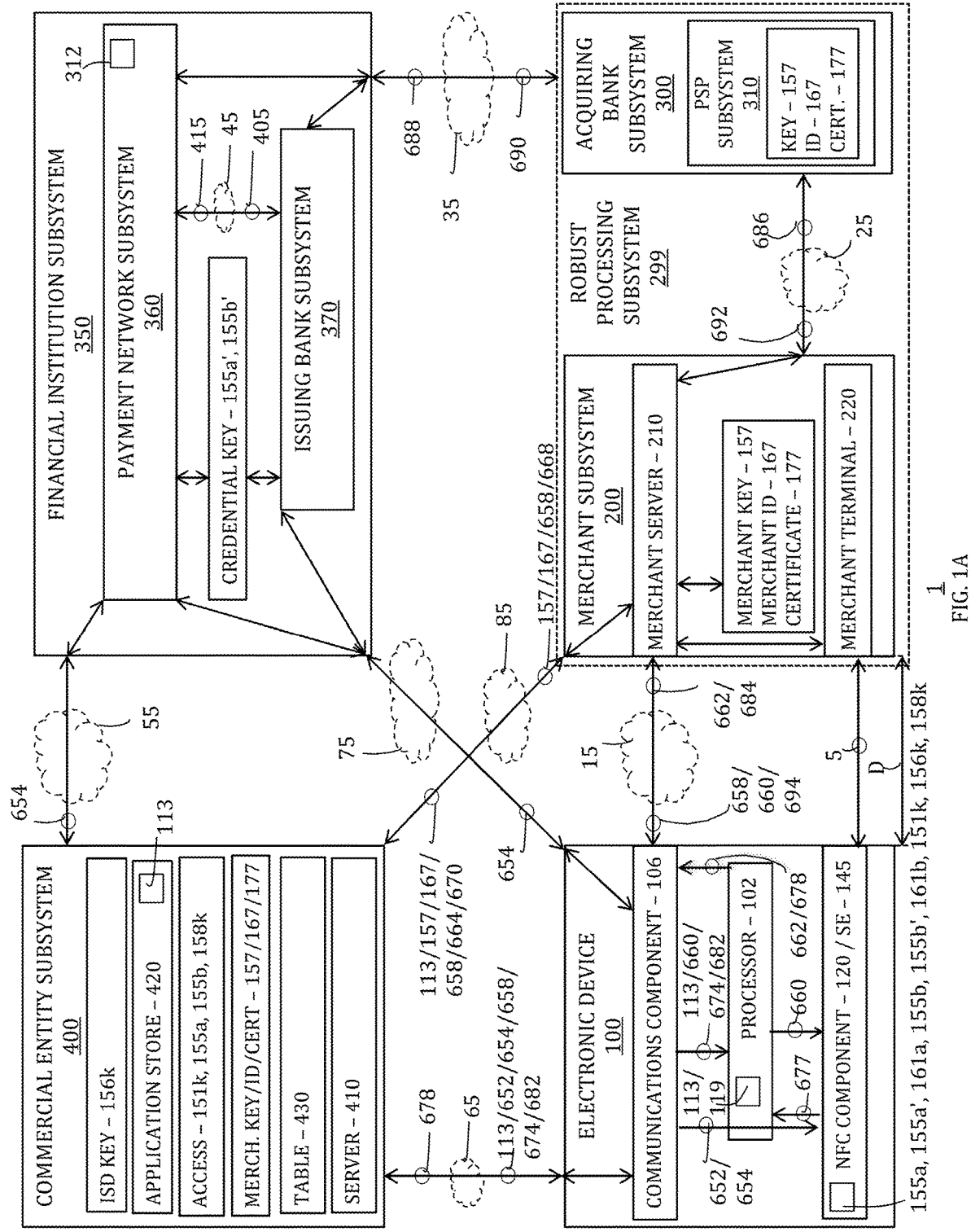
FIG. 1A is another more detailed schematic view of the system of FIG. 1.
Figure 2:
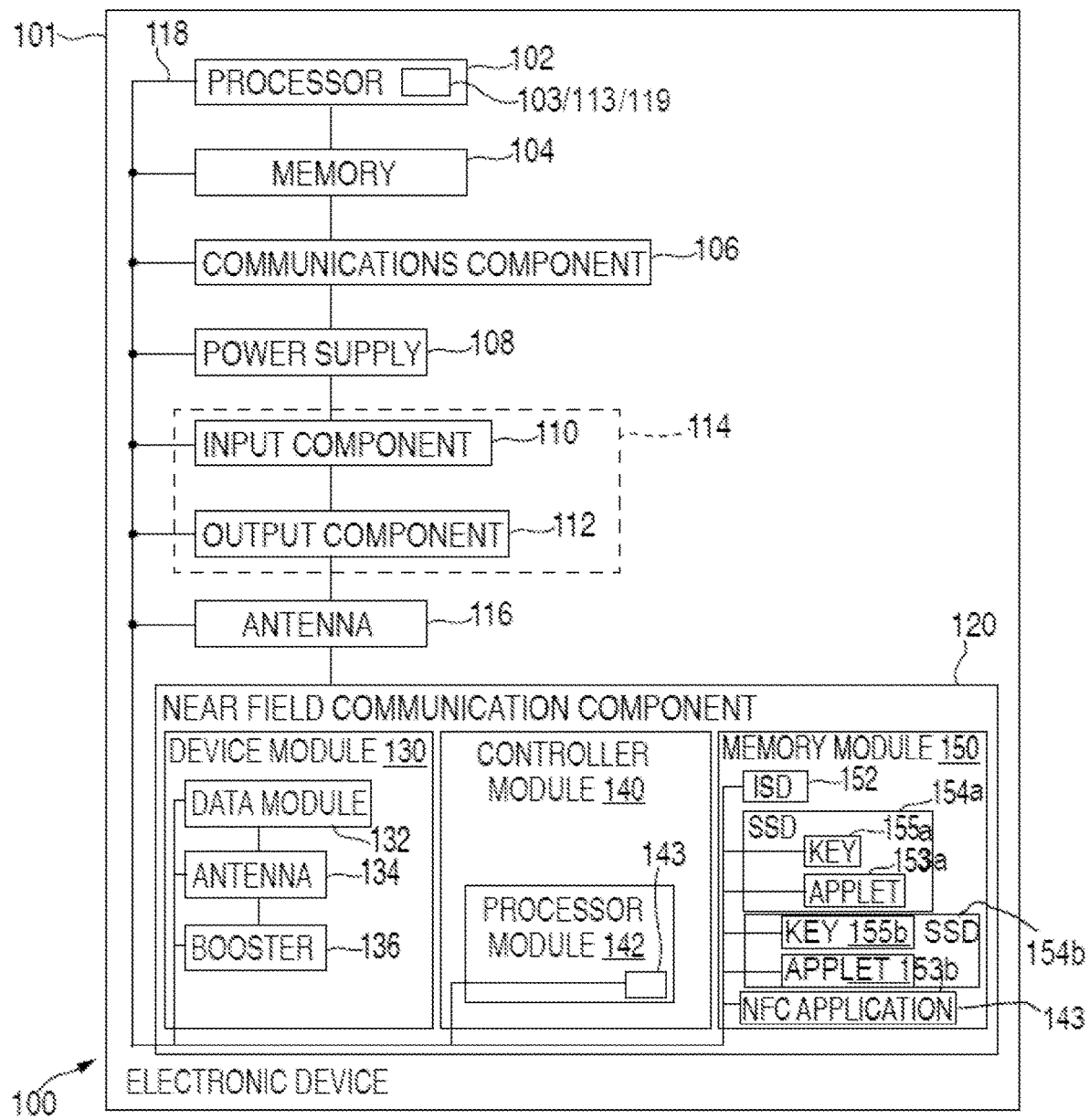
FIG. 2 is a more detailed schematic view of the example electronic device of the system of FIGS. 1 and 1A.
Figure 3:
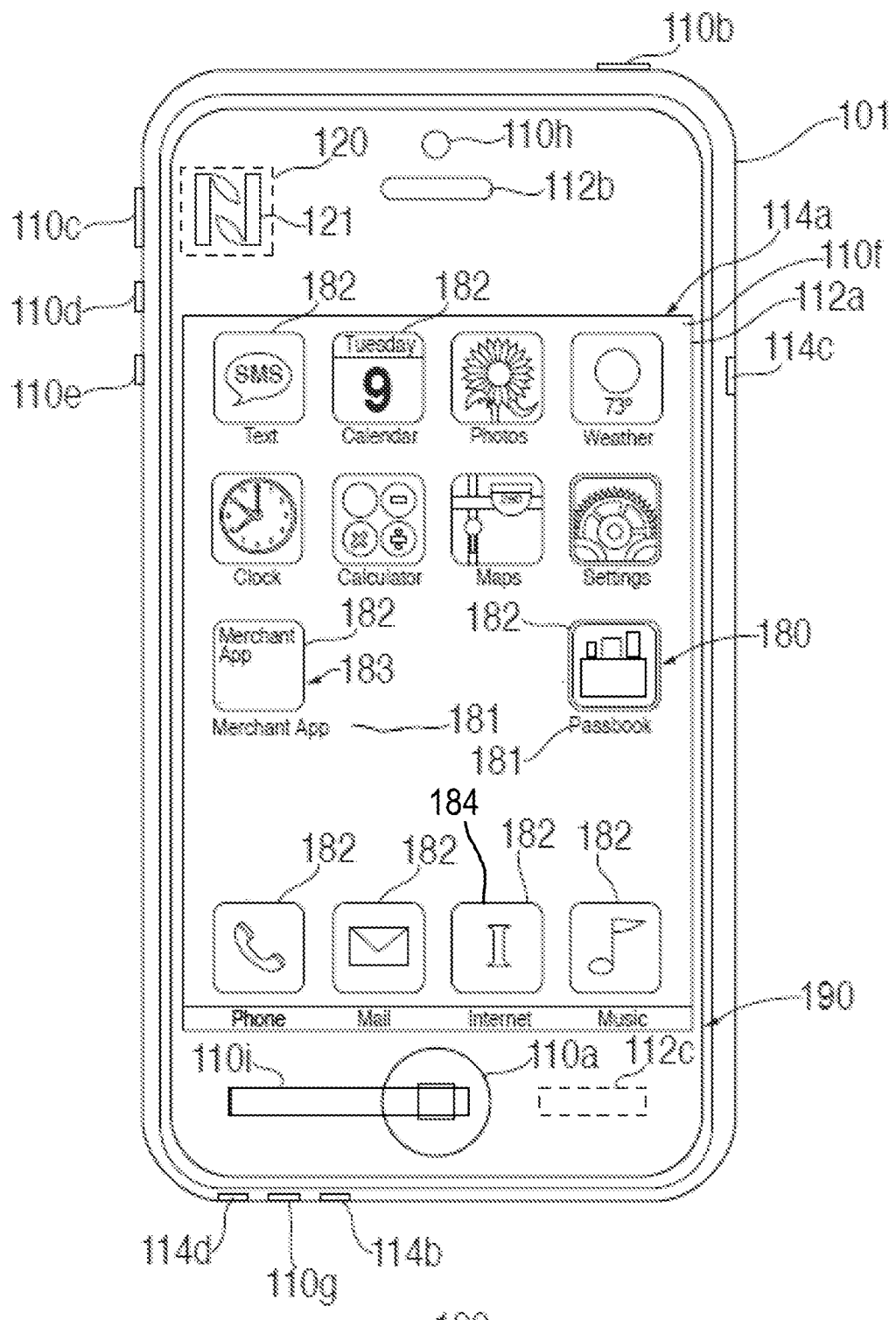
FIG. 3 is a front view of the example electronic device of FIGS. 1-2A.
Figure 4:
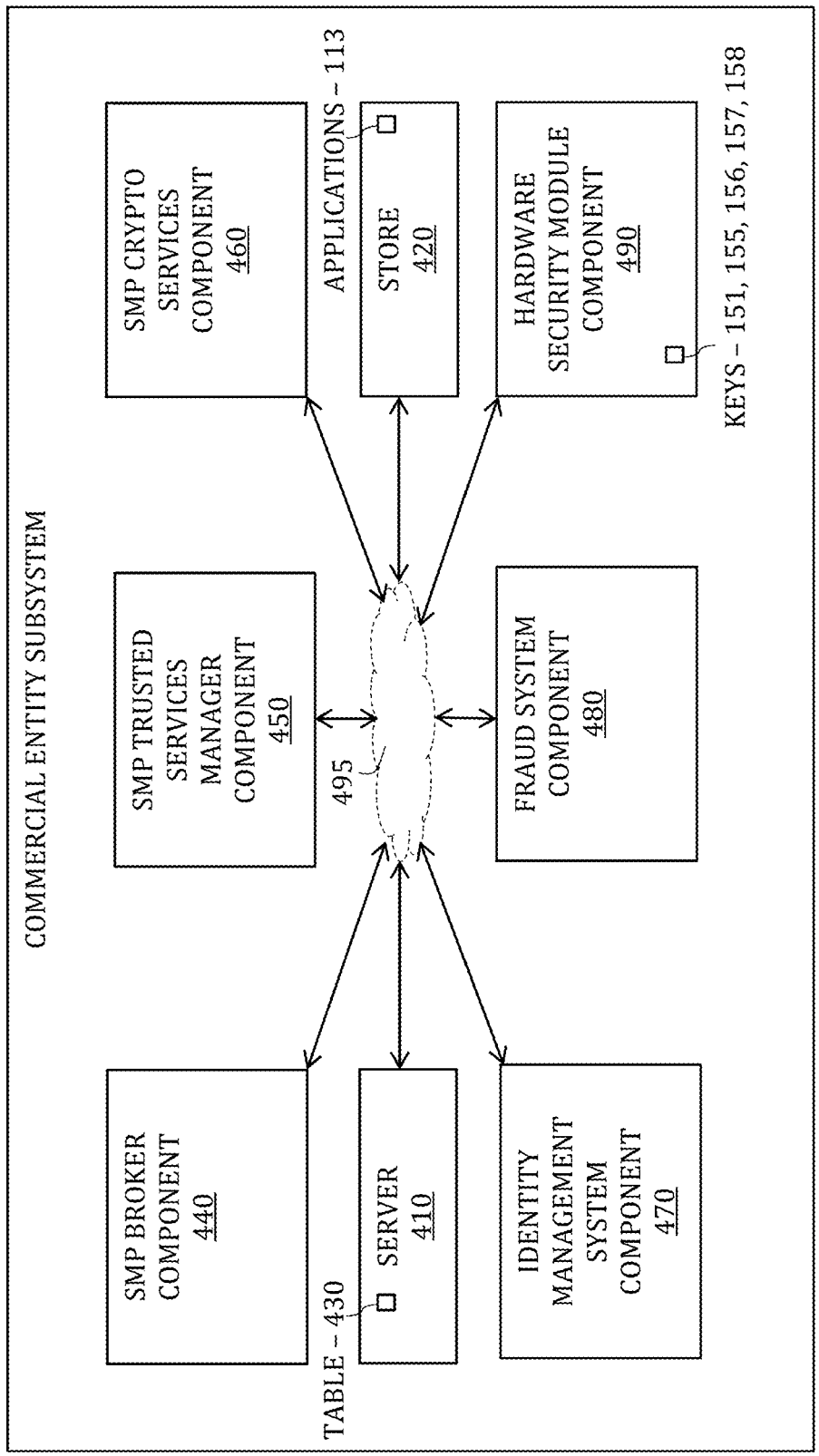
FIG. 4 is a more detailed schematic view of the example commercial entity subsystem of the system of FIGS. 1 and 1A.

FIGS. 1 and 1A show a system 1 in which one or more credentials may be provisioned onto an electronic device 100 from a financial institution (or transaction or issuer) subsystem 350 in conjunction with a commercial (or administration) entity subsystem 400, and in which such credentials may be used by electronic device 100 for conducting a transaction (e.g., a financial transaction or any other suitable secure data transaction) with a merchant (or processing) subsystem 200 and an associated acquiring bank (or acquirer) subsystem 300 (e.g., a secure device functionality of electronic device 100), while FIGS. 2-3 show further details with respect to particular embodiments of electronic device 100 of system 1, FIGS. 3A-3D show example screens 190a-190d that may be representative of graphical user interfaces of electronic device 100 of system 1 during such a transaction, FIG. 4 shows further details with respect to particular embodiments of commercial entity subsystem 400 of system 1, and FIGS. 5-9 are flowcharts of illustrative processes for validating online access to secure device functionality (e.g., conducting such a financial transaction).

Description of FIG. 1

FIG. 1 is a schematic view of an illustrative system 1 that may allow for the validation of a third party subsystem for enabling online access to secure functionality of an electronic device by the third party subsystem, such as the validation of a merchant (or processing) subsystem for enabling the secure use of a credential on an electronic device in a transaction (e.g., an online payment or a contactless proximity-based payment) with the merchant subsystem. For example, as shown in FIG. 1, system 1 may include an electronic device 100 as well as a commercial (or administration) entity subsystem 400 and a financial institution (or transaction or issuer) subsystem 350 for securely provisioning one or more credentials on electronic device 100. Moreover, as shown in FIG. 1, system 1 may also include a merchant (or processing) subsystem 200, whereby such a provisioned credential may be used by electronic device 100 for conducting a transaction (e.g., a financial transaction or any other suitable secure data transaction) with merchant subsystem 200. For example, in response to receiving potential transaction data from merchant subsystem 200, electronic device 100 may share secure device data of the provisioned credential with merchant subsystem 200 as a contactless proximity-based communication 5 (e.g., a near field communication or a BlueTooth™ communication) and/or as an online-based communication 684 (e.g., a network telecommunication or otherwise) for funding the particular financial transaction with merchant subsystem 200. System 1 may also include an acquiring bank (or acquirer) subsystem 300 that may utilize such contactless proximity-based communication 5 and/or such online-based communication 684 for completing the transaction with financial institution subsystem 350.

System 1 may include a communications path 15 for enabling communication between electronic device 100 and merchant subsystem 200, a communications path 25 for enabling communication between merchant subsystem 200 and acquiring bank subsystem 300, a communications path 35 for enabling communication between acquiring bank subsystem 300 and financial institution subsystem 350, a communications path 45 for enabling communication between a payment network subsystem 360 of financial institution subsystem 350 and an issuing bank subsystem 370 of financial institution subsystem 350, a communications path 55 for enabling communication between financial institution subsystem 350 and commercial entity subsystem 400, a communications path 65 for enabling communication between commercial entity subsystem 400 and electronic device 100, a communications path 75 for enabling communication between financial institution subsystem 350 and electronic device 100, and a communications path 85 for enabling communication between commercial entity subsystem 400 and merchant subsystem 200. One or more of paths 15, 25, 35, 45, 55, 65, 75, and 85 may be at least partially managed by one or more trusted service managers ("TSMs"). Any suitable circuitry, device, system, or combination of these (e.g., a wired and/or wireless communications infrastructure that may include one or more communications towers, telecommunications servers, or the like) that may be operative to create a communications network may be used to provide one or more of paths 15, 25, 35, 45, 55, 65, 75, and 85, which may be capable of providing communications using any suitable wired or wireless communications protocol. For example, one or more of paths 15, 25, 35, 45, 55, 65, 75, and 85 may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof.

Description of FIG. 1A

Referring now to FIG. 1A, FIG. 1A shows a more detailed view of the system 1 described above with respect to FIG. 1. As shown in FIG. 1A, for example, electronic device 100 may include a processor 102, a communications component 106, and/or a near field communication ("NFC") component 120. NFC component 120 may include or otherwise provide a secure element 145 that may be configured to provide a tamper-resistant platform (e.g., as a single-chip or multiple-chip secure microcontroller) that may be capable of securely hosting applications and their confidential and cryptographic data (e.g., credential applets and associated credential keys, such as a credential key 155a', and an access key 155a, and/or an issuer security domain ("ISD") key 156k, as shown in FIG. 1A) in accordance with rules and security requirements that may be set forth by a set of well-identified trusted authorities (e.g., an authority of a financial institution subsystem and/or an industry standard, such as GlobalPlatform). As described below in more detail, a credential applet or a payment application on secure element 145 (e.g., of NFC component 120) of device 100 may be configured to provide payment credential data as transaction data with sufficient detail for identifying a funding account or other financial instrument or credit source (e.g., at financial institution subsystem 350), where such payment credential data may be used by device 100 in one or more communications with merchant subsystem 200 and/or commercial entity subsystem 400 for facilitating a financial transaction. NFC component 120 may be configured to communicate such host payment credential data as a contactless proximity-based communication 5 (e.g., near field communication) with merchant subsystem 200 (e.g., with a merchant terminal 220 of merchant subsystem 200, which may be located at a brick and mortar store or any physical location at which a user of device 100 may use a credential stored on device 100 to conduct a financial transaction with a proximately located merchant terminal 220 via a contactless proximity-based communication). Alternatively or additionally, communications component 106 may be provided to allow device 100 to communicate any suitable payment credential data (e.g., as an online-based communication 684) with one or more other electronic devices or servers or subsystems (e.g., one or more subsystems or other components of system 1, such as with merchant server 210 of merchant subsystem 200 via any suitable online communication) using any suitable wired or wireless protocol (e.g., via one or more of communications paths 15, 65, and/or 75). Processor 102 of device 100 may include any processing circuitry that may be operative to control the operations and performance of one or more components of device 100. For example, processor 102 may be configured to run one or more applications on device 100 (e.g., an application 103 and/or an online resource or merchant application 113) that may at least partially dictate the way in which data (e.g., payment credential data of transaction data) may be communicated by device 100 for funding a financial transaction with merchant subsystem 200. Moreover, as shown in FIG. 1A, device 100 may include any suitable device identification information or device identifier 119, which may be accessible to processor 102 or any other suitable portion of device 100. Device identification information 119 may be utilized by commercial entity subsystem 400 and/or merchant subsystem 200 and/or financial institution subsystem 350 for uniquely identifying device 100 to facilitate a transaction with merchant subsystem 200 and/or to enable any suitable secure communication with device 100. As just one example, device identification information 119 may be a telephone number or e-mail address or any unique identifier that may be associated with device 100.

Merchant subsystem 200 may include any suitable merchant server 210, as shown in FIG. 1A, which may include any suitable component or subsystem that may be configured to communicate any suitable data via any suitable communications protocol (e.g., Wi-Fi, Bluetooth™, cellular, wired network protocols, etc.) with a communications component of commercial entity subsystem 400 (e.g., via communications path 85) and/or with a communications component of acquiring bank 300 (e.g., via communications path 25) and/or with a communications component of device 100 (e.g., via communications path 15). For example, merchant server 210 may be operative to communicate potential transaction data 660 with communications component 106 of device 100 within any suitable online-context, such as when a user of device 100 is communicating with merchant server 210 to conduct a transaction via any suitable merchant online resource 113 that may be running on device 100, such as a third party merchant application 113 running on device 100 that may be managed by merchant server 210 (e.g., a native application) or an internet application 113 (e.g., Safari™ by Apple Inc.) running on device 100 that may be pointed to a uniform resource locator ("URL") whose target or web resource may be managed by merchant server 210 (e.g., a merchant website, a merchant application using a webview directed to a merchant website (e.g., an internet browser bundled inside a merchant application, thereby producing what may be referred to as a hybrid app, which may enable such an app to be built using web technologies (e.g., HTML, JavaScript, CSS, etc.) but still may enable such an app to be packaged as a native app), and/or a non-merchant application using a webview directed to a merchant website). Accordingly, it is noted that communications between merchant server 210 and device 100 may occur wirelessly and/or via wired paths (e.g., over the internet). Merchant server 210 may be provided by a merchant of merchant subsystem 200 (e.g., as a webserver to host website data and/or manage third party application data). Additionally or alternatively, as shown in FIG. 1A, merchant subsystem 200 may include any suitable merchant terminal 220 (e.g., a merchant payment terminal), which may include any suitable component or subsystem that may be configured to communicate any suitable data with a contactless proximity-based communication component of device 100 (e.g., a contactless proximity-based communication 5 with NFC component 120 of device 100). Moreover, as shown in FIG. 1A, merchant subsystem 200 may include a merchant key 157 and/or a merchant identifier ("ID") 167. Although not shown, merchant subsystem 200 may also include a merchant processor component that may be the same as or similar to a processor component 102 of electronic device 100 of FIGS. 1A and 2, a merchant communications component that may be the same as or similar to a communications component 106 of electronic device 100 of FIGS. 1A and 2 (e.g., as a portion of server 210), a merchant I/O interface that may be the same as or similar to an I/O interface 114 of electronic device 100 of FIG. 2, a merchant bus that may be the same as or similar to a bus 118 of electronic device 100 of FIG. 2, a merchant memory component that may be the same as or similar to a memory component 104 of electronic device 100 of FIG. 2, and/or a merchant power supply component that may be the same as or similar to a power supply component 108 of electronic device 100 of FIG. 2.

Financial institution subsystem 350 may include a payment network subsystem 360 (e.g., a payment card association or a credit card association) and/or an issuing bank subsystem 370. For example, issuing bank subsystem 370 may be a financial institution that may assume primary liability for a consumer's capacity to pay off debts they may incur with a specific credential. Each specific credential applet of NFC component 120 of device 100 may be associated with a specific payment card that may be electronically linked to an account or accounts of a particular user. Various types of payment cards may be suitable, including credit cards, debit cards, charge cards, stored-value cards, fleet cards, gift cards, and the like. The commerce credential of a specific payment card may be provisioned on device 100 (e.g., as a credential of a credential supplemental security domain of NFC component 120, as described below) by issuing bank subsystem 370 for use in a commerce credential data communication (e.g., a contactless proximity-based communication and/or an online-based communication) with merchant subsystem 200 (e.g., directly or via commercial entity subsystem 400). Each credential may be a specific brand of payment card that may be branded by a payment network subsystem 360. Payment network subsystem 360 may be a network of various issuing banks 370 and/or various acquiring banks 300 that may process the use of payment cards (e.g., commerce credentials) of a specific brand.

In order for a financial transaction to occur within system 1, at least one commerce credential must be securely provisioned on a secure element of electronic device 100. For example, such a commerce credential may be at least partially provisioned on secure element 145 of device 100 directly from financial institution subsystem 350 (e.g., as credential data 654 via communications path 75 between financial institution subsystem 350 and device 100, which may be passed to secure element 145 via communications component 106). Additionally or alternatively, such a commerce credential may be at least partially provisioned on secure element 145 of device 100 from financial institution subsystem 350 via commercial entity subsystem 400 (e.g., as credential data 654 via communications path 55 between financial institution subsystem 350 and commercial entity subsystem 400, which may be passed to device 100 as credential data 654 via communications path 65 between a server 410 of commercial entity subsystem 400 and communications component 106 of device 100, which may then be passed to secure element 145 from communications component 106). Credential data 654 via path 75 and/or via paths 55/65 may be provisioned on secure element 145 of device 100 as at least a portion or all of a credential supplemental security domain of the secure element and may include a credential applet with credential information and/or a credential key, such as payment application or credential applet 153a with credential information 161a and credential key 155a'. As shown in FIG. 1A, for example, financial institution subsystem 350 may also have access to credential key 155a' (e.g., for decrypting data encrypted by device 100 using credential key 155a'). Financial institution subsystem 350 may be responsible for management of credential key 155a', which may include the generation, exchange, storage, use, and replacement of such a key. Financial institution subsystem 350 may store its version of credential key 155a' in a secure element of financial institution subsystem 350. It is to be understood that credential key 155a' of device 100 and of financial institution subsystem 350 may be any suitable shared secret (e.g., a password, passphrase, array of randomly chosen bytes, one or more symmetric keys, public-private keys (e.g., asymmetric keys), etc.) available to both the secure element of electronic device 100 and financial institution subsystem 350 that may be operative to enable any suitable crypto data (e.g., a cryptogram) or any other suitable data to be independently generated by electronic device 100 and financial institution subsystem 350 (e.g., for validating payment data for a financial transaction), such as by using any suitable cryptographic algorithm or cipher whose functional output may be at least partially determined by the shared secret, where such a shared secret may be provisioned on device 100 by financial institution subsystem 350. A shared secret may either be shared beforehand between financial institution subsystem 350 and device 100 (e.g., during provisioning of a credential on device 100 by financial institution subsystem 350), in which case such a shared secret may be referred to as a pre-shared key, or a shared secret may be created prior to use for a particular financial transaction by using a key-agreement protocol (e.g., using public-key cryptography, such as Diffie-Hellman, or using symmetric-key cryptography, such as Kerberos). The shared secret and any suitable cryptographic algorithm or cipher whose functional output may be at least partially determined by the shared secret may be accessible to the secure element of device 100.

Commercial entity subsystem 400 may be provided as an intermediary between financial institution subsystem 350 and device 100, where commercial entity subsystem 400 may be configured to provide a new layer of security and/or to provide a more seamless user experience when a credential is being provisioned on a secure element of device 100 and/or when such a provisioned credential is being used as part of a commerce credential data communication between device 100 and merchant subsystem 200. Commercial entity subsystem 400 may be provided by a specific commercial entity that may offer various services to a user of device 100 via user-specific log-in information to a user-specific account with that commercial entity (e.g., via user-specific identification and password combinations). As just one example, commercial entity subsystem 400 may be provided by Apple Inc. of Cupertino, CA, which may also be a provider of various services to users of device 100 (e.g., the iTunes™ Store for selling/renting media to be played by device 100, the Apple App Store™ for selling/renting applications for use on device 100, the Apple iCloud™ Service for storing data from device 100 and/or associating multiple user devices and/or multiple user profiles with one another, the Apple Online Store for buying various Apple products online, the Apple iMessage™ Service for communicating media messages between devices, etc.), and which may also be a provider, manufacturer, and/or developer of device 100 itself (e.g., when device 100 is an iPod™, iPad™, iPhone™, or the like) and/or of an operating system (e.g., device application 103) of device 100. The commercial entity that may provide commercial entity subsystem 400 (e.g., Apple Inc.) may be distinct and independent from any financial entity of financial institution subsystem 350. For example, the commercial entity that may provide commercial entity subsystem 400 may be distinct and/or independent from any payment network subsystem 360 or issuing bank subsystem 370 that may furnish and/or manage any credit card or any other commerce credential to be provisioned on end-user device 100. Additionally or alternatively, the commercial entity that may provide commercial entity subsystem 400 (e.g., Apple Inc.) may be distinct and independent from any merchant of merchant subsystem 200. For example, the commercial entity that may provide commercial entity subsystem 400 may be distinct and/or independent from any merchant of merchant subsystem 200 that may provide a merchant terminal for contactless proximity-based communications, a third party application or online resource 113 for online communications, and/or any other aspect of merchant subsystem 200. Such a commercial entity may leverage its potential ability to configure or control various components of device 100 (e.g., software and/or hardware components of device 100, such as when that commercial entity may at least partially produce or manage device 100) in order to provide a more seamless user experience for a user of device 100 when he or she wants to provision a credential offered by financial institution subsystem 350 on device 100 and/or when such a provisioned credential is being used as part of a commerce credential data communication with merchant subsystem 200 to fund a financial transaction. For example, in some embodiments, device 100 may be configured to communicate with commercial entity subsystem 400 seamlessly and transparently to a user of device 100 (e.g., via communications path 65) for sharing and/or receiving certain data that may enable a higher level of security (e.g., during an online-based secure data communication between device 100 and merchant subsystem 200). Although not shown, commercial entity subsystem 400 may also include a processor component that may be the same as or similar to processor component 102 of electronic device 100 of FIGS. 1A and 2, a communications component that may be the same as or similar to communications component 106 of electronic device 100 of FIGS. 1A and 2, an I/O interface that may be the same as or similar to I/O interface 114 of electronic device 100 of FIG. 2, a bus that may be the same as or similar to bus 118 of electronic device 100 of FIG. 2, a memory component that may be the same as or similar to memory component 104 of electronic device 100 of FIG. 2, and/or a power supply component that may be the same as or similar to power supply component 108 of electronic device 100 of FIG. 2, one, some or all of which may be at least partially provided by server 410.

In addition to at least one commerce credential being provisioned on a secure element of device 100 (e.g., as a portion of a credential SSD with credential key 155a' and credential information 161a), at least one access SSD with an access key 155b may also be provisioned on the secure element of device 100 in order to more securely enable device 100 to conduct a financial transaction with merchant subsystem 200. For example, an access SSD may be at least partially provisioned on a secure element of device 100 directly from commercial entity subsystem 400 (e.g., as access data 652 via communications path 65 between server 410 of commercial entity subsystem 400 and communications component 106 of device 100, which may then be passed to secure element 145 from communications component 106). Access data 652 via path 65 may be provisioned on a secure element of device 100 as at least a portion or all of an access SSD and may include an access applet 153b with an access key 155b. As shown in FIG. 1A, commercial entity subsystem 400 may also have access to access key 155b (e.g., for decrypting data encrypted by device 100 using access key 155b). Commercial entity subsystem 400 may be responsible for management of access key 155b, which may include the generation, exchange, storage, use, and replacement of such a key. Commercial entity subsystem 400 may store its version of access key 155b in a secure element of commercial entity subsystem 400. An access SSD of device 100 with access key 155b may be configured to determine intent and local authentication of a user of device 100 (e.g., via one or more input components 110 of device 100, such as a biometric input component) and, in response to such a determination, may be configured to enable another particular SSD for conducting a payment transaction (e.g., with a credential of a credential SSD of device 100). By storing such an access SSD within a secure element of device 100, its ability to reliably determine user intent for and authentication of a financial transaction may be increased. Moreover, access key 155b of such an access SSD of device 100 may be leveraged to provide increased encryption to transaction data that may be communicated outside of the secure element of device 100. Additionally or alternatively, as described below, access data 652 may include an issuer security domain ("ISD") key 156k for an ISD of the secure element of electronic device 100, which may also be maintained by commercial entity subsystem 400, and may be used in addition to or as an alternative to access key 155b, as described below.

A merchant application or online resource 113 may be accessed by device 100 in order to enable an online financial transaction to be facilitated between device 100 and merchant subsystem 200 or to enable online access to any other suitable secure device functionality of device 100 by merchant subsystem 200. First, such an application 113 may be approved or registered or otherwise enabled by commercial entity subsystem 400 before application 113 may be effectively utilized by device 100. For example, an application store 420 of commercial entity subsystem 400 (e.g., the Apple App Store™) may receive at least some data representative of application 113 from merchant subsystem 200 via communications path 85. Moreover, in some embodiments, commercial entity subsystem 400 may generate or otherwise assign a merchant key 157 for application 113 and may provide such a merchant key 157 to merchant subsystem 200 (e.g., via path 85). Alternatively, merchant subsystem 200 may generate or otherwise assign a merchant key 157 for application 113 and may provide such a merchant key 157 to commercial entity subsystem 400 (e.g., via path 85). Either merchant subsystem 200 or commercial entity subsystem 400 may be responsible for management of merchant key 157, which may include the generation, exchange, storage, use, and replacement of such a key. No matter how or where such a merchant key 157 may be generated and/or managed, both merchant subsystem 200 and commercial entity subsystem 400 may store a version of merchant key 157 (e.g., in a respective secure element of merchant subsystem 200 and commercial entity subsystem 400, where, in some embodiments, the merchant key 157 stored by merchant subsystem 200 may be a private key and the merchant key 157 stored by commercial entity subsystem 400 may be a corresponding public key (e.g., for use in asymmetric key encryption/decryption processes)). In some embodiments, such a merchant key 157 may be specifically associated with merchant application 113, while, in other embodiments, merchant key 157 may be specifically associated with a merchant of merchant subsystem 200 such that merchant key 157 may be associated with multiple third party applications or web resources operated by the same merchant of merchant subsystem 200. A unique merchant identifier 167 may be generated and/or otherwise assigned to or associated with application 113 by commercial entity subsystem 400 and/or by merchant subsystem 200. For example, a merchant identifier 167 may be an alphanumeric string, a domain (e.g., a URL or otherwise for a web resource type online resource application 113), or any other suitable identifier that may uniquely identify a merchant and/or a particular merchant online resource (e.g., uniquely identify such to commercial entity subsystem 400). A table 430 or any other suitable data structure or source of information that may be accessible to commercial entity subsystem 400 may be provided for associating a particular merchant key 157 with a particular merchant identifier 167 of a merchant application 113 or merchant entity. A merchant online resource may be associated with a particular merchant identifier 167 and a particular merchant key 157, each of which may be securely shared between merchant subsystem 200 and commercial entity subsystem 400. Table 430 may enable commercial entity subsystem 400 to determine and utilize an appropriate merchant key 157 for providing a layer of security to any secure device data communicated to merchant subsystem 200 (e.g., commerce credential data that may include payment credential data native to device 100) for a transaction that may involve device 100 interfacing with merchant subsystem 200 via merchant application 113 associated with key 157 and merchant identifier 167. Device 100 may be configured to access application 113 (e.g., from application store 420 via communications path 65) and run application 113 (e.g., with processor 102). Alternatively or additionally, a merchant key 157 and merchant identifier 167 may be associated with a merchant's website (e.g., one or more URLs or domains, which may be referred to herein as a merchant online resource or merchant application in some embodiments) or with the merchant generally, rather than or in addition to a merchant's third party native app. For example, a merchant of merchant subsystem 200 may work with commercial entity subsystem 400 to associate a particular merchant website or the merchant generally with a particular merchant key 157 and merchant identifier 167 within table 430, which may enable commercial entity subsystem 400 to determine and utilize an appropriate merchant key 157 for providing a layer of security to any secure device data communicated to merchant subsystem 200 (e.g., commerce credential data that may include payment credential data native to device 100) for a transaction that may involve device 100 interfacing with merchant server 210 to conduct a transaction via an internet application or web browser running on device 100 that may be pointed to a URL or domain whose target or web resource may be associated with that merchant key 157 and merchant identifier 167 (e.g., the unique domain of that web resource (e.g., store.merchant.com)). Device 100 may be configured to access such a URL, for example, from merchant server 210 via communication path 15 (e.g., using an internet application 113 on device 100 that may be considered a merchant online resource when targeting such a merchant web resource). In other embodiments, an application 113 may not be associated with a specific merchant, merchant subsystem 200, merchant key 157 and/or merchant identifier 167, but instead may be an independent application available to device 100 with a webview targeting such a merchant web resource, thereby acting as a merchant online resource. Such a registration of a merchant online resource by commercial entity subsystem 400 (e.g., secure and validated sharing of merchant key 157 and merchant identifier 167 between merchant subsystem 200 and commercial entity subsystem 400 (e.g., for storage in table 430)) may be carried out in any suitable manner to ensure commercial entity subsystem 400 that merchant subsystem 200 is a valid owner of the online resource. As mentioned, a merchant online resource (e.g., native app, domain/URL, or any other suitable web resource, or perhaps even a merchant terminal) may be associated with a particular merchant identifier 167 and a particular merchant key 157 (e.g., during registration at step 501 of FIG. 5 and/or at step 606 of FIG. 6), each of which may be securely shared between merchant subsystem 200 and commercial entity subsystem 400 in any suitable manner and such an association may be accessible to commercial entity subsystem 400 (e.g., in table 430).

Description of FIG. 2

Referring now to FIG. 2, FIG. 2 shows a more detailed view of electronic device 100 of system 1 described above with respect to FIGS. 1 and 1A. As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. Electronic device 100 may also be provided with a housing 101 that may at least partially enclose one or more of the components of device 100 for protection from debris and other degrading forces external to device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2. One or more input components 110 may be provided to permit a user to interact or interface with device 100 and/or one or more output components 112 may be provided to present information (e.g., graphical, audible, and/or tactile information) to a user of device 100. It should be noted that one or more input components and one or more output components may sometimes be referred to collectively herein as an input/output ("I/O") component or I/O interface 114 (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen. Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103 and/or an application 113. As one example, application 103 may be an operating system application while application 113 may be a third party application or any other suitable online resource (e.g., an application associated with a merchant of merchant subsystem 200). Moreover, as shown, processor 102 may have access to device identification information 119, which may be utilized by a user of device 100 and/or commercial entity subsystem 400 for providing identification of device 100.

NFC component 120 may be any suitable proximity-based communication mechanism that may enable contactless proximity-based transactions or communications between electronic device 100 and a merchant terminal (e.g., merchant payment terminal 220) of merchant subsystem 200. NFC component 120 may include any suitable modules for enabling contactless proximity-based communication between electronic device 100 and such a merchant terminal. As shown in FIG. 2, for example, NFC component 120 may include an NFC device module 130, an NFC controller module 140, and/or an NFC memory module 150. NFC device module 130 may include an NFC data module 132, an NFC antenna 134, and an NFC booster 136. NFC data module 132 may be configured to contain, route, or otherwise provide any suitable data that may be transmitted by NFC component 120 to a merchant terminal as part of a contactless proximity-based or NFC communication. Additionally or alternatively, NFC data module 132 may be configured to contain, route, or otherwise receive any suitable data that may be received by NFC component 120 from a merchant terminal as part of a contactless proximity-based communication. NFC controller module 140 may include at least one NFC processor module 142. NFC processor module 142 may operate in conjunction with NFC device module 130 to enable, activate, allow, and/or otherwise control NFC component 120 for communicating an NFC communication between electronic device 100 and a merchant terminal. NFC controller module 140 may include at least one NFC processor module 142 that may be used to run one or more applications, such as an NFC low power mode or wallet application 143 that may help dictate the function of NFC component 120. NFC memory module 150 may operate in conjunction with NFC device module 130 and/or NFC controller module 140 to allow for NFC communications between electronic device 100 and merchant subsystem 200. NFC memory module 150 may be tamper resistant and may provide at least a portion of a secure element 145 (see, e.g., FIG. 2A). For example, such a secure element may be configured to provide a tamper-resistant platform (e.g., as a single-chip or multiple-chip secure microcontroller) that may be capable of securely hosting applications and their confidential and cryptographic data (e.g., applets 153 and keys 155) in accordance with rules and security requirements that may be set forth by a set of well-identified trusted authorities (e.g., an authority of financial institution subsystem and/or an industry standard, such as GlobalPlatform).

As shown in FIG. 2, for example, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., financial institution subsystem 350) may store keys and/or other suitable information for creating or otherwise provisioning one or more credentials (e.g., credentials associated with various credit cards, bank cards, gift cards, access cards, transit passes, etc.) on electronic device 100 (e.g., via communications component 106), for credential content management, and/or security domain management. A credential may include credential data (e.g., credential information 161*a*) that may be assigned to a user/consumer and that may be stored securely on electronic device 100, such as a credit card payment number (e.g., a device primary account number ("DPAN"), DPAN expiry date, CVV, etc. (e.g., as a token or otherwise)). NFC memory module 150 may include at least two SSDs 154 (e.g., at least a first SSD 154*a* and a second SSD 154*b*). For example, first SSD 154*a* (e.g., a credential SSD 154*a*) may be associated with a specific credential (e.g., a specific credit card credential or a specific public transit card credential provisioned by financial institution subsystem 350) that may provide specific privileges or payment rights to electronic device 100, while second SSD 154*b* (e.g., an access SSD 154*b*) may be associated with a commercial entity (e.g., a commercial entity of commercial entity subsystem 400, which may be a controlling entity for device 100) that may control access of device 100 to a specific credential of another SSD (e.g., first SSD 154*a*), for example, to provide specific privileges or payment rights to electronic device 100. Alternatively, each one of first SSD 154*a* and second SSD 154*b* may be associated with a respective specific credential (e.g., a specific credit card credential or a specific public transit card credential provisioned by financial institution subsystem 350) that may provide specific privileges or payment rights to electronic device 100. Each SSD 154 may include and/or be associated with at least one applet 153 (e.g., SSD 154*a* with applet 153*a* and SSD 154*b* with applet 153*b*). For example, an applet 153 of an SSD 154 may be an application that may run on a secure element of NFC component 120 (e.g., in a GlobalPlatform environment). A credential applet 153 may include or be associated with credential information 161 (e.g., information 161*a* of applet 153*a* and/or information 161*b* of applet 153*b*). Each SSD 154 and/or applet 153 may also include and/or be associated with at least one of its own keys 155 (e.g., applet 153*a* with at least one key 155*a* and applet 153*b* with at least one key 155*b*).

A key 155 of an SSD 154 may be a piece of information that can determine a functional output of a cryptographic algorithm or cipher. For example, in encryption, a key may specify a particular transformation of plaintext into ciphertext, or vice versa during decryption. Keys may also be used in other cryptographic algorithms, such as digital signature schemes and message authentication codes. A key of an SSD may provide any suitable shared secret with another entity. Each key and applet may be loaded on the secure element of device 100 by a TSM or an authorized agent or pre-loaded on the secure element when first provided on device 100. As one example, while credential SSD 154*a* may be associated with a particular credit card credential, that particular credential may only be communicated as a commerce credential data communication to merchant subsystem 200 from a secure element of device 100 (e.g., from NFC component 120) for a financial transaction when applet 153*a* of that credential SSD 154*a* has been enabled or otherwise activated or unlocked for such use.

Security features may be provided for enabling use of NFC component 120 that may be particularly useful when transmitting confidential payment information, such as credit card information or bank account information of a credential, from electronic device 100 to merchant subsystem 200. Such security features also may include a secure storage area that may have restricted access. For example, user authentication via personal identification number ("PIN") entry or via user interaction with a biometric sensor may need to be provided to access the secure storage area. As an example, an access SSD 154b may leverage applet 153b to determine whether such authentication has occurred before allowing other SSDs 154 (e.g., a credential SSD 154a) to be used for communicating its credential information 161a. In certain embodiments, some or all of the security features may be stored within NFC memory module 150. Further, security information, such as an authentication key, for communicating commerce credential data with merchant subsystem 200 may be stored within NFC memory module 150. In certain embodiments, NFC memory module 150 may include a microcontroller embedded within electronic device 100. As just one example, applet 153b of access SSD 154b may be configured to determine intent and local authentication of a user of device 100 (e.g., via one or more input components 110, such as a biometric input component) and, in response to such a determination, may be configured to enable another particular SSD for conducting a payment transaction (e.g., with a credential of a credential SSD 154a).

Figure 2A:
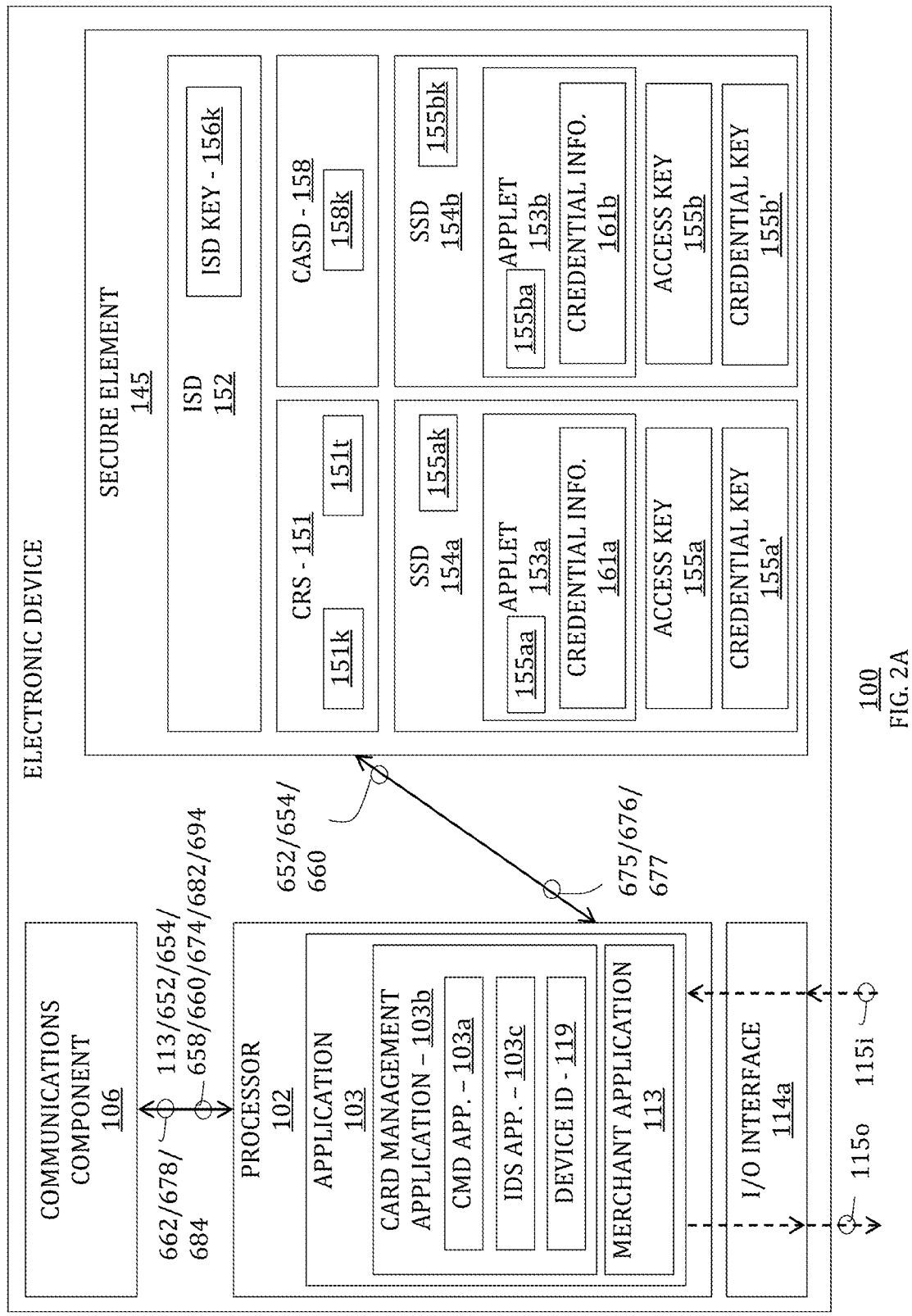
FIG. 2A is another more detailed schematic view of the example electronic device of FIGS. 1 2.

Description of FIG. 2A

Referring now to FIG. 2A, FIG. 2A shows another detailed view of a portion of electronic device 100 of system 1 described above with respect to FIGS. 1-2. As shown in FIG. 2A, for example, a secure element 145 of device 100 may include SSD 154a, which may include or be associated with applet 153a, credential information 161a, access key 155a, and/or credential key 155a', and SSD 154b, which may include or be associated with applet 153b, credential information 161b, access key 155b, and/or credential key 155b'. In some embodiments, a specific supplemental security domain ("SSD") 154 (e.g., one of SSDs 154a and 154b) may be associated with a particular TSM and at least one specific commerce credential (e.g., a specific credit card credential or a specific public transit card credential) that may provide specific privileges or payment rights to electronic device 100. Each SSD 154 may have its own manager key 155 (e.g., a respective one of keys 155ak and 155bk) that may need to be activated to enable a function of that SSD 154 for use by NFC device module 130. Additionally or alternatively, each SSD 154 may include and/or be associated with at least one of its own credential applications or credential applets (e.g., a Java card applet instances) associated with a particular commerce credential (e.g., credential applet 153a of SSD 154a may be associated with a first commerce credential and/or credential applet 153b of SSD 154b may be associated with a second commerce credential), where a credential applet may have its own access key (e.g., access key 155a for credential applet 153a and/or access key 155b for credential applet 153b) and/or its own credential key (e.g., credential key 155a' for credential applet 153a and/or credential key 155b' for credential applet 153b), and where a credential applet may need to be activated to enable its associated commerce credential for use by NFC device module 130 as an NFC communication (e.g., with merchant terminal 220) and/or as an online-based communication between electronic device 100 and merchant subsystem 200 (e.g., via commercial entity subsystem 400). In some embodiments, a credential key of a credential applet (e.g., credential key 155a' for credential applet 153a and/or credential key 155b' for credential applet 153b) may be generated by financial institution subsystem 350 that may be responsible for such a credential and may be accessible by that financial institution subsystem 350 (e.g., as shown in FIG. 1A) for enabling secure transmission of that credential information of that applet between secure element 145 and financial institution subsystem 350 (e.g., via merchant subsystem 200). Additionally or alternatively, an access key of a credential applet (e.g., access key 155a for credential applet 153a and/or access key 155b for credential applet 153b) may be generated by commercial entity subsystem 400 and may be accessible by commercial entity subsystem 400 (e.g., as shown in FIG. 1A) for enabling secure transmission of that credential information of that applet between secure element 145 and commercial entity subsystem 400. Additionally or alternatively, as shown, each applet may include its own unique application identifier ("AID"), such as AID 155aa of applet 153a and/or AID 155ba of applet 153b. For example, an AID may identify a specific card scheme and product, program, or network (e.g., MasterCard Cirrus, Visa PLUS, Interac, etc.), where an AID may include not only a registered application provider identifier ("RID") that may be used to identify a payment system (e.g., card scheme) or network (e.g., MasterCard, Visa, Interac, etc.) of the credential associated with the AID but also a proprietary application identifier extension ("PIX") that may be used to differentiate between products, programs, or applications offered by a provider or payment system of the credential associated with the AID. Any suitable specification (e.g., a Java Card specification) that may be operative to preside over firmware of secure element 145 may be operative to ensure or otherwise force the uniqueness of each AID on secure element 145 (e.g., each credential instance on secure element 145 may be associated with its own unique AID).

Additionally or alternatively, as shown in FIG. 2A, secure element 145 may include ISD 152, which may include an ISD key 156k that may also be known to a trusted service manager associated with that security domain (e.g., commercial entity subsystem 400, as shown in FIG. 1A). ISD key 156k may be leveraged by commercial entity subsystem 400 and electronic device 100 similarly to and/or instead of access key 155a and/or access key 155b for enabling secure transmissions between commercial entity subsystem 400 and secure element 145 of electronic device 100. Moreover, as shown in FIG. 2A, various data may be communicated between processor 102 and secure element 145. For example, processor 102 of device 100 may be configured to run a device application 103 that may communicate information with a merchant application 113 of processor 102 as well as secure element 145, an I/O interface component 114a (e.g., for receiving I/O input data 115i and/or for transmitting I/O output data 115o), and/or communications component 106. Moreover, as shown, processor 102 may have access to device identification information 119, which may be utilized for enabling secure communication between device 100 and remote entities.

Additionally or alternatively, as shown in FIG. 2A, secure element 145 may include a controlling authority security domain ("CASD") 158, which may be a special purpose security domain that may be configured to serve as a third-party on-element root of trust. An associated application of CASD 158 may be configured to provide on-element confidential key generation as a global service to other applications and/or to a specific management layer (e.g., a GlobalPlatform management layer). Confidential key material that may be used within CASD 158 may be configured such that it may not be inspected or modified by any entity, including an issuer of secure element 145. CASD 158 may be configured to include and/or may be configured to generate and/or otherwise include CASD access kit 158*k* (e.g., a CASD private key ("CASD-SK"), a CASD public key ("CASD-PK"), a CASD certificate ("CASD-Cert."), and/or a CASD-signing module). For example, CASD 158 may be configured to sign certain data on secure element 145 (e.g., using CASD access kit 158*k*) before providing such data to another portion of device 100 (e.g., communications component 106 for sharing with other subsystems of system 1). As an example, CASD 158 may be configured to sign any data that is provided by secure element 145 such that other subsystems (e.g., commercial entity subsystem 400) may be able to confirm that such signed data was signed by secure element 145 (e.g., using an associated CASD kit 158*k* at commercial entity subsystem 400).

Additionally or alternatively, as shown in FIG. 2A, secure element 145 may include a contactless registry services ("CRS") applet or application 151 that may be configured to provide local functionality to electronic device 100 for modifying a life cycle state (e.g., activated, deactivated, locked, etc.) of certain security domain elements and sharing certain output information 115*o* about certain security domain elements in certain life cycle states with a user of device 100 (e.g., via a user I/O interface 114*a*). For example, CRS application 151 may include a CRS list 151*t* that may maintain a list of the current life cycle state of each security domain element on secure element 145 (e.g., a list that may include the life cycle state of one, some, or all of credential applet 153*a* of SSD 154*a* and/or credential applet 153*b* of SSD 154*b*), where CRS application 151 may be configured to share the life cycle state of one or more security domain elements of secure element 145 with an application of device 100 (e.g., with any suitable application type, such as a daemon, such as card management daemon ("CMD") application 103*a* that may be running as a background process inside an operating system application 103 and/or a card management application 103*b* (e.g., a Passbook™ or Wallet™ application by Apple Inc.) and/or a merchant application 113 (e.g., a merchant online resource as may be associated with merchant key 157 and merchant identifier 167) and/or an identity services ("IDS") application 103*c*, but that may not necessarily be under the control of an interactive user of device 100), which in turn may provide certain life cycle state information to a user of device 100 as output information 115*o* via I/O interface 114*a* and a user interface ("UI") application (e.g., a UI of card management application 103*b*), which may enable a user to change a life cycle state of a security domain element (e.g., to update a CRS list 151*t* and a life cycle state of a security domain element, such as for enabling a commerce credential of a specific credential applet for use in a financial transaction). Additionally or alternatively, CRS 151 may include a CRS access key 151*k* that may also be known to a trusted service manager associated with CRS 151 (e.g., commercial entity subsystem 400, as shown in FIG. 1A). CRS access key 151*k* may be leveraged by commercial entity subsystem 400 and electronic device 100 similarly to and/or instead of access key 155*a* and/or access key 155*b* for enabling secure transmissions between commercial entity subsystem 400 and secure element 145 of electronic device 100.

IDS application 103*c* may be any suitable application type, such as a daemon, that may be running as a background process inside operating system application 103 and/or card management application 103*b* and/or that may be provided by CMD application 103*a*, and may be operative as an IDS manager for listening for and responding to IDS messages that may be sent over any suitable IDS service, which may be similar to any suitable messaging service, such as iMessage™ by Apple Inc., or the like (e.g., FaceTime™ or Continuity™ by Apple Inc.), which may enable unique end-to-end encryption of messages between IDS application 103*c* of host device 100 and a similar IDS application of another device (e.g., a client device). Such messages may be encrypted using unique identifiers for one or both of the communicating devices and/or for one or both of the specific users of the communicating devices. Such messages may be communicated as a local link or a true device to device (e.g., peer to peer) communication, or may be communicated via commercial entity subsystem 400 (e.g., via an identity management system component 470). Such messaging may be enabled as a low latency solution that may allow data to be exchanged in structured formats (e.g., protocol buffers) and/or unstructured formats. IDS application 103*c* may be automatically awoken should it not be running when an IDS message is received. IDS application 103*c* may be operative to present an appropriate user interface and shepherding requested data of a received IDS communication back to the requesting device. IDS application 103*c* of a host device may be operative to wake up card management daemon application 103*a* of card management application 103*b* when an initial request may be detected from a client device, which may allow a host device to operate in a low-power 'sleep' mode. IDS application 103*c* may additionally or alternatively be operative to manage a 'time out' for such a request, such that, should a request for payment from a client device go unactioned on the host device for a period of time (e.g., 60 seconds, due to no active host device user interaction responsive to such a request), then IDS application 103*c* nay be operative to make a determination to terminate the request that may result in the host device generating and delivering a 'cancel' status back to the client device, which may display an appropriate message (e.g., 'time out error' to a user of the client device).

Description of FIG. 3 and FIGS. 3A-3D

As shown in FIG. 3, and as described below in more detail, a specific example of electronic device 100 may be a handheld electronic device, such as an iPhone™, where housing 101 may allow access to various input components 110*a*-110*i*, various output components 112*a*-112*c*, and various I/O components 114*a*-114*d* through which device 100 and a user and/or an ambient environment may interface with each other. For example, a touch screen I/O component 114*a* may include a display output component 112*a* and an associated touch input component 110*f*, where display output component 112*a* may be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112*a*. For example, as shown in FIG. 3, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application, such as a merchant online resource application. For example, when the specific icon 182 labeled with a "Merchant App" textual indicator 181 (i.e., specific icon 183) is selected by a user of device 100, device 100 may launch or otherwise access a specific third party merchant application (e.g., a native application or hybrid application). As another example, when the specific icon 182 labeled with an "Internet" textual indicator (i.e., specific icon 184) is selected by a user of device 100, device 100 may launch or otherwise access an internet browser application that may be directed to a URL of a web resource of a specific third party merchant for providing another type of merchant online resource to device 100. When any suitable merchant online resource is accessed, device 100 may be operative to display screens of a specific user interface that may include one or more tools or features for interacting with that merchant online resource using device 100 in a specific manner (see, e.g., FIGS. 3A-3D for specific examples of such displays of GUI 180 during use of any suitable application (e.g., a merchant online resource 113) that may be used by a device user for any carrying out any secure functionality of device 100 (e.g., making a payment to merchant subsystem 200 with a credential of NFC component 120 (e.g., a credential of credential SSD 154a) of device 100)). For each application, screens may be displayed on display output component 112a and may include various user interface elements. Additionally or alternatively, for each application, various other types of non-visual information may be provided to a user via various other output components 112 of device 100. For example, in some embodiments, device 100 may not include a user interface component operative to provide a GUI but may instead provide an audio output component and mechanical or other suitable user input components for selecting and authenticating use of a payment credential for funding a transaction or for conducting any other suitable secure functionality of the device.

Description of FIG. 4

Referring now to FIG. 4, FIG. 4 shows further details with respect to particular embodiments of commercial entity subsystem 400 of system 1. As shown in FIG. 4, commercial entity subsystem 400 may be a secure platform system and may include a secure mobile platform ("SMP") broker component 440, an SMP trusted services manager ("TSM") component 450, an SMP crypto services component 460, an identity management system ("IDMS") component 470, a fraud system component 480, a hardware security module ("HSM") component 490, store component 420, and/or one or more servers 410. One, some, or all components of commercial entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of commercial entity subsystem 400 may be managed by, owned by, at least partially controlled by, and/or otherwise provided by a single commercial entity (e.g., Apple Inc.) that may be distinct and independent from financial institution subsystem 350 and/or merchant subsystem 200. The components of commercial entity subsystem 400 may interact with each other and collectively with financial institution subsystem 350 and/or electronic device 100 and/or merchant subsystem 200 for providing a new layer of security and/or for providing a more seamless user experience.

SMP broker component 440 of commercial entity subsystem 400 may be configured to manage user authentication with a commercial entity user account. SMP broker component 440 may also be configured to manage the lifecycle and provisioning of credentials on device 100. SMP broker component 440 may be a primary end point that may control the user interface elements (e.g., elements of GUI 180) on device 100. An operating system or other application of an end user device (e.g., application 103, application 113, and/or application 143 of device 100) may be configured to call specific application programming interfaces ("APIs") and SMP broker 440 may be configured to process requests of those APIs and respond with data that may derive the user interface of device 100 and/or respond with application protocol data units ("APDUs") that may communicate with secure element 145 (e.g., via a communication path 65 between commercial entity subsystem 400 and electronic device 100). Such APDUs may be received by commercial entity subsystem 400 from financial institution subsystem 350 via a trusted services manager ("TSM") of system 1 (e.g., a TSM of a communication path 55 between commercial entity subsystem 400 and financial institution subsystem 350). SMP TSM component 450 of commercial entity subsystem 400 may be configured to provide GlobalPlatform-based services or any other suitable services that may be used to carry out credential provisioning operations on device 100 from financial institution subsystem 350. GlobalPlatform, or any other suitable secure channel protocol, may enable SMP TSM component 450 to properly communicate and/or provision sensitive account data between secure element 145 of device 100 and a TSM for secure data communication between commercial entity subsystem 400 and financial institution subsystem 350.

SMP TSM component 450 may be configured to use HSM component 490 to protect its keys and generate new keys. SMP crypto services component 460 of commercial entity subsystem 400 may be configured to provide key management and cryptography operations that may be provided for user authentication and/or confidential data transmission between various components of system 1. SMP crypto services component 460 may utilize HSM component 490 for secure key storage and/or opaque cryptographic operations. A payment crypto service of SMP crypto services component 460 may be configured to interact with IDMS component 470 to retrieve information associated with on-file credit cards or other types of commerce credentials associated with user accounts of the commercial entity (e.g., an Apple iCloud™ account). Such a payment crypto service may be configured to be the only component of commercial entity subsystem 400 that may have clear text (e.g., non-hashed) information describing commerce credentials (e.g., credit card numbers) of its user accounts in memory. IDMS component 470 may be configured to enable and/or manage any suitable communication between device 100 and another device, such as an identity services ("IDS") transport (e.g., using a commercial-entity specific service (e.g., iMessage™ by Apple Inc.). For example, certain devices may be automatically or manually registered for such a service (e.g., all devices in an eco-system of commercial entity 400 may be automatically registered for the service). Such a service may provide an end-to-end encrypted mechanism that may require active registration before messages can be sent using the service (e.g., using IDS application 103c of device 100). IDMS component 470 and/or any other suitable server or portion of commercial entity subsystem 400 may be operative to identify or otherwise lookup the status of any credentials provisioned on any electronic devices associated with a given user account or otherwise, such that commercial entity subsystem 400 may be operative to efficiently and effectively identify one or more non-native payment credentials that may be available to a particular client device associated with a particular user account (e.g., multiple devices of a family account with commercial entity subsystem 400). Commercial entity fraud system component 480 of commercial entity subsystem 400 may be configured to run a commercial entity fraud check on a commerce credential based on data known to the commercial entity about the commerce credential and/or the user (e.g., based on data (e.g., commerce credential information) associated with a user account with the commercial entity and/or any other suitable data that may be under the control of the commercial entity and/or any other suitable data that may not be under the control of financial institution subsystem 350). Commercial entity fraud system component 480 may be configured to determine a commercial entity fraud score for the credential based on various factors or thresholds. Additionally or alternatively, commercial entity subsystem 400 may include store 420, which may be a provider of various services to users of device 100 (e.g., the iTunes™ Store for selling/renting media to be played by device 100, the Apple App Store™ for selling/renting applications for use on device 100, the Apple iCloud™ Service for storing data from device 100 and/or associating multiple user devices and/or multiple user profiles with one another, the Apple Online Store for buying various Apple products online, etc.). As just one example, store 420 may be configured to manage and provide an application 113 to device 100 (e.g., via communications path 65), where application 113 may be any suitable application, such as a banking application, a commercial merchant application, an e-mail application, a text messaging application, an internet application, a card management application, or any other suitable communication application. Any suitable communication protocol or combination of communication protocols may be used by commercial entity subsystem 400 to communicate data amongst the various components of commercial entity subsystem 400 (e.g., via at least one communications path 495 of FIG. 4) and/or to communicate data between commercial entity subsystem 400 and other components of system 1 (e.g., financial entity subsystem 350 via communications path 55 of FIG. 1 and/or electronic device 100 via communications path 65 of FIG. 1).

Figure 5:
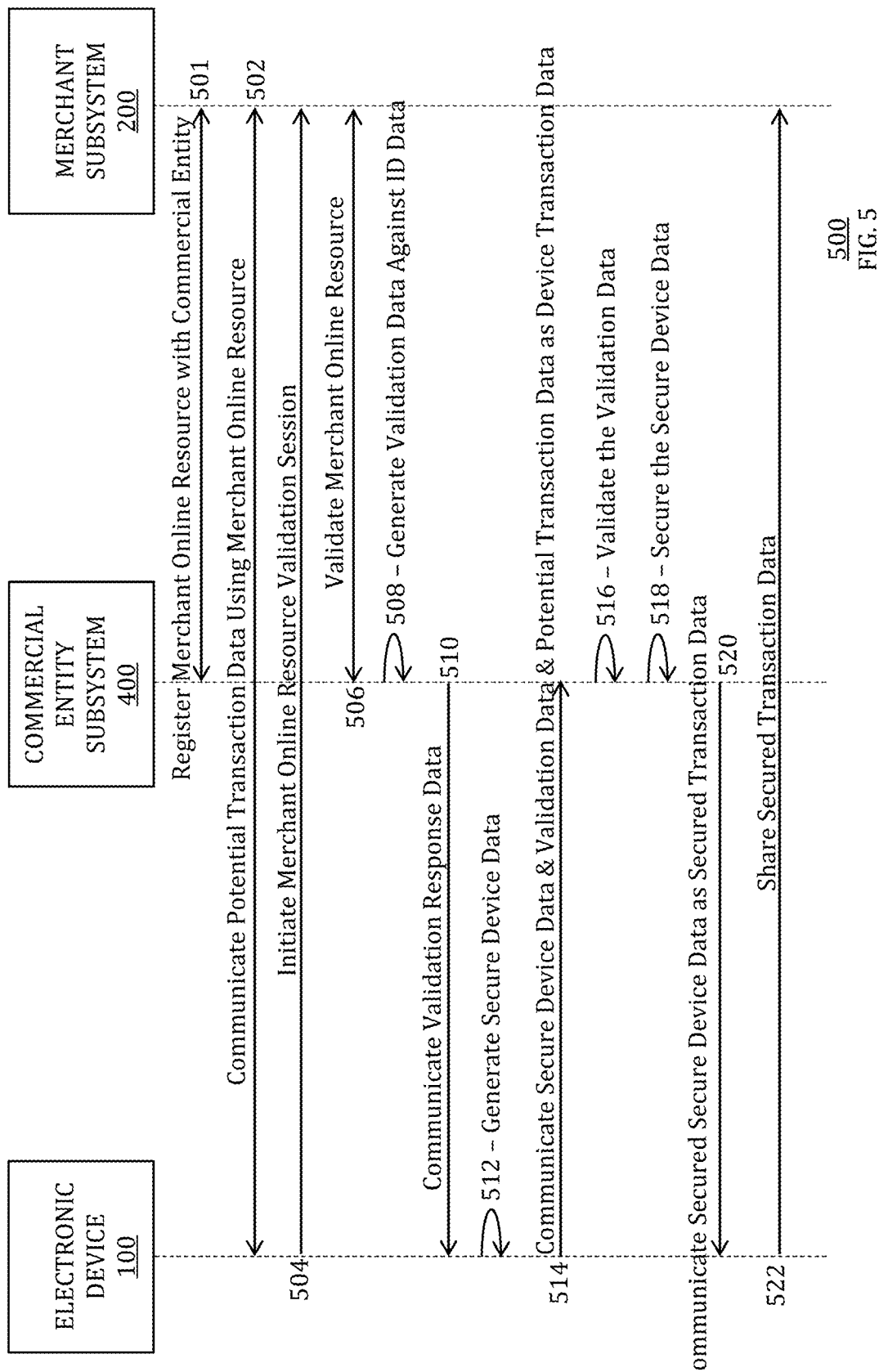
FIGS. 5-9 are flowcharts of illustrative processes for validating online access to secure device functionality.

Description of FIG. 5

FIG. 5 is a flowchart of an illustrative process 500 for validating online access to secure device functionality. Process 500 is shown being implemented by electronic device 100, commercial entity subsystem 400, and merchant subsystem 200. However, it is to be understood that process 500 may be implemented using any other suitable components or subsystems. Process 500 may provide a seamless user experience for securely and efficiently validating a third party merchant subsystem 200 for enabling online access to secure functionality of electronic device 100 by merchant subsystem 200, such as the validation of merchant subsystem 200 by commercial entity subsystem 400 for enabling the secure use of a credential on electronic device 100 in a transaction (e.g., an online payment or a contactless proximity based payment) with merchant subsystem 200 or for enabling the secure access by merchant subsystem 200 of any other suitable data from electronic device 100 (e.g., location data, health data, or any other private data or otherwise that ought not be shared with third party subsystems that have not been effectively validated). While the term "merchant" may be utilized for describing merchant subsystem 200 and/or any feature thereof, such as a merchant online resource or key or server or terminal or identifier, it is to be understood that subsystem 200 may be any suitable subsystem (e.g., a processing subsystem (e.g., a data processing subsystem)) operated by any suitable third party entity that may be distinct from an owner or user of electronic device 100 and/or from commercial (or administration) entity subsystem 400. For example, merchant subsystem 200 may be any suitable third party subsystem that may attempt to access or otherwise receive or interact with secure device functionality of electronic device 100 (e.g., load data onto device 100 (e.g., provision a payment credential on device 100), receive data from device 100 (e.g., access payment credential data or health care data or location data or contact data or private media data from device 100), and/or the like using a merchant online resource). Process 500 may be operative to enable more secure and trusted communication of any suitable data between device 100 and any suitable web resource of any suitable merchant subsystem. Process 500 may be operative to validate any suitable web resource or other online resource to ensure it has a trusted relationship with commercial entity subsystem 400 prior to enabling such data communication.

At step 501 of process 500, merchant subsystem 200 may be registered with commercial entity subsystem 400. As mentioned, a merchant online resource 113 (e.g., native app, domain/URL, or any other suitable web resource, or perhaps even a merchant terminal) of merchant subsystem 200 may be associated with a particular merchant identifier 167 and a particular merchant key 157, each of which may be securely shared between merchant subsystem 200 and commercial entity subsystem 400 in any suitable manner, and such an association may be accessible to commercial entity subsystem 400 (e.g., in table 430). In some embodiments, a developer of a native application (e.g., a native application merchant online resource 113) may use a system of entitlements to allow the application access to secure device functionality of electronic device 100 running the application (e.g., push messaging, cloud storage, secure element credential payments, etc.), where the entitlements may be signed into the application's binary as part of a code signing process that may be required to enable the application to be registered by commercial entity subsystem 400 (e.g., for deployment in application store 420 and/or for securely associating a merchant key 157 and merchant identifier 167 of the application in table 430), where, for example, merchant identifier 167 may form a part of the application's entitlements. Unlike such a native application, web resources (e.g., a website merchant online resource 113) may not have code-signing or similar protections that may be provided (e.g., by commercial entity subsystem 400) to native applications operative to be run on electronic device 100. Instead, ownership of a domain of a web resource may be proven before that web resource may be registered. For registering a website merchant online resource 113 owned or otherwise controlled by merchant subsystem 200, such ownership must be proven to commercial entity subsystem 400 prior to commercial entity subsystem 400 registering that merchant online resource 113 (e.g., prior to a particular merchant identifier 167 and a particular merchant key 157 being associated with that merchant online resource 113 and shared between merchant subsystem 200 and commercial entity subsystem 400 for future access by commercial entity subsystem 400 (e.g., in table 430)). For example, to prove ownership of a domain of the merchant online resource 113 to be registered to commercial entity subsystem 400, identification of the domain may be provided to commercial entity subsystem 400, commercial entity subsystem 400 may provide any suitable file (e.g., a static file, such as a JSON file) to merchant subsystem 200, merchant subsystem 200 may sign that file (e.g., with a shared merchant key 157) and host that file at a well-known path on the domain to be registered, and then commercial entity subsystem 400 may access that signed file from the domain and unsign the file (e.g., with a shared merchant key 157) to confirm that the accessed file matches the file shared with merchant subsystem 200. Some exemplary processes for registering web resources may be described in U.S. Patent Application Publication No. 2015/0350106 titled "Sharing Account Data Between Different Interfaces To A Service," which is hereby incorporated by reference herein in its entirety. Any suitable process or processes may be utilized at step 502 for securely registering the validity of any suitable type of merchant online resource 113 of merchant subsystem 200 with commercial entity subsystem 400 (e.g., any native app, hybrid app, web resource, or even a merchant terminal of the merchant to be utilized by an electronic device, whether running locally on the device or hosted remotely on a server or positioned proximately to the device), whereby at least one merchant identifier 167 associated with the merchant online resource 113 and at least one merchant key 157 (e.g., symmetric or asymmetric key pair) may be associated with the merchant online resource 113 and may be made accessible to both merchant subsystem 200 and commercial entity subsystem 400 (e.g., in table 430) for future use, and any suitable data may be communicated between merchant subsystem 200 and commercial entity subsystem 400 during any such process in any suitable manner (e.g., application 113, key 157, identifier 167, and/or any other suitable data via communications path 85 using any suitable communications protocol(s)). One or more merchant identifiers may be associated with a particular merchant online resource 113, such as a first merchant identifier 167 uniquely associated with the particular merchant online resource 113 and/or a second merchant identifier 167 associated with each merchant online resource 113 of a particular merchant subsystem 200. Additionally or alternatively, one or more merchant keys may be associated with a particular merchant identifier or with a particular merchant online resource 113. All such merchant key and merchant identifier associations may be stored by or otherwise accessible to commercial entity subsystem 400 (e.g., in one or more tables 430) at one or more instances of step 501.

At step 502 of process 500, potential transaction data may be communicated between merchant subsystem 200 and electronic device 100 using the registered merchant online resource. For example, at some point during user interaction with device 100 running or otherwise accessing a merchant online resource application 113 (e.g., while a user is shopping online for goods or services of a merchant or while a user is communicating with a health care professional), potential transaction data may be communicated to device 100 from merchant subsystem 200 or from any other suitable entity that may be indicative of any suitable data related to a potential secure data transaction that may occur between device 100 and a merchant (or processor) of merchant (or processing) subsystem 200, including, but not limited to, (i) specific merchant information, such as at least one or each merchant identifier 167 of the merchant online resource application 113, (ii) specific transaction information, such as identification of a specific type of secure data to be shared between device 100 and merchant subsystem 200 (e.g., currency and value amount and payment type for a financial transaction (e.g., 5 U.S. dollars using a Visa payment credential provisioned on device 100), type and amount of health care data for a health transaction (e.g., heart rate data of a particular user over the last 3 days as detected or otherwise obtained by device 100), and/or the like), and/or (iii) a unique merchant-based transaction identifier (e.g., any suitable data element, such as a multi-character alphanumeric string, that may be randomly or uniquely generated by merchant subsystem 200 for association with the transaction being conducted). Such potential transaction data may include any suitable number and types of data fields, with or without associated data, that may be required or at least used for completing a secure data transaction, such as contact information fields (e.g., telephone number, e-mail address, mailing address) of a customer making a purchase, where some fields may be populated and included as part of such potential transaction data, and/or where some fields may not be populated as part of such potential transaction data but may be open and awaiting population during later portions of process 500. Such potential transaction data of step 502 may be referred to herein as a PKDataRequest or a PKPaymentRequest (e.g., for a financial transaction). In some embodiments, a user may not be actively interacting with device 100 in order for potential transaction data associated with merchant subsystem 200 to be made available to device 100 at step 502. Instead, as an example, device 100 may be configured to determine that a particular product ought to be purchased and to interact with one or more merchants in order to obtain associated transaction data from at least one particular merchant for that particular product (e.g., device 100 may be a home appliance that may be configured to determine that an appliance product must be purchased (e.g., detect that more laundry detergent is needed by a washing machine or detect a calendar event pre-set by a user to buy more detergent on a particular date) and may automatically identify a particular merchant offering the best deal for that product and may automatically interact with that merchant using a merchant online resource to obtain transaction data for purchasing that product from that merchant), all automatically and without any active interaction by a user of device 100. The potential transaction data of step 502 may include all data necessary for device 100 to securely generate and/or provide secure device data (e.g., appropriate payment credential data) to merchant subsystem 200 for completing a secure data transaction (e.g., funding a financial transaction) associated with the potential transaction data. Such potential transaction data may be communicated by merchant subsystem 200 to device 100 at step 502 in any suitable manner (e.g., such potential transaction data may be transmitted from server 210 of merchant subsystem 200 to communications component 106 of device 100 via communications path 15 using any suitable communications protocol or via a contactless proximity-based communication channel between terminal 220 and NFC component 120 using any suitable communications protocol).

At step 504 of process 500, a merchant online resource validation session may be initiated. This may occur in response to electronic device 100 indicating that the secure data transaction (e.g., the secure data transaction identified by the potential transaction data of step 502) should occur (e.g., in response to a user of device 100 selecting a GUI element (e.g., radio button) of the merchant online resource for conveying the user's desire to conduct the secure data transaction identified by the potential transaction data of the merchant online resource of step 502, or automatically based on any suitable requirements being satisfied (e.g., simply in response to the potential transaction data of step 502 being communicated to device 100)). When such intent to carry out a particular secure data transaction with a merchant online resource is determined, merchant online resource 113 on device 100 may be operative to generate and send a data transaction request to card management application 103b or any other suitable device application on device 100 and that device application 103b may be operative to generate and communicate merchant validation session initiation data to merchant subsystem 200 at step 504. Any suitable data may be generated and/or communicated by electronic device 100 to merchant subsystem 200 at step 504 as merchant validation session initiation data for initiating a merchant online resource validation session for a particular secure data transaction to be carried out. For example, a validation session identifier may be generated by device 100 and communicated to merchant subsystem 200 at step 504 as at least a portion of merchant validation session initiation data, where such a validation session identifier may be any suitable alphanumeric string or any other suitable identifier that may uniquely identify the current merchant online resource validation session being initiated (e.g., uniquely identify such to merchant subsystem 200 and/or to commercial entity subsystem 400, at least for a certain period of time). When generated by device 100, a validation session identifier may be unique with respect to commercial entity subsystem 400 by utilizing a unique identifier of device 100 (e.g., device identifier 119 or a unique secure element identifier of secure element 145 of device 100 that may be unique to device 100 (e.g., with respect to commercial entity subsystem 400)) to help generate the validation session identifier. Additionally or alternatively, a challenge request target identifier (e.g., a Challenge Request URL) may be communicated from device 100 to merchant subsystem 200 at step 504 as at least a portion of merchant validation session initiation data, where such a challenge request target identifier may identify an entity that merchant subsystem 200 is to communicate with for validating the merchant (e.g., a URL identifying server 410 of commercial entity subsystem 400 that may work with merchant subsystem 200 for validating the merchant online resource for the particular secure data transaction to be carried out). A device application (e.g., card management application 103b (e.g., a wallet application)) may have such a challenge request target identifier programmed as part of any suitable operating system or application update that may be controlled by commercial entity subsystem 400, such that the challenge request target identifier may be updated on device 100 by commercial entity subsystem 400 at any suitable time. Additionally or alternatively, such merchant validation session initiation data may include any other suitable data, such as any suitable data indicative of a request to the merchant to validate itself, any suitable data indicative of device 100 (e.g., device identifier 119), and/or any suitable data indicative of the particular secure data transaction to be carried out (e.g., any suitable data from the potential transaction data of step 502, such as specific merchant information (e.g., merchant identifier 167), specific transaction information (e.g., currency and value amount and payment type for a financial transaction or type and amount of health care data for a health transaction), and/or a unique merchant-based transaction identifier. Any suitable merchant validation session initiation data may be communicated by device 100 to merchant subsystem 200 at step 504 in any suitable manner (e.g., such merchant validation session initiation data may be transmitted from communications component 106 of device 100 to server 210 of merchant subsystem 200 via communications path 15 using any suitable communications protocol or via a contactless proximity-based communication channel between NFC component 120 and terminal 220 using any suitable communications protocol).

At step 506 of process 500, in response to merchant subsystem 200 receiving any suitable merchant validation session initiation data from device 100 at step 504 for initiating a validation session, merchant subsystem 200 may be operative to communicate with commercial entity subsystem 400 for validating the merchant online resource. In some embodiments, where the merchant validation session initiation data of step 504 does not include a validation session identifier, merchant subsystem 200 may be operative to generate such a validation session identifier that may uniquely identify the current merchant online resource validation session being initiated. When generated by merchant subsystem 200, a validation session identifier may be unique with respect to commercial entity subsystem 400 by merchant subsystem 200 ensuring that it does not use the same validation session identifier twice, at least with respect to the same commercial entity subsystem and/or with respect to the same merchant identifier and/or within a certain period of time adequate to ensure that session identifier isn't pending for any particular process at a commercial entity subsystem. Step 506 may include any suitable number of sub-processes that may enable commercial entity subsystem 400 to validate the merchant online resource for the particular secure data transaction to be carried out (e.g., as identified at steps 502 and 504). As described in detail with respect to steps 614-622 of process 600 of FIG. 6, the validation of step 506 may include merchant subsystem 200 communicating to commercial entity subsystem 400 (e.g., as may be identified by the merchant validation session initiation data from device 100 at step 504) a challenge request that may include a merchant identifier associated with the merchant online resource to be validated (e.g., merchant identifier 167 as registered at step 501, which may be a domain of a merchant online web resource), a validation session identifier (e.g., as generated by device 100 at step 504 or by merchant subsystem 200 at step 506), and any other suitable data (e.g., data identifying device 100 and/or data identifying the particular secure data transaction to be carried out). Such a challenge request may be signed by merchant subsystem 200 (e.g., in an HTTP header or otherwise) with a merchant key associated with the merchant identifier of the challenge request (e.g., a merchant key 157 as registered at step 501 with merchant identifier 167 (e.g., for the merchant online resource 113 to be validated)). Commercial entity subsystem 400 may be operative to receive such a challenge request, validate the merchant online resource 113 identified by the merchant identifier 167 of the challenge request (e.g., to confirm that the merchant online resource 113 was registered at step 501 (e.g., by identifying that merchant identifier 167 in table 430) and that it is still valid), and then validating the signature of the challenge request (e.g., using the merchant key 157 associated with that identified merchant identifier 167 in table 430). In response to validating the elements of the challenge request, commercial entity subsystem 400 may generate challenge data (e.g., any suitable random data via entropy), store the challenge data against identifier data (e.g., one or both of the validation session identifier of the challenge request and a merchant identifier of the merchant) in any suitable data structure (e.g., table 430 or otherwise), encrypt the challenge data using a merchant key 157 accessible by commercial entity subsystem 400 (e.g., the merchant key from table 430 used to validate the signature of the challenge request), and then communicate challenging data to merchant subsystem 200 that may include the encrypted challenge data along with any other suitable data, such as a hash of the merchant key used to encrypt the challenge data (e.g., a hash version of a public merchant key 157 of table 430 that may be used by merchant subsystem 200 to identify the proper merchant key 157 (e.g., private key 157 of merchant subsystem 200 for decrypting the challenge data), which may be provided to assist a merchant that may have multiple registered merchant online resources and/or multiple merchant keys), the validation session identifier of the challenge request, and/or the like. In response to receiving such challenging data, merchant subsystem 200 may be operative to decrypt the encrypted challenge data using the appropriate merchant key 157 (e.g., a private merchant key 157 at merchant subsystem 200 as may have been registered at step 501), and then communicate challenge response data including the decrypted challenge data along with any other suitable data, such as the validation session identifier of the challenge request and the appropriate merchant identifier, to commercial entity subsystem 400, where that challenge response may be signed by merchant subsystem 200 (e.g., in an HTTP header or otherwise) with a merchant key associated with the merchant identifier of the challenge request (e.g., merchant key 157 as registered at step 501 with merchant identifier 167 (e.g., for the merchant online resource 113 to be validated)). In response to receiving such challenge response data, commercial entity subsystem 400 may be operative to validate the signature of the challenge response (e.g., using the merchant key 157 associated with the identified merchant identifier 167 in table 430) and to confirm that the decrypted challenge data of the challenge response is stored against the validation session identifier of the challenge response and/or against an identifier of the merchant (e.g., in table 430). In some embodiments, such a stored link between the challenge data and one or both of the validation session identifier and a merchant identifier may be maintained for only a limited amount of time before the link is automatically cleared, such that merchant subsystem 200 may be limited to a certain duration of time within which it must receive challenging data and then send appropriate challenge response data to commercial entity subsystem 400 for validating the merchant online resource for the particular validation session (e.g., commercial entity subsystem 400 may be operative to remove such an association between the challenge data and validation session identifier and/or merchant identifier at commercial entity subsystem 400 after a certain period of time (e.g., remove the link from table 430 no more than 10 minutes (or any other suitable period of time) after the link is created)), which may increase the security of the transaction. Therefore, the validation of a merchant online resource at step 506 for the particular secure data transaction to be carried out (e.g., as identified at steps 502 and 504) may be completed using an association between a merchant key and merchant identifier at commercial entity subsystem 400 (e.g., as registered at step 501). Any suitable data may be communicated between merchant subsystem and commercial entity subsystem 400 at step 506 in any suitable manner (e.g., such data may be transmitted between server 210 of merchant subsystem 200 and server 410 of commercial entity subsystem 400 via communications path 85 using any suitable communications protocol).

At step 508, in response to validating a merchant online resource at step 506 based on a validation session initiated at step 504, commercial entity subsystem 400 may generate validation data and store it against identifier data, such as the validation session identifier of the validation session and/or the merchant identifier. For example, in response to validating the signature of the challenge response and in response to confirming that the challenge data and validation session identifier of the challenge response and/or merchant identifier are also properly linked at commercial entity subsystem 400 (e.g., in table 430), commercial entity subsystem 400 may consume that link (e.g., remove such an association between the challenge data and validation session identifier and/or merchant identifier at commercial entity subsystem 400 (e.g., remove the link from table 430)), generate validation data (e.g., any suitable random data (e.g., a cryptographic nonce (e.g., any suitable random data via entropy))), and then store the validation data against or otherwise in association with the validation session identifier of the challenge request and/or of the challenge response and/or against a merchant identifier of the merchant (e.g., in any suitable data structure, such as table 430 or otherwise) at step 508.

At step 510, in response to validating a merchant online resource at step 506 and then storing any suitable validation data against a validation session identifier and/or merchant identifier at step 508, commercial entity subsystem 400 may communicate validation response data to electronic device 100, where such validation response data may include any suitable data, including, but not limited to, the validation data of step 508, the validation session identifier of step 508, data identifying the merchant online resource validated at step 506 (e.g., merchant identifier 167), and/or any other suitable data. In some embodiments, as shown in FIG. 5, such validation response data may be communicated from commercial entity subsystem 400 directly to electronic device 100 (e.g., via communications path 65 using any suitable communications protocol), where data identifying electronic device 100 (e.g., device identifier 119) may be associated with the validation session identifier (e.g., at step 502 or otherwise) and associated by with the validation of step 506 so that commercial entity subsystem 400 may communicate the validation response data to the proper electronic device 100. Alternatively, in some embodiments, such validation response data may be communicated from commercial entity subsystem 400 to electronic device 100 via merchant subsystem 200, whereby merchant subsystem 200 may receive the validation response data from commercial entity subsystem 400 (e.g., via communications path 85 using any suitable communications protocol) and then pass at least a portion of the validation response data on to electronic device 100 (e.g., via communications path 15 using any suitable communications protocol or as a contactless proximity-based communication). Such validation data may be signed by commercial entity subsystem 400 (e.g., in an HTTP header or otherwise) with an access key associated with commercial entity subsystem 400 that may also be accessible to electronic device 100 (e.g., access key 155*a*, access key 155*b*, CRS 151*k*, and/or ISD key 156*k* of secure element 145 or any key that may be known to a device application (e.g., card management application 103*b*)), such that device 100 may validate the signature upon receiving the signed validation data to confirm that commercial entity subsystem 400 generated the validation data rather than another entity subsystem not trusted by electronic device 100.

At step 512 of process 500, secure device data may be at least partially generated or accessed by device 100 and then, at step 514, such secure device data along with at least a portion of the validation response data received at step 510 and at least a portion of the potential transaction data of step 502 may be communicated to commercial entity subsystem 400 by device 100 as device transaction data. For example, in response to receiving validation response data at step 510 that may be indicative of the validity of the merchant online resource being used for the potential transaction data of step 502, device 100 may be operative to obtain or otherwise identify at step 512 the secure data to be shared with merchant subsystem 200 for carrying out the particular secure data transaction (e.g., generate payment credential data for use in a financial transaction or collect the particular health data to be shared in a health transaction). Then, at step 514, device 100 may communicate that secure data of step 512 along with the validation data and validation session identifier and merchant identifier of the validation response data of step 510 and/or along with any suitable data related to the potential secure data transaction to be carried out (e.g., as may be provided to device 100 by the potential transaction data of step 502, such as specific merchant information (e.g., merchant identifier 167), specific transaction information (e.g., currency and value amount and payment type for a financial transaction or type and amount of health care data for a health transaction), and/or a unique merchant-based transaction identifier) as device transaction data to commercial entity subsystem 400. Therefore, device transaction data communicated from device 100 to commercial entity subsystem 400 at step 514 may include some or all of the potential transaction data of step 502 as well as secure device data of step 512 as well as validation response data of step 510.

Device 100 may encrypt all or at least a portion of the device transaction data of step 514 (e.g., the secure device data of step 512) with a commercial entity key prior to communicating the device transaction data to commercial entity subsystem 400 at step 514. For example, device 100 may encrypt at least a portion of the device transaction data with access key 155a, access key 155b, CRS 151k, CASD 158k, and/or ISD key 156k of secure element 145 or any other key accessible to device 100 (e.g., to processor 102 from any device application 103 or otherwise), which may also be accessible to commercial entity subsystem 400 (e.g., any shared secret between device 100 and commercial entity subsystem 400). In some embodiments, such a commercial entity key or access key may be a commercial entity public key associated with a scheme of commercial entity subsystem 400 and of which commercial entity subsystem 400 may have access to an associated commercial entity private key. Commercial entity subsystem 400 may provide such a commercial entity public key to device 100 in any suitable manner. Device transaction data, whether or not at least partially encrypted and/or signed by any suitable commercial entity key, may be communicated by device 100 to commercial entity subsystem 400 at step 540 in any suitable manner (e.g., such device transaction data may be transmitted from communications component 106 of device 100 to server 410 of commercial entity subsystem 400 via communications path 65 using any suitable communications protocol).

Next, after receiving the device transaction data communicated at step 514, step 516 of process 500 may include commercial entity subsystem 400 validating the validation data of the received device transaction data received at step 514. For example, in response to receiving such device transaction data, commercial entity subsystem 400 may be operative to identify the validation response data from that device transaction data and to confirm that the validation data of that received validation response data is stored (e.g., in table 430) against a validation session identifier of the received device transaction data (e.g., validation response data) and/or against a merchant identifier of the received device transaction data (e.g., validation response data) at step 516. In some embodiments, such a stored link between the validation data and one or both of the validation session identifier and a merchant identifier may be maintained for only a limited amount of time before the link is automatically cleared, such that electronic device 100 may be limited to a certain duration of time within which it must receive validation response data at step 510 and then send device transaction data at step 514 to commercial entity subsystem 400 for enabling the secure device data of that device transaction data to be secured by commercial entity subsystem 400 for carrying out the particular secure data transaction with the validated merchant online resource (e.g., commercial entity subsystem 400 may be operative to remove such an association between the validation data and validation session identifier and/or merchant identifier at commercial entity subsystem 400 after a certain period of time (e.g., remove the link from table 430 no more than 10 minutes (or any other suitable period of time) after the link is created)), which may increase the security of the transaction. Additionally or alternatively, a stored link between the validation data and one or both of the validation session identifier and a merchant identifier may also be associated at step 508 with any suitable specific transaction information that may be made available to commercial entity subsystem 400 by merchant subsystem 200 during step 506 (e.g., as a portion of a challenge request), such as identification of a specific type of secure data to be shared between device 100 and merchant subsystem 200 (e.g., currency and value amount and payment type for a financial transaction (e.g., 5 U.S. dollars using a Visa payment credential provisioned on device 100), type and amount of health care data for a health transaction (e.g., heart rate data of a particular user over the last 3 days as detected or otherwise obtained by device 100), and/or the like), and similar specific transaction information may also be made available to commercial entity subsystem 400 by electronic device 100 as a portion of the device transaction data of step 514, such that step 516 may also include commercial entity subsystem 400 confirming that the specific transaction information currently stored against the validation data received at step 514 (e.g., as stored in table 430 at step 508) is at least similar to a particular degree to the specific transaction information received at step 514, which may increase the security of the transaction. For example, if at step 508, particular validation data is stored against specific transaction information associated with the potential transaction that is indicative of a financial transaction of 5 U.S. dollars, but then specific transaction information received along with that particular validation data by commercial entity subsystem 400 at step 514 is indicative of a financial transaction of 2,000 U.S. dollars, then commercial entity subsystem 400 may be operative to not validate the validation data of the device transaction data due to the magnitude of the discrepancy between the $5 and $2,000 being greater than a particular threshold (e.g., more than a 5% difference). Therefore, even if the validation data and the validation session identifier and/or merchant identifier of the device transaction data received at step 514 are confirmed to be actively linked at commercial entity subsystem 400 (e.g., in table 430), the validation data may not be validated if other data that may be associated with that link is not satisfied by the device transaction data (e.g., if any suitable characteristic of the secure data transaction identified during validation step 506 differs from that identified in the device transaction data of step 514 by any suitable amount (e.g., by more than 10% of a financial transaction currency value, by more than 10% of the time frame for health data, the type of health data is different, etc.)).

At step 518 of process 500, in response to validating the validation data of the device transaction data at step 516, commercial entity subsystem 400 may further secure the secure device data of the device transaction data received at step 514 by encrypting at least the secure device data of the device transaction data using a shared secret with merchant subsystem 200 such that the secure device data may not be received and utilized by any entity other than merchant subsystem 200. For example, in response to validating the validation data of the device transaction data by confirming that the validation data and validation session identifier and/or merchant identifier of the device transaction data were also properly linked at commercial entity subsystem 400 (e.g., in table 430) at step 516, commercial entity subsystem 400 may consume that link (e.g., remove such an association between the validation data and validation session identifier and/or merchant identifier at commercial entity subsystem 400 (e.g., remove the link from table 430)) and proceed to step 518 for further securing the secure device data of the device transaction data. If the device transaction data of step 514 is encrypted with any commercial entity key, commercial entity subsystem 400 may be operative to decrypt such data at step 518 (e.g., server 410 of commercial entity subsystem 400 may receive the device transaction data and then decrypt/unsign that device transaction data (e.g., with access key 155a, access key 155b, CRS 151k, CASD 158k, and/or ISD key 156k of commercial entity subsystem 400)). By communicating the device transaction data between device 100 and commercial entity subsystem 400 in a form that has been encrypted/signed using a commercial entity key known to both device 100 and commercial entity subsystem 400, process 500 may prohibit the communication of that device transaction data from being intercepted and used by an entity that does not have access to the commercial entity key. Moreover, at step 518, commercial entity subsystem 400 may be operative to encrypt or otherwise re-format at least a portion of the device transaction data with a merchant key (e.g., a merchant key 157 that may be associated with merchant subsystem 200 for which the particular transaction is being funded). Such a merchant key may be determined by and accessible to commercial entity subsystem 400 via table 430 (e.g., by identifying a merchant key associated with a merchant identifier of the device transaction data of step 514). The merchant identifier may be received and utilized by commercial entity subsystem 400 at step 518 to identify a particular one of many merchant keys accessible by commercial entity subsystem 400 (e.g., merchant key 157 through leveraging table 430 of commercial entity subsystem 400) and then commercial entity subsystem 400 may use that identified merchant key for encrypting at least a portion of the device transaction data (e.g., at least the secure device data of the device transaction data). By encrypting such secure device data with such a merchant key (e.g., a key that may be known to commercial entity subsystem 400 and merchant subsystem 200 but not to electronic device 100 or any other subsystem of system 1), such secure device data may be secured in such a manner that it may be securely communicated from commercial entity subsystem 400 to merchant subsystem 200 without being intercepted by another entity and used for unintended purposes. The merchant key utilized by commercial entity subsystem 400 at step 518 to encrypt at least the secure device data of the device transaction data may be the same key as the merchant key used by commercial entity subsystem 400 to encrypt the challenge data during the validation of the merchant online resource at step 506 (e.g., a key that may not be available for use by device 100 or any subsystem other than commercial entity subsystem 400 and merchant subsystem 200). Therefore, commercial entity subsystem 400 may be operative to facilitate a secure data transaction between device 100 and merchant subsystem 200 using a merchant online resource that has been recently validated by commercial entity subsystem 400 during a merchant validation session particular to the secure data transaction (e.g., the validation session of steps 504 and 506 and the secure data transaction of steps 516 and 518 may use the same validation session identifier, which may be active or otherwise enabled for a limited amount of time (e.g., a link between the validation session identifier and challenge data and/or a link between the validation session identifier and validation data may be valid at commercial entity subsystem 400 for a limited amount of time (e.g., any suitable amount of time, such as between 30 seconds and 10 minutes)), which may increase the security of the transaction).

Next, at step 520, process 500 may include commercial entity subsystem 400 communicating the secured secure device data of step 518 to device 100 as secured transaction data. For example, such merchant key-encrypted secure device data of the device transaction data may be transmitted as at least a portion of the secured transaction data at step 520 from commercial entity subsystem 400 to device 100 via communications path 65 using any suitable communications protocol. Such secured transaction data may include any suitable data in addition to the merchant key-encrypted secure device data, such as any suitable data of step 502 associated with the transaction, including, but not limited to, (i) specific merchant information, such as identification of a merchant identifier that may identify the particular merchant subsystem 200 that provided the potential transaction data of step 502, (ii) specific transaction information, such as identification of a specific currency or value to be used to pay for a financial transaction, (iii) a unique merchant-based transaction identifier (e.g., as generated by merchant subsystem 200 for association with the transaction being conducted), (iv) a unique device-based transaction identifier (e.g., as generated by device 100 for association with the transaction being conducted), (v) the validation session identifier, and/or the like. Therefore, the secured transaction data communicated from commercial entity subsystem 400 to device 100 at step 520 may include some or all of the potential transaction data of step 502 as well as the secured secure device data.

Next, at step 522 of process 500, device 100 may receive the secured transaction data communicated from commercial entity subsystem 400 at step 520 and may share that secured transaction data with merchant subsystem 200 in any suitable manner. For example, such secured transaction data may be transmitted from communications component 106 of device 100 to server 210 of merchant subsystem 200 via communications path 15 using any suitable communications protocol and/or as a contactless proximity-based communication between NFC component 120 and merchant terminal 220. The secured transaction data that may be communicated to merchant subsystem 200 by device 100 at step 522 (e.g., using merchant online resource 113 (e.g., the same resource as used at step 502)) may include any suitable data in addition to the merchant key-encrypted secure device data of step 520, such as any suitable data associated with the transaction, including, but not limited to, (i) specific merchant information, such as identification of a merchant identifier that may identify the particular merchant subsystem 200 that provided the potential transaction data of step 502, (ii) specific transaction information, such as identification of a specific currency or value to be used to pay for a financial transaction, (iii) a unique merchant-based transaction identifier (e.g., as generated by merchant subsystem 200 for association with the transaction being conducted), (iv) a unique device-based transaction identifier (e.g., as generated by device 100 for association with the transaction being conducted), (v) the validation session identifier, and/or the like. Therefore, the secured transaction data shared with merchant subsystem 200 at step 522 may include some or all of the potential transaction data of step 502 as well as at least the merchant key-encrypted secure device data of step 518. By communicating the merchant key-encrypted secure device data of the secured transaction data at step 522, process 500 may enable the communication of such merchant key-encrypted secure device data to merchant subsystem 200 for facilitating the particular secure data transaction while preventing the secure device data generated or otherwise identified by device 100 at step 512 from being used by a merchant (or processor) entity that does not have access to the merchant key (e.g., a merchant subsystem other than merchant subsystem 200 or any other subsystem of system 1). Alternatively, although not shown, such secured transaction data may be communicated directly from commercial entity subsystem 400 to merchant subsystem 200, rather than via device 100 at steps 520 and 522, in any suitable manner (e.g., via communications path 85 using any suitable communications protocol), where commercial entity subsystem 400 may leverage any merchant identifier of the device transaction data of step 514 to identify the target merchant subsystem 200. After the merchant key-encrypted secure device data of the secured transaction data has been received by merchant subsystem 200, process 500 may include merchant subsystem 200 utilizing that merchant key-encrypted secure device data for any suitable purpose (e.g., any suitable secure device data processing or handling).

It is understood that the steps shown in process 500 of FIG. 5 are only illustrative and that existing steps may be modified or omitted, additional steps may be added, and the order of certain steps may be altered. It is to be understood that if any validation step of process 500 were to fail, such failure may be communicated to one or more suitable entities. For example, if the validation of a merchant online resource were to fail at step 506 and/or if the validation of the validation data were to fail at step 516, such failure may be shared by commercial entity subsystem 400 with electronic device 100 so that device 100 may cancel the potential transaction with merchant subsystem 200 and potentially remove the merchant online resource from device 100. After a user of device 100 may choose certain secure data to use for a secure data transaction at step 512, the remaining steps of process 500 may occur transparent to that user (e.g., steps 514-522 may occur without any further user interaction with device 100 and may seem instantaneous to a user of device 100). Process 500 may appear to a user of device 100 as if, after step 512, secure device data is automatically and instantaneously sent to merchant subsystem 200 and the status of the transaction may be confirmed to device 100 (e.g., by merchant subsystem 200 and/or commercial entity subsystem 400). Additionally or alternatively, the validation of a merchant online resource may occur transparent to device 100 (e.g., steps 506-510 if not also step 504 may occur without any user interaction with device 100 and may seem instantaneous to a user of device 100 after step 502). Alternatively, in some embodiments, process 500 may occur altogether transparent to a user of device 100 (e.g., where device 100 may be configured to automatically determine when a secure device transaction ought to occur and to automatically receive validation response data and/or to automatically send device transaction data and/or to automatically receive and/or send secured transaction data for a secure device transaction without any active user interaction with device 100).

Figure 6:
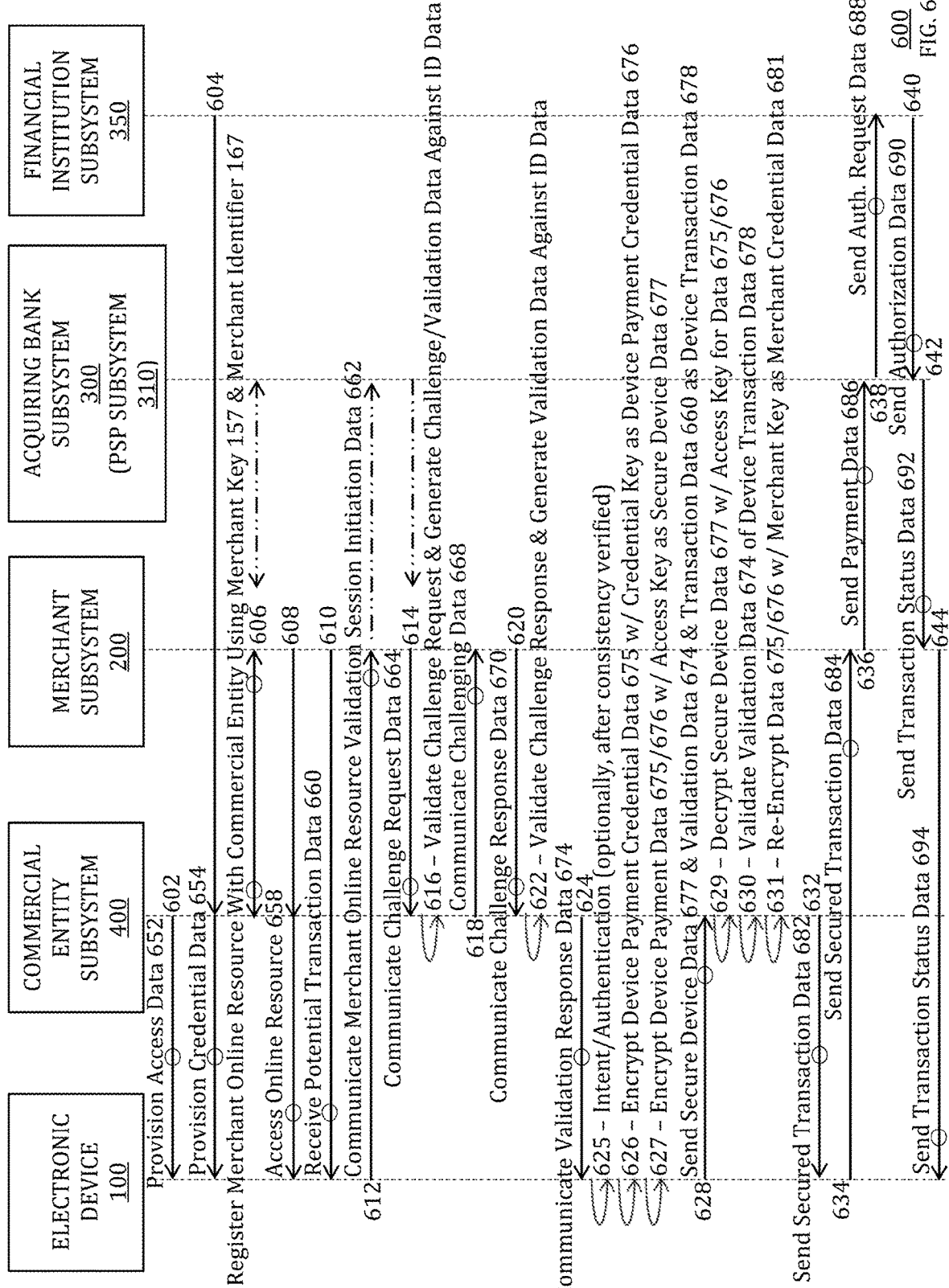

Description of FIG. 6

FIG. 6 is a flowchart of an illustrative process 600 for validating online access to secure device functionality for conducting a financial transaction. Process 600 is shown being implemented by electronic device 100, merchant subsystem 200, acquiring bank subsystem 300, commercial entity subsystem 400, and financial institution subsystem 350. However, it is to be understood that process 600 may be implemented using any other suitable components or subsystems. Process 600 may provide a seamless user experience for securely and efficiently conducting a financial transaction with merchant subsystem 200 using a payment credential from device 100. To facilitate the following discussion regarding the operation of system 1 for conducting a financial transaction according to process 600 of FIG. 6, reference is made to various components of system 1 of the schematic diagrams of FIGS. 1-4, and to front views of screens 190-190d of FIGS. 3-3D that may be representative of a graphical user interface of device 100 (e.g., a GUI as may be provided by merchant online resource 113 or any suitable application of device 100) during such a transaction. The operations described may be achieved with a wide variety of graphical elements and visual schemes. Therefore, the embodiments of FIGS. 3-3D are not intended to be limited to the precise user interface conventions adopted herein. Rather, embodiments may include a wide variety of user interface styles. While process 600 is at least partially described in the context of validating merchant subsystem 200 for enabling access to secure payment functionality of electronic device 100 by merchant subsystem 200, it is to be understood that many if not all portions of process 600 may be utilized for validating any suitable third party subsystem for enabling access to any secure functionality of device 100 by that third party subsystem (e.g., location data, health data, or any other private data or otherwise that ought not be shared with or received from third party subsystems that have not been effectively validated).

Process 600 may begin at step 602, where access data 652 (e.g., access data 652 of FIG. 1A) may be provisioned on device 100 by commercial entity subsystem 400. For example, an access SSD (e.g., SSD 154b) may be provisioned on secure element 145 of device 100 as access data 652 from server 410 of commercial entity subsystem 400 in order to more securely enable device 100 to conduct a transaction with merchant subsystem 200. As mentioned, access SSD 154b may be at least partially provisioned on secure element 145 of device 100 directly from commercial entity subsystem 400 (e.g., as access data 652 via communication path 65 between server 410 of commercial entity subsystem 400 and communications component 106 of device 100, which may then be passed to secure element 145 from communications component 106 (e.g., via bus 118)). Access data 652 via path 65 may be provisioned on secure element 145 of device 100 as at least a portion or all of an access SSD 154b and may include access applet 153b and/or access key 155b. Step 602 may be at least partially carried out when device 100 is initially configured (e.g., by commercial entity subsystem 400 before device 100 is sold to a user). Alternatively or additionally, step 602 may be at least partially carried out in response to a user of device 100 initially setting up secure element 145 of NFC component 120. Additionally or alternatively, access data 652 may include ISD key 156k for ISD 152 of secure element 145 and may be used in addition to or as an alternative to access key 155b for enabling secure transmissions between commercial entity subsystem 400 and device 100. Additionally or alternatively, access data 652 may include CRS 151k of CRS 151 and/or CASD 158k of CASD 158 of secure element 145 of device 100 and may be used in addition to or as an alternative to access key 155b and/or access key 155a and/or ISD key 156k for enabling secure transmissions between commercial entity subsystem 400 and device 100 (e.g., for use as any suitable commercial entity key or shared secret between commercial entity subsystem 400 and device 100). Alternatively or additionally, access data 652 may include any other suitable commercial entity key or shared secret between commercial entity subsystem 400 and device 100 that may not be stored on a secure element of device 100 but that may be accessible to other portions of device 100, such as processor 102 via memory 104.

At step 604 of process 600, financial (or issuer or transaction) institution subsystem 350 may provision credential data 654 (e.g., credential data 654 of FIG. 1A) on device 100, in some embodiments, via commercial entity subsystem 400. For example, such credential data 654 may be at least partially provisioned on secure element 145 of device 100 directly from financial institution subsystem 350 (e.g., via communication path 75 of FIG. 1A between financial institution subsystem 350 and device 100, which may be passed to secure element 145 via communications component 106). Additionally or alternatively, such credential data 654 may be at least partially provisioned on secure element 145 of device 100 from financial institution subsystem 350 via commercial entity subsystem 400 (e.g., via communication path 55 of FIG. 1A between financial institution subsystem 350 and commercial entity subsystem 400, which may be passed to device 100 as credential data 654 via communication path 65 of FIG. 1A between server 410 of commercial entity subsystem 400 and communications component 106 of device 100, which may then be passed to secure element 145 from communications component 106 (e.g., via bus 118)). Credential data 654 via path 75 and/or via path 65 may be provisioned on secure element 145 of device 100 as at least a portion or all of credential SSD 154a and may include credential applet 153a with credential information 161a and/or credential key 155a' and/or key 155ak. Step 604 may be at least partially carried out when a user of device 100 selects a particular credential to be provisioned on device 100. In some embodiments, credential data 654 may also include access key 155a, which may be initially provided from commercial entity subsystem 400 to financial institution subsystem 350 and/or may be added by commercial entity subsystem 400. In some embodiments, such credential data 654 may include the primary account number as at least a portion of credential information of the payment credential being provisioned (e.g., credential information 161a of applet 153a), an AID (e.g., AID 155aa for applet 153a of the data of the payment credential being provisioned at SSD 154a), an SSD identifier, and/or an SSD counter.

The credential data provisioned on device 100 may include all data necessary to make a payment with that credential when it is a financial or payment credential, such as, for example, a primary account number ("PAN"), a card security code (e.g., a card verification code ("CVV")), PAN expiration date, name associated with the credential, and the like, as well as other data that may be operative for device 100 to generate appropriate crypto data (e.g., any suitable shared secret and any suitable cryptographic algorithm or cipher whose functional output may be at least partially determined by the shared secret). A "virtual" credential or virtual PAN or device PAN ("D-PAN") may be provisioned on device 100 rather than the user's "actual" credential or actual PAN or funding PAN ("F-PAN"). For example, once it is determined that a credential is to be provisioned on device 100, it may be requested (e.g., by financial institution subsystem 350, by commercial entity subsystem 400, and/or by a user of device 100) that a virtual credential be generated, linked to the actual credential, and provisioned on device 100 instead of the actual credential. Such creation and linking of a virtual credential with an actual credential may be performed by any suitable component of financial institution subsystem 350. For example, a payment network subsystem 360 (e.g., a particular payment network subsystem 360 that may be associated with the brand of the actual credential) may define and store a virtual-linking table 312 (e.g., as shown in FIG. 1A) that may create associations between the actual credential and a virtual credential, such that anytime a virtual credential is utilized by device 100 for a financial transaction with merchant subsystem 200 (e.g., after being provisioned on device 100), payment network subsystem 360 may receive an authorization or validation request or otherwise attempt to validate any received data indicative of that virtual credential (e.g., at step 640 in response to receiving data 688 at step 638) and may conduct an analysis of that validation attempt request in light of the actual credential associated with the virtual credential as determined by table 312. Alternatively, such a table may be accessible and/or similarly leveraged by an appropriate issuing bank subsystem 370 or any other suitable subsystem accessible by financial institution subsystem 350. By provisioning a virtual credential on device 100 rather than an actual credential, financial institution subsystem 350 may be configured to limit the fraudulent activity that may result when the virtual credential is intercepted by an unauthorized user, as payment network subsystem 360 may only be configured to utilize table 312 for linking the virtual credential to the actual credential during certain transactions.

At step 606 of process 600, commercial entity subsystem 400 may register merchant subsystem 200. For example, as described with respect to step 501 of process 500, at step 606, a merchant online resource 113 (e.g., native app, domain/URL, or any other suitable web resource, or perhaps even a merchant terminal) of merchant subsystem 200 may be associated with at least one particular merchant identifier 167 and at least one particular merchant key 157, each of which may be securely shared between merchant subsystem 200 and commercial entity subsystem 400 in any suitable manner, and such an association may be accessible to commercial entity subsystem 400 (e.g., in table 430) such that the merchant online resource 113 may be registered with commercial entity subsystem 400. In some embodiments, in order to participate in an online-resource payment program, a merchant may be required to register as a member of a program run by the commercial entity of commercial entity subsystem 400 and/or obtain a merchant certificate. Merchants may not be able to receive payment data without a certificate or other suitable proof of registration. No matter how or where such merchant key(s) and/or merchant identifier(s) may be generated and/or managed, both merchant subsystem 200 and commercial entity subsystem 400 may store a version of a merchant key of any merchant key pair (e.g., in a respective secure element of merchant subsystem 200 and commercial entity subsystem 400). This may enable a shared secret between commercial entity subsystem 400 and merchant subsystem 200 for securely communicating data therebetween. In some embodiments, device 100 may be provided with such a merchant key for securely encrypting payment data with that key on device 100.

At step 608 of process 600, device 100 may access a merchant's online resource 658 (e.g., a merchant online resource 113 of FIG. 1A (e.g., as registered at step 606)). As shown in FIG. 1A, a merchant's resource application 113 may be loaded onto device 100 from commercial entity subsystem 400 (e.g., from application store 420). For example, as shown in FIG. 3, a user of device 100 may select a "Merchant App" icon 183 of a specific screen 190 of GUI 180 using touch screen input component 110f of I/O component 114a, and this selection may be recognized by device 100 as an initiation event for providing the user with the ability to interact with a merchant's third party application 113 (e.g., a native application running at least partially on device 100 as may have been accessed by device 100 via commercial entity subsystem 400 (e.g., as a registered merchant online resource of application store 420)). Alternatively or additionally, such a merchant's resource 658 may be accessed by device 100 directly from merchant subsystem 200 (e.g., via server 210 or terminal 220). In response to such a selection of a merchant application icon, a GUI may provide an interactive screen where device 100 may enable the user to interact with application 113 (e.g., to peruse commercially available items from the merchant for purchase or to determine certain health data or location data to share with the merchant or otherwise). Alternatively, step 608 may include device 100 accessing a merchant's resource 658 as a merchant's web resource from merchant subsystem 200 (e.g., via merchant server 210 or any server at least partially controlled by a merchant entity) using an internet application of device 100, which may also be selectable by an "Internet" icon (e.g., icon 184 of specific screen 190 of GUI 180 of FIG. 3), or a hybrid application with webview for providing the user with the ability to interact with a merchant's webpage or other web resource rather than with a merchant's third party native application. Alternatively, step 608 may include any suitable automatic accessing of resource 658 as merchant online resource 113 without active user input (e.g., device 100 may be operative to automatically interact with resource 658 in response to detecting any suitable event, such as an autonomous home appliance device 100 detecting that it is running low of a particular supply (e.g., a washing machine device 100 in response to detecting a low supply of laundry detergent)).

Next, at step 610, device 100 may receive potential transaction data 660 from the accessed merchant resource (e.g., as described with respect to step 502 of process 500). For example, as shown in FIG. 1A, potential transaction data 660 may be provided to device 100 from merchant subsystem 200 (e.g., from merchant server 210) when device 100 is interacting with the merchant's resource 113 (e.g., third party application or website or any other suitable online resource (e.g., resource 658) of the merchant). Alternatively or additionally, at least a portion of potential transaction data 660 may be locally accessible by device 100 via application 113 local to device 100 (e.g., when application 113 is stored in a memory component or being run by processor 102 of device 100), rather than the data being actively sent to device 100 from merchant server 210 at step 610. For example, when application 113 may be initially stored on device 100 (e.g., at step 608 as merchant's resource 658 (e.g., loaded from application store 420)), at least some of potential transaction data 660 may be generated by that initially stored application 113 absent any additional information provided to device 100 by merchant subsystem 200. Potential transaction data 660 may include any suitable data indicative of any suitable characteristics of a potential financial transaction to occur between a user of device 100 and a merchant of merchant subsystem 200, including, but not limited to, (i) specific merchant information, such as a unique merchant identifier (e.g., an acquiring bank merchant identifier and/or a commercial entity merchant identifier (e.g., merchant identifier 167 as may be registered at step 610)) and/or identification of the particular merchant resource being used (e.g., the particular merchant application 113), (ii) specific transaction information, such as identification of a specific currency to be used to pay for the transaction (e.g., yen, pounds, dollars, etc.) and/or identification of a specific amount of a currency to be paid for the transaction and/or identification of the particular product or service to be purchased or rented or otherwise paid for and/or identification of a default or initial shipping address to be used, (iii) information indicative of the one or more types of payment methods acceptable to the merchant for the transaction (e.g., a list of payment cards that may be used for the purchase (e.g., MasterCard but not Visa)), and/or (iv) a unique merchant-based transaction identifier (e.g., any suitable data element, such as a 3 or 4 character alphanumeric string, that may be randomly or uniquely generated by merchant subsystem 200 for association with the transaction being conducted). Such potential transaction data 660 may include any suitable number and types of data fields, with or without associated data, that may be required or at least used for completing a financial transaction, such as contact information fields (e.g., telephone number, e-mail address, mailing address) of a customer making the purchase, where some fields may be populated and included as part of such potential transaction data 660, and/or where some fields may not be populated as part of such potential transaction data 660 but may be open and awaiting population during process 600. Such potential transaction data 660 of step 610 may be referred to herein as a PKDataRequest or a PKPaymentRequest (e.g., for a financial transaction). Alternatively, as mentioned, a user may not be actively interacting with device 100 in order for potential transaction data 660 associated with merchant subsystem 200 to be made available to device 100 at step 610.

For communication of secure payment data, potential transaction data 660 may include a merchant resource's request for device 100 to produce a payment token for the purchase of products and/or services and may encapsulate any suitable information about the potential transaction including, for example, information about the merchant's payment processing capabilities, an amount to pay, and the currency code. Potential transaction data 660 may also include a list of one or more payment networks (e.g., payment network(s) 360) that may be supported by the merchant such that device 100 may be configured to determine whether any of such listed one or more payment networks has an authorized payment credential on device 100 or on any suitable host device available to device 100 as a client. In some embodiments, once such potential transaction data 660 may be accessed by device 100, as shown in FIG. 3A, for example, a GUI of device 100 may provide screen 190a, where a merchant's resource may use transaction data 660 to show to a user of device 100 any suitable information associated with the potential transaction, such as the name of the merchant (e.g., "Merchant A") with information 307a, the name of the product (e.g., "Product B") with information 307b, the price (e.g., "Price C") with information 307c, and/or initial shipping data (e.g., "Address D") with information 307d. Potential transaction data 660 that may be provided to device 100 by merchant subsystem 200 may be indicative of such information 307a, 307b, 307c, and/or 307d. A user of device 100 may interact with device 100 and screen 190a to adjust certain portions of such information (e.g., shipping address, etc.), which may require updated potential transaction data to be generated and shared by merchant subsystem 200 (e.g., at another instance of step 610). As also shown in FIG. 3A and described below in more detail, screen 190a may also include a secure pay prompt 309. At least a portion of potential transaction data 660 may be provided from merchant subsystem 200 to device 100 via communication path 15 of FIG. 1A and may be received by communications component 106 of device 100. Communications component 106 may pass this potential transaction data 660 on to processor 102 (e.g., for displaying on screen 190a as part of a user interface on device 100 (e.g., for information 307a-307d and 309)) and/or to secure element 145. For example, secure element 145 may utilize at least a portion of such potential transaction data 660 for securely enabling a financial transaction between device 100 and merchant subsystem 200. In some embodiments, potential transaction data 660 may be referred to as merchant payment request data and/or a uniform resource locator ("URL") or any other suitable reference character string and/or query string.

At step 612 of process 600, a merchant online resource validation session may be initiated. As mentioned with respect to step 504 of process 500, step 612 may occur in response to electronic device 100 indicating that the secure data transaction (e.g., the secure data transaction (e.g., financial transaction) identified by potential transaction data 660 of step 610) should occur. This indication may occur in response to a user of device 100 selecting a GUI element (e.g., radio button) of the merchant online resource, such as secure pay prompt 309 of FIG. 3A, for conveying the user's desire to conduct the secure data transaction identified by potential transaction data 660 of the merchant online resource of step 610. Alternatively, this indication may occur automatically based on any suitable requirements being satisfied (e.g., simply in response to potential transaction data 660 of step 610 being communicated to device 100). For example, when this indication occurs, merchant online resource 113 (e.g., a web kit for a web resource) may be operative to send a secure data transaction request to card management application 103b (e.g., a pass kit for a payment secure data transaction) and device 100 (e.g., card management application 103b or any other suitable application of device 100) may then be operative to receive and process such a secure data transaction request and, in response, may then be operative to generate and communicate merchant online resource validation session initiation data 662 to merchant subsystem 200 at step 612.

Any suitable data may be generated and/or communicated by electronic device 100 to merchant subsystem 200 at step 612 as merchant online resource validation session initiation data 662 for initiating a merchant online resource validation session for a particular secure data transaction to be carried out (e.g., the financial transaction identified by data 660 and/or screen 190a of FIG. 3A). For example, a validation session identifier may be generated by device 100 and communicated to merchant subsystem 200 at step 612 as at least a portion of merchant online resource validation session initiation data 662, where such a validation session identifier may be any suitable alphanumeric string or any other suitable identifier that may uniquely identify the current merchant online resource validation session being initiated (e.g., uniquely identify such a session to merchant subsystem 200 and/or to commercial entity subsystem 400, at least for a certain period of time). Additionally or alternatively, a challenge request target identifier (e.g., a Challenge Request URL) may be communicated from device 100 to merchant subsystem 200 at step 612 as at least a portion of merchant online resource validation session initiation data 662, where such a challenge request target identifier may identify an entity that merchant subsystem 200 is to communicate with for validating the merchant (e.g., a URL identifying server 410 of commercial entity subsystem 400 that is to work with merchant subsystem 200 for validating the merchant online resource for the particular secure data transaction to be carried out). A device application (e.g., card management application 103b) may have such a challenge request target identifier programmed as part of any suitable operating system or application update that may be controlled by commercial entity subsystem 400, such that the challenge request target identifier may be updated on device 100 by commercial entity subsystem 400 at any suitable time. Additionally or alternatively, such merchant online resource validation session initiation data 662 may include any other suitable data, such as any suitable data indicative of a request to the merchant to validate itself and/or the specific merchant online resource accessed at step 608 and utilized for receiving potential transaction data 660 at step 610, any suitable data indicative of device 100 (e.g., device identifier 119), and/or any suitable data indicative of the particular secure data transaction to be carried out (e.g., any suitable data from potential transaction data 660 of step 610, such as specific merchant information (e.g., a merchant identifier 167 of the merchant online resource), specific transaction information (e.g., currency and value amount and payment type for the financial transaction), and/or a unique merchant-based transaction identifier. Any suitable merchant online resource validation session initiation data 662 may be communicated by device 100 to merchant subsystem 200 at step 612 in any suitable manner (e.g., such merchant online resource validation session initiation data 662 may be transmitted from communications component 106 of device 100 to server 210 of merchant subsystem 200 via communications path 15 using any suitable communications protocol or via a contactless proximity-based communication channel between terminal 220 and NFC component 120 using any suitable communications protocol).

At step 614 of process 600, in response to merchant subsystem 200 receiving any suitable merchant online resource validation session initiation data 662 from device 100 at step 612 for initiating a validation session of merchant online resource 113, merchant subsystem 200 may be operative to communicate any suitable challenge request data 664 to commercial entity subsystem 400 for validating the merchant online resource for the particular secure data transaction to be carried out (e.g., the financial payment transaction as identified at step 610 and/or step 612). Challenge request data 664 communicated from merchant subsystem 200 to commercial entity subsystem 400 at step 614 may include any suitable data for attempting to prove the validity of merchant subsystem 200 (e.g., merchant resource 113) to commercial entity subsystem 400, including, but not limited to, a merchant identifier associated with the merchant online resource to be validated (e.g., at least one merchant identifier 167 as registered at step 606, which may be a domain of a merchant online web resource), a validation session identifier (e.g., as generated by device 100 at step 504 or by merchant subsystem 200 at step 506), and any other suitable data (e.g., data identifying device 100 and/or data identifying the particular secure data transaction to be carried out). For example, a merchant identifier of challenge request data 664 may be any suitable merchant identifier 167 associated with the merchant online resource used at step 610 that initiated the current merchant online resource validation session. When merchant online resource validation session initiation data 662 of step 612 includes a validation session identifier (e.g., as generated by device 100), then that validation session identifier may be provided by merchant subsystem as at least a portion of challenge request data 664 at step 614. However, when merchant online resource validation session initiation data 662 of step 612 does not include a validation session identifier or when a merchant online resource validation session may be initiated by merchant subsystem 200 automatically (e.g., in response to communicating potential transaction data 660 of step 610) and not in response to any merchant online resource validation session initiation data 662 of any step 612, merchant subsystem 200 may be operative to generate such a validation session identifier that may uniquely identify the current merchant online resource validation session being initiated and may then be operative to include that validation session identifier as at least a portion of challenge request data 664 at step 614. In some embodiments, any suitable additional information that may be specific to the particular to secure data transaction to be carried out (e.g., the financial payment transaction as identified at step 610 and/or step 612) may be provided as at least a portion of challenge request data 664 at step 614, including, but not limited to, information indicative of "Product B") of information 307b of the potential transaction data, "Price C" of information 307c of the potential transaction data, shipping data "Address D" of information 307d of the potential transaction data, payment credential identification "Credential X" information 313 of the potential transaction data, and/or any other suitable information associated with the secure data transaction to be carried out that may be appropriate to share with commercial entity subsystem 400 (e.g., in light of any privacy concerns about any of the data), such as "heart rate information from the last three days" but not the actual heart rate information if the secure data transaction to be carried out is a health data transaction. Such information that may be specific to the particular to secure data transaction, which may be referred to herein as potential transaction identification information, may be used during any suitable portions of process 600 for providing any additional layer(s) of security to the current data transaction process and/or for providing any additional security (e.g., fraud detection) services for future data transactions. Challenge request data 664 may be signed by merchant subsystem 200 (e.g., in an HTTP header or otherwise) with a merchant key available to merchant subsystem 200 and associated with the merchant identifier of the challenge request (e.g., a merchant key 157 as registered at step 606 with merchant identifier 167 (e.g., for the merchant online resource 113 to be validated)) such that challenge request data 664 may be effectively utilized by commercial entity subsystem 400 for validating merchant online resource 113. Any suitable challenge request data 664 may be communicated by merchant subsystem 200 to commercial entity subsystem 400 at step 614 in any suitable manner (e.g., such challenge request data 664 may be transmitted from server 210 of merchant subsystem 200 to server 410 of commercial entity subsystem 400 via communications path 85 using any suitable communications protocol). Such communication of challenge request data 664 may be properly addressed to commercial entity subsystem 400 based on a challenge request target identifier (e.g., a Challenge Request URL) that may be communicated from device 100 to merchant subsystem 200 at step 612 as at least a portion of merchant online resource validation session initiation data 662. Alternatively or additionally, such communication of challenge request data 664 may be properly addressed to commercial entity subsystem 400 based on a challenge request target identifier (e.g., a Challenge Request URL) that may be available to merchant subsystem 200 and associated with potential transaction data 660 of step 610 (e.g., an identifier identifying commercial entity subsystem 400 may be associated with any code (e.g., java script code for a web resource) or otherwise that may be made available to merchant subsystem 200 to provide any suitable "secure transaction" prompt in a merchant online resource (e.g., secure pay prompt 309 of FIG. 3A)).

At step 616 of process 600, in response to commercial entity subsystem 400 receiving any suitable challenge request data 664 from merchant subsystem 200 at step 614, commercial entity subsystem 400 may be operative to validate the merchant online resource 113 identified by the merchant identifier 167 of the challenge request. For example, at step 616, commercial entity subsystem 400 may be operative to attempt to confirm that the merchant online resource 113 identified by a merchant identifier 167 of received challenge request data 664 is a valid and registered merchant online resource at commercial entity subsystem 400, which may be confirmed by identifying that merchant identifier 167 in table 430 (e.g., to determine that the merchant identifier 167 has been registered with commercial entity subsystem 400 (e.g., at step 606) and that such registration is still valid (e.g., that commercial entity subsystem 400 has not removed merchant identifier 167 from table 430 or flagged merchant identifier 167 in table 430 for being suspicious or otherwise no longer trusted and/or that a certificate associated with the merchant identifier 167 (e.g., in table 430) is still valid)) and/or by identifying a domain associated with or identified by that merchant identifier 167 and re-verifying that domain by re-verifying a file that may be hosted on that domain (e.g., as described with respect to step 501 and/or step 606), where such re-verification may alternatively or additionally be carried out by commercial entity subsystem 400 at any suitable time (e.g., periodically or otherwise) and not necessarily at step 616 in response to receiving data 664. Additionally or alternatively, at step 616, commercial entity subsystem 400 may be operative to attempt to validate the signature of received challenge request data 664, which may be done by identifying a merchant key 157 that may be associated with a merchant identifier 167 of received challenge request data 664 in table 430 or otherwise at commercial entity subsystem 400 (e.g., an association that may have been made during the registration of step 606) and then utilizing that identified merchant key 157 to validate the signature of received challenge request data 664 (e.g., to confirm that the merchant key 157 accessible to commercial entity subsystem 400 is one of a paired key set along with the merchant key 157 accessible to merchant subsystem 200 that may have been used by merchant subsystem 200 to sign challenge request data 664 prior to communicating challenge request data 664 to commercial entity subsystem 400 at step 614 (e.g., one of the keys may be a public key and the other may be a private key of the paired key set)), which may ensure possession by merchant subsystem 200 of the merchant key 157 that may be required for use by merchant subsystem 200 in later portion(s) of process 600 (e.g., at step 636, where merchant subsystem 200 may decrypt data previously encrypted by commercial entity subsystem 400). After any suitable validation of received challenge request data 664 by commercial entity subsystem 400 (e.g., after validation of a merchant identifier and/or signature of received challenge request data 664), commercial entity subsystem 400 may also be operative, at step 616, to generate any suitable challenge data and to store that challenge data against any suitable identifier data of the received challenge request data 664. For example, after any suitable validation of received challenge request data 664, commercial entity subsystem 400 may be operative to generate any suitable challenge data (e.g., any suitable random data via entropy) and then store that challenge data against one or both of the validation session identifier of challenge request data 664 and a merchant identifier of challenge request data 664) in any suitable data structure (e.g., in table 430 or otherwise) accessible to commercial entity subsystem 400. Such a stored link or association between such challenge data and identifier data of the validation session (e.g., the validation session identifier and/or the merchant identifier of challenge request data 664) may be later used by commercial entity subsystem 400 to further validate the merchant online resource of the validation session (e.g., at step 622) and/or to further secure the secure data transaction to be carried out (e.g., at step 630). Moreover, in some embodiments, any or all of the potential transaction identification information of challenge request data 664 may also be stored against or otherwise associated with the challenge data and identifier data.

At step 618 of process 600, in response to commercial entity subsystem 400 validating received challenge request data 664 and generating challenge data against identifier data of the validation session at step 616, commercial entity subsystem 400 may be operative to encrypt the challenge data of step 616 using any suitable key or otherwise and then may be operative to communicate that encrypted challenge data along with any other suitable data as challenging data 668 to merchant subsystem 200. For example, commercial entity subsystem 400 may encrypt the challenge data using any suitable merchant key 157 that may be accessible to commercial entity subsystem 400 and associated with a merchant identifier 167 of received challenge request data 664 (e.g., in table 430 or otherwise at commercial entity subsystem 400 (e.g., an association that may have been made during the registration of step 606)), where such a merchant key 157 used by commercial entity subsystem 400 for encryption of the challenge data at step 618 may be the same merchant key 157 as or a different merchant key 157 than the merchant key 157 that may have been used by commercial entity subsystem 400 to validate challenge request data 664 at step 616. In addition to such encrypted challenge data, any other suitable data may be included as a portion of challenging data 668 communicated by commercial entity subsystem 400 to merchant subsystem 200 at step 618, including, but not limited to, a hash of the merchant key 157 used by commercial entity subsystem 400 to encrypt the challenge data (e.g., a hash version of a public merchant key 157 of table 430 that may be received and used by merchant subsystem 200 to identify the proper merchant key 157 (e.g., private key 157 of merchant subsystem 200 for decrypting the challenge data), which may be provided to assist a merchant that may have multiple registered merchant online resources and/or multiple merchant keys), the validation session identifier of challenge request data 664, the merchant identifier of challenge request data 664, the merchant identifier associated at commercial entity subsystem 400 (e.g., in table 430) with the merchant key 157 used by commercial entity subsystem 400 for encryption of the challenge data, and/or the like. Any suitable challenging data 668 may be communicated by commercial entity subsystem 400 to merchant subsystem 200 at step 618 in any suitable manner (e.g., such challenging data 668 may be transmitted from server 410 of commercial entity subsystem 400 to server 210 of merchant subsystem 200 via communications path 85 using any suitable communications protocol).

At step 620 of process 600, in response to merchant subsystem 200 receiving such challenging data 668 at step 618, merchant subsystem 200 may be operative to process received challenging data 668 and then generate and communicate challenge response data 670 to commercial entity subsystem 400 for further validating merchant subsystem 200 during the current validation session. For example, at step 620, merchant subsystem 200 may be operative to decrypt the encrypted challenge data of received challenging data 668 using any suitable merchant key 157 available to merchant subsystem 200 (e.g., a merchant key 157 as registered at step 606 with a merchant identifier 167 (e.g., for the merchant online resource 113 being validated during the current validation session)). Such a merchant key 157 used by merchant subsystem 200 for decryption of the encrypted challenge data at step 620 may be identified by merchant subsystem 200 using any hash key information of challenging data 668 and/or by using any merchant identifier of challenging data 668 and/or by using any merchant identifier of challenge request data 664 (e.g., as may be associated with a common session identifier of data 664 and data 668). Such a merchant key 157 used by merchant subsystem 200 for decryption of the encrypted challenge data at step 620 may be the same merchant key 157 as or a different merchant key 157 than the merchant key 157 that may have been used by merchant subsystem 200 to sign challenge request data 664 at step 614. After decrypting the encrypted challenge data of the received challenging data 668, merchant subsystem 200 may also be operative to generate and communicate challenge response data 670 from merchant subsystem 200 to commercial entity subsystem 400 at step 620, where challenge response data 670 may include the challenge data as decrypted by merchant subsystem 200 for further attempting to prove the validity of merchant subsystem 200 (e.g., merchant resource 113) to commercial entity subsystem 400 along with any other suitable data, including, but not limited to, the validation session identifier of the current validation session (e.g., the valid session identifier of challenge request data 664 and/or of received challenging data 668), a merchant identifier associated with the merchant online resource being validated by the current validation session (e.g., the merchant identifier of challenge request data 664, the merchant identifier associated at commercial entity subsystem 400 (e.g., in table 430) with the merchant key 157 used by commercial entity subsystem 400 for encryption of the challenge data, and/or the like), any or all suitable potential transaction identification information for the secure data transaction to be carried out that may or may not have been included in challenge request data 664 of step 614, and/or the like. Challenge response data 670 may be signed by merchant subsystem 200 (e.g., in an HTTP header or otherwise) with a merchant key available to merchant subsystem 200 (e.g., a merchant key 157 as registered at step 606 with a merchant identifier 167 (e.g., for the merchant online resource 113 currently being validated)) such that challenge response data 670 may be effectively utilized by commercial entity subsystem 400 for further validating merchant online resource 113. Such a merchant key 157 that may be used by merchant subsystem 200 for signing challenge response data 670 at step 620 may be the same merchant key 157 as or a different merchant key 157 than the merchant key 157 that may have been used by merchant subsystem 200 to sign challenge request data 664 at step 614. Additionally or alternatively, such a merchant key 157 that may be used by merchant subsystem 200 for signing challenge response data 670 at step 620 may be the same merchant key 157 as or a different merchant key 157 than the merchant key 157 that may have been used by merchant subsystem 200 to decrypt the encrypted challenge data at step 620. Any suitable challenge response data 670 may be communicated by merchant subsystem 200 to commercial entity subsystem 400 at step 620 in any suitable manner (e.g., such challenge response data 670 may be transmitted from server 210 of merchant subsystem 200 to server 410 of commercial entity subsystem 400 via communications path 85 using any suitable communications protocol).

At step 622 of process 600, in response to commercial entity subsystem 400 receiving any suitable challenge response data 670 from merchant subsystem 200 at step 620, commercial entity subsystem 400 may be operative to validate further merchant subsystem 200 and its merchant online resource of interest in the current validation session. For example, at step 622, commercial entity subsystem 400 may be operative to attempt to validate the signature of received challenge response data 670, which may be done by identifying a merchant key 157 that may be associated with a validation session identifier of received challenge response data 670 in table 430 or that may be associated with a merchant identifier 167 of received challenge response data 670 in table 430 or otherwise at commercial entity subsystem 400 (e.g., an association that may have been made during the registration of step 606) and then utilizing that identified merchant key 157 to validate the signature of received challenge response data 670 (e.g., to confirm that the merchant key 157 accessible to commercial entity subsystem 400 is one of a paired key set along with the merchant key 157 accessible to merchant subsystem 200 that may have been used by merchant subsystem 200 to sign challenge response data 670 prior to communicating challenge response data 670 to commercial entity subsystem 400 at step 620 (e.g., one of the keys may be a public key and the other may be a private key of the paired key set)). Such a merchant key 157 that may be used by commercial entity subsystem 400 for validating the signature of challenge response data 670 at step 622 may be the same merchant key 157 as, or a different merchant key 157 than, the merchant key 157 that may have been used by commercial entity subsystem 400 for validating the signature of challenge request data 664 at step 616, and/or such a merchant key 157 that may be used by commercial entity subsystem 400 for validating the signature of challenge response data 670 at step 622 may be the same merchant key 157 as, or a different merchant key 157 than, the merchant key 157 that may have been used by commercial entity subsystem 400 for encrypting the challenge data at step 618. Additionally or alternatively, at step 622, commercial entity subsystem 400 may be operative to attempt to confirm that the decrypted challenge data of received challenge response data 670 is valid challenge data. For example, commercial entity subsystem 400 may be operative to attempt to confirm that the decrypted challenge data of received challenge response data 670 is currently stored or otherwise independently accessible to commercial entity subsystem 400 (e.g., in table 430). In some embodiments, commercial entity subsystem 400 may determine the validity of the decrypted challenge data of received challenge response data 670 by identifying that same challenge data being currently stored in table 430. Alternatively, commercial entity subsystem 400 may determine the validity of the decrypted challenge data of received challenge response data 670 by identifying that same challenge data as being currently stored in table 430 against any suitable identifier data of received challenge response data 670 (e.g., against a validation session identifier or a merchant identifier), as may have been stored in table 430 at step 616. In some embodiments, such a stored link between the challenge data and one or both of the validation session identifier and a merchant identifier, or such stored challenge data itself, may be maintained by commercial entity subsystem 400 for only a limited amount of time before the link or stored data is automatically cleared, such that merchant subsystem 200 may be limited to a certain duration of time within which it must receive challenging data 668 and then send appropriate challenge response data 670 to commercial entity subsystem 400 for validating the merchant online resource for the particular validation session (e.g., commercial entity subsystem 400 may be operative to remove such an association between the challenge data and validation session identifier and/or merchant identifier at commercial entity subsystem 400 after a certain period of time (e.g., remove the link or challenge data from table 430 no more than 10 minutes after the link or challenge data is created), which may increase the security of the transaction). Therefore, the validation of a merchant online resource at any or all of steps 614-622 for the particular secure data transaction to be carried out (e.g., as identified at step 610 and/or step 612) may be completed using one or more associations between a merchant key and merchant identifier at commercial entity subsystem 400 (e.g., as registered at step 608).

After any suitable validation of received challenge response data 670 by commercial entity subsystem 400 (e.g., after validation of a signature of received challenge response data 670 and/or after validation of decrypted challenge data of received challenge response data 670), commercial entity subsystem 400 may also be operative, at step 622, to generate any suitable validation data and to store that validation data against any suitable identifier data of the received challenge request data 664 and/or of the received challenge response data 670. For example, after any suitable validation of received challenge request data 664 and/or of received challenge response data 670, commercial entity subsystem 400 may be operative to generate any suitable validation data (e.g., any suitable random data via entropy and/or any suitable cryptographic nonce) and then store that validation data against one or both of the validation session identifier and a merchant identifier of any one or both of challenge request data 664 and challenge response data 670 in any suitable data structure (e.g., in table 430 or otherwise) accessible to commercial entity subsystem 400. Such a stored link or association between such validation data and identifier data of the validation session (e.g., the validation session identifier and/or a merchant identifier of challenge request data 664 and/or of challenge response data 670) may be later used by commercial entity subsystem 400 to further secure the secure data transaction to be carried out (e.g., at step 630). Moreover, in some embodiments, any or all of the potential transaction identification information of challenge request data 664 and/or of challenge response data 670 may also be stored against or otherwise associated with the validation data and identifier data.

In response to validating decrypted challenge data of received challenge response data 670 by confirming that the challenge data is linked with identifier information (e.g., validation session identifier and/or merchant identifier information) at commercial entity subsystem 400 (e.g., in table 430), commercial entity subsystem 400 may be operative, at step 622, to consume that link (e.g., remove such an association between the challenge data and validation session identifier and/or merchant identifier at commercial entity subsystem 400 (e.g., remove the link from table 430)), generate validation data (e.g., any suitable random data (e.g., a cryptographic nonce (e.g., any suitable random data via entropy))), and then store the validation data against or otherwise in association with any suitable identifier information (e.g., the validation session identifier of the challenge request and/or of the challenge response and/or against a merchant identifier of the challenge request and/or of the challenge response) at commercial entity subsystem 400 (e.g., in any suitable data structure, such as table 430 or otherwise). Alternatively, in response to validating decrypted challenge data of received challenge response data 670 by confirming that the challenge data is linked with identifier information (e.g., validation session identifier and/or merchant identifier information) at commercial entity subsystem 400 (e.g., in table 430), commercial entity subsystem 400 may be operative, at step 622, to maintain that link or otherwise update that link (e.g., reset any timer that may be associated with that link or add any additional potential transaction identification information for association with the link) at commercial entity subsystem 400 (e.g., in table 430)), and then utilize the challenge data of that link (e.g., as generated at step 616) as the validation data that may otherwise be generated at step 622. In some embodiments, the challenge data and the validation data may be different with respect to size or any other suitable property or properties as the use of challenge data at steps 618-622 may be different than the use of validation data at steps 624-630.

At step 624 of process 600, in response to commercial entity subsystem 400 validating received challenge request data 664 and/or validating received challenge response data 670 and generating or otherwise defining validation data against identifier data of the validation session at step 622, commercial entity subsystem 400 may be operative to generate and communicate any suitable validation response data 674. For example, validation response data 674 may include the validation data of step 622 along with any other suitable data, including, but not limited to, the validation session identifier (e.g., the validation session identifier of challenge request data 664 and/or of challenge response data 670 and/or as may otherwise be associated with the validation session), a merchant identifier (e.g., a merchant identifier of challenge request data 664 and/or of challenge response data 670 and/or as may otherwise be associated at commercial entity subsystem 400 (e.g., in table 430) with the merchant online resource being validated during the validation session), and/or the like. In some embodiments, as shown in FIG. 6, such validation response data 674 may be communicated from commercial entity subsystem 400 directly to electronic device 100 (e.g., via communications path 65 using any suitable communications protocol), where data identifying electronic device 100 (e.g., device identifier 119) may be associated or otherwise included in validation session initiation data 662 and/or challenge request data 664 and/or challenge response data 670 or otherwise so that commercial entity subsystem 400 may communicate validation response data 674 to the proper electronic device 100. Alternatively, in some embodiments, validation response data 674 may be communicated from commercial entity subsystem 400 to electronic device 100 via merchant subsystem 200, whereby merchant subsystem 200 may receive validation response data 674 from commercial entity subsystem 400 (e.g., via communications path 85 using any suitable communications protocol) and then pass at least a portion of validation response data 674 on to electronic device 100 (e.g., via communications path 15 using any suitable communications protocol or as a contactless proximity-based communication), such that commercial entity subsystem 400 may not have to establish a secure communication channel directly with device 100 at step 624. Validation response data 674 may be signed by commercial entity subsystem 400 (e.g., in an HTTP header or otherwise) with an access key associated with commercial entity subsystem 400 that may also be accessible to electronic device 100 (e.g., access key 155a, access key 155b, CRS 151k, and/or ISD key 156k of secure element 145 or any key that may be known to a device application (e.g., card management application 103b)), such that device 100 may validate the signature upon receiving the signed validation data to confirm that commercial entity subsystem 400 generated validation response data 674 rather than another entity subsystem that may not be trusted by electronic device 100 and/or such that the signed validation data may not be utilized by an entity that may not have access to such an access key (e.g., merchant subsystem 200 that may be used to pass the signed validation data from commercial entity subsystem 400 to device 100).

As mentioned, a user of device 100 may select a GUI element (e.g., radio button) of the merchant online resource, such as secure pay prompt 309 of FIG. 3A, for conveying the user's desire to conduct the secure data transaction identified by potential transaction data 660 of the merchant online resource of step 610. As shown in FIG. 3B, device 100 and/or merchant online resource 113 may be configured to provide screen 190b in response to receiving selection of secure pay prompt 309 of screen 190a of FIG. 3A alone or also in addition to device 100 receiving validation response data 674 at step 624, which may be indicative of no validation session failure, and/or in response to device 100 verifying consistency (e.g., at step 625) between a session identifier that may have been generated by device 100 at step 612 as a portion of validation session initiation data 662 and a session identifier that may be provided as a portion of received validation response data 674, which may enable device 100 to confirm that response data 674 is associated with validation session initiation data 662 as part of the same validation session of process 600 (e.g., device 100 may store a session identifier of validation session initiation data 662 in combination with a merchant identifier of merchant subsystem 200 (e.g., at step 612) and may then compare that stored data combination to the session identifier and merchant identifier of validation response data 674 (e.g., at step 625) to ensure a proper match before allowing the remainder of process 600, where device 100 may be operative to ensure that any session identifier generated by device 100 at step 612 is unique to the particular merchant subsystem or merchant online resource to be validated during the session initiated at step 612). In any event, as shown in FIG. 3B, screen 190b may prompt a user to interact with device 100 in one or more ways to choose a specific payment source or credential that may be available to device 100 for making the purchase. For example, as shown, screen 190b may include a payment source selection prompt 311 that may enable a user to select one of potentially multiple payment sources that may be available to device 100. Payment source selection prompt 311 may only include payment sources with credentials that are associated with payment networks supported by the merchant (e.g., as may be determined by potential transaction data 660, as mentioned above) or may show all payment sources available to device 100 yet may make only those that are associated with acceptable payment networks able to be selectable by a user. Payment source selection prompt 311 may include any suitable payment sources (e.g., a payment method using "Credential X" as may be indicated by payment option identifier 311*a* of prompt 311, a payment method using "Credential Y" as may be indicated by payment option identifier 311*b* of prompt 311, etc.), including, but not limited to, any suitable payment credentials native to a secure element of device 100 and/or any suitable non-native payment credentials of any available payment sources accessible to device 100 (e.g., another device that may act as a host device to device 100 as a client device). As just one particular example, as shown in FIG. 3C, device 100 may be configured to provide screen 190*c* in response to receiving user selection of "Credential X" of identifier 311*a* of payment source selection prompt 311 of FIG. 3B. Screen 190*c* of FIG. 3C may identify that selected or automatically identified default credential with credential identifier information 313 and may prompt a user of device 100 to interact with device 100 in one or more ways to authenticate the user and its intent to utilize the selected credential. This may include prompting the user (e.g., with an authentication prompt 315 of FIG. 3C) to enter user authentication via personal identification number ("PIN") entry or via user interaction with a biometric sensor in order to access the secure element of device 100 and, thus, the credential to be used for the purchase. A merchant online resource validation session may be initiated (e.g., at step 612 and/or step 614) based on any suitable event, such as in response to potential transaction data 660 being communicated and/or in response to screen 190*a* being presented and/or in response to user selection of secure pay prompt 309 of screen 190*a* of FIG. 3A and/or in response to user selection of a particular credential of payment source selection prompt 311 of FIG. 3B and/or in response to presentation of screen 190*c* of FIG. 3C. Payment source selection prompt 311 of FIG. 3B may be presented at any suitable moment, such as in response to user selection of secure pay prompt 309 of screen 190*a* of FIG. 3A regardless of the status of any validation session that may be occurring at steps 612-624 (e.g., before or during or any one of steps 612-614) and/or in response to not only user selection of secure pay prompt 309 of screen 190*a* of FIG. 3A but also receipt of validation response data 674 at step 624, which may be indicative of no validation session failure. Authentication prompt 315 of FIG. 3C may be presented at any suitable moment, such as in response to receiving user selection of a payment identifier of payment source selection prompt 311 regardless of the status of any validation session that may be occurring at steps 612-624 (e.g., before or during or any one of steps 612-614) and/or in response to not only receiving user selection of a payment identifier of payment source selection prompt 311 but also receipt of validation response data 674 at step 624, which may be indicative of no validation session failure, and/or screen 190*c* may be presented before receipt of validation response data 674 at step 624 but authentication prompt 315 of FIG. 3C may not be enabled for use until after receipt of validation response data 674 at step 624.

If a user of device 100 is willing and able to select or confirm a particular payment credential for use in funding the potential transaction in response to potential transaction data 660 (e.g., payment request data) received at step 610 and validation response data 674 has been received by electronic device 100 at step 624 (e.g., data that may be indicative of the success of the merchant online resource validation session of steps 612-622), process 600 may proceed to step 625 where process 600 may include, after any session identifier consistency has been identified (e.g., at step 625, mentioned above), receiving intent and authentication by a user of device 100 to utilize a specific credential for carrying out the potential transaction for a particular merchant, product, price, and shipping destination based on potential transaction data 660 (e.g., through user selection of authentication prompt 315 of FIG. 3C). Access SSD 154*b* may leverage applet 153*b* of device 100 to determine whether such authentication has occurred before allowing other SSDs 154 (e.g., credential SSD 154*a*) to be used for enabling its credential information in a commerce credential data communication. As just one example of step 625, applet 153*b* of access SSD 154*b* may be configured to determine intent and local authentication of a user of device 100 (e.g., via one or more input components 110, such as a biometric input component 110*i* of FIG. 3, as may be used by a user interacting with any application of device 100 (e.g., merchant resource 113 and/or card management application 103*b* of device 100)) and, in response to such a determination, may be configured to enable another particular SSD for conducting a payment transaction (e.g., with a credential of credential SSD 154*a*). In some embodiments, after such a determination, but before such enablement, a GUI of device 100 may be configured to provide another screen (not shown) that may prompt a user of device 100 (e.g., with a prompt similar to prompt 315 of FIG. 3C) to interact with device 100 in one or more ways to finally initiate payment using the selected and authenticated credential. A user of device 100 may provide intent and authentication at step 625 for use of a particular payment credential native to device 100 for funding a potential transaction identified by potential transaction data 660 of step 610 (e.g., for "Merchant A" and "Product B" and "Price C" and "Shipping D" of screens 190*a*-190*c*). However, alternatively, process 600 may enable a user of device 100 to adjust one or more characteristics of the potential transaction before any intent and authentication may be provided at step 625 (e.g., shipping address information may be updated on screen 190*a* and/or 190*b* or otherwise through additional updated potential transaction data 660 being communicated between merchant subsystem 200 and device 100).

Next, once intent and authentication has been received at step 625 for a particular payment credential in response to receiving particular payment request data of potential transaction data 660, steps 626-628 of process 600 may include device 100 generating, encrypting, and transmitting device transaction data 678 for use by commercial entity subsystem 400 (e.g., as described with respect to steps 512 and 514 of process 500). Once the credential of credential SSD 154*a* on secure element 145 of device 100 has been selected, authenticated, and/or enabled for use in a financial transaction (e.g., at step 625), secure element 145 of device 100 (e.g., processor module 142 of NFC component 120) may generate and encrypt certain credential data of that selected credential for use by commercial entity subsystem 400. For example, device payment credential data 675 of credential SSD 154*a* (e.g., payment card data of SSD 154*a* (e.g., as may be associated with selected "Credential X")), such as token data and crypto data may be generated and/or at least partially encrypted with credential key 155*a*' at step 626 as device payment credential data 676 to include at least token data and crypto data, such that such encrypted device payment credential data 676 may only be decrypted by an entity with access to that credential key 155*a*' (e.g., financial institution subsystem 350) for accessing device payment credential data 675. Such payment credential data 675 may include any suitable data that may be operative to securely prove proper ownership of the particular secure element credential of device 100 (e.g., the credential of SSD 154*a*), including, but not limited to, (i) token data (e.g., a DPAN, DPAN expiry date, and/or CVV of credential information 161*a* of SSD 154*a*) and (ii) crypto data (e.g., a cryptogram that may be generated by secure element 145 using a shared secret of SSD 154*a* and financial institution subsystem 350 (e.g., key 155*a*') and any other suitable information (e.g., some or all of the token data, information identifying device 100, information identifying some or all of potential transaction data 660 of step 610, such as cost and/or currency, any suitable counter values, nonce (e.g., a nonce of the validation data of validation response data 674), etc.) that may be available to device 100 and that may also be made available to financial institution subsystem 350 for independently generating the crypto data using the shared secret). Therefore, payment credential data 675 may include all data necessary to make a payment with that credential, such as, for example, a primary account number (e.g., an actual F-PAN or a virtual D-PAN), a card security code (e.g., a card verification code ("CVV")), expiration date, name associated with the credential, associated crypto data (e.g., a cryptogram generated using a shared secret between secure element 145 and financial institution subsystem 350 and any other suitable information), and/or the like. In some embodiments, once some or all of that payment credential data 675 of credential SSD 154*a* has been encrypted with credential key 155*a*' at step 626 as encrypted payment credential data 676, that encrypted payment credential data 676, either alone or along with at least a first portion if not all of the applicable potential transaction data 660 (e.g., a portion or all of potential transaction data 660 that may include identification of the merchant, identification of the price amount, identification of the currency and/or shipping and/or product, and/or unique merchant-based transaction identifier and/or unique user device-based transaction identifier and/or the like), some or all of validation response data 674, and/or any other suitable information (e.g., any information identifying device 100 itself (e.g., device identifier 119), any specific device-based transaction identifier, and/or the like), may be encrypted by access information (e.g., by access key 155*a* of SSD 154*a*, access key 155*b* of access SSD 154*b*, ISD key 156*k*, and/or CRS 151*k* and/or signed by CASD 158*k*) at step 627 as secure device data 677. For example, secure element 145 of device 100 (e.g., processor module 142 of NFC component 120) may use access information to encrypt not only an identification of the merchant from data 660 and/or data 674 (e.g., identification of the merchant or its resource being used for the purchase, such as application 113), but also the identification of the amount of the purchase and/or currency code from data 660, as well as the encrypted payment credential data 675 of SSD 154*a* (e.g., encrypted payment credential data 676) into secure device data 677. In some embodiments, payment credential data 675 of credential SSD 154*a* (e.g., payment card data of SSD 154*a*, such as token data and crypto data) may be generated but not encrypted with a credential key (e.g., at step 626 as data 676) before being encrypted with a commercial entity key or access key (e.g., at step 627 as data 677), and, instead, such payment credential data 675 may be encrypted with a commercial entity key or access key (e.g., at step 627 as data 677), whereby in such embodiments, any future reference to data 676 may also be in reference to data 675 that is not encrypted with any credential key. In some embodiments, such a commercial entity key or access key may be a commercial entity public key associated with a scheme of commercial entity subsystem 400 and of which commercial entity subsystem 400 may have access to an associated commercial entity private key. Commercial entity subsystem 400 may provide such a commercial entity public key to financial institution subsystem 350 and financial institution subsystem 350 may then share that commercial entity public key with device 100 (e.g., when provisioning credential data on device 100 (e.g., at step 604 of process 600)).

Next, secure device data 677 along with any additional information, such as at least some of potential transaction data 660 or potential transaction identification information (e.g., identification of the merchant, identification of the price amount, identification of the currency, a unique merchant-based transaction identifier, identification of the product/service, and/or the like) and/or at least a portion or all of validation response data 674 and/or any other suitable information (e.g., any information identifying device 100 itself, a unique device-based transaction identifier, and/or the like) may together be transmitted as device transaction data 678 from device 100 to commercial entity subsystem 400 at step 628 (e.g., as described with respect to step 514 of process 500). Therefore, at least portions of device transaction data 678 (e.g., secure device data 677 with or without validation response data 674) may only be decrypted by an entity with access to that access information used for the encryption (e.g., access key 155*a*, access key 155*b*, ISD key 156*k*, CRS 151*k*, and/or CASD 158*k*) that generated secure device data 677 of device transaction data 678 (e.g., commercial entity subsystem 400). Such device transaction data 678 may be generated at steps 626-628 and then transmitted to commercial entity subsystem 400 at step 628 (e.g., from secure element 145 or otherwise, via communications component 106 and communication path 65). Steps 626, 627, and 628 may ensure that any credential data generated and transmitted from secure element 145 of device 100 as part of device transaction data 678 has first been encrypted in such a way that it cannot be decrypted by another portion of device 100 (e.g., by processor 102). That is, payment credential data 675 of device transaction data 678 may be encrypted as encrypted device payment credential data 676 with a credential key 155*a*' that may not be exposed to or accessible by any portion of device 100 outside of its secure element. Moreover, such device payment credential data 676 of transaction data 678 may be encrypted as secure device data 677 with an access key (e.g., access key 155*a*, 155*b*, 156*k*, 151*k*, and/or 158*k* (e.g., referred to herein as "access information")) that may not be exposed to or accessible by any portion of device 100 outside of its secure element.

Next, at step 629, process 600 may include commercial entity subsystem 400 receiving and decrypting at least a portion of device transaction data 678. For example, commercial entity subsystem 400 may receive device transaction data 678 and may then decrypt secure device data 677 of device transaction data 678 using access information (e.g., 155*a*, 155*b*, 156*k*, 151*k*, and/or 158*k*) as available at commercial entity subsystem 400. This may enable commercial entity subsystem 400 to determine an unencrypted identification of the merchant (e.g., from decrypted secure device data 677), while also maintaining payment credential data 675 in an encrypted state (e.g., as encrypted device payment credential data 676), because commercial entity subsystem 400 may not have access to credential key 155$a'$ with which such device payment credential data 675 may have been encrypted by secure element 145 of device 100 at step 626 as encrypted device payment credential data 676. Additionally or alternatively, the merchant may be identified by the additional data that may have been included in device transaction data 678 along with secure device data 677. Device transaction data 678 may include information identifying device 100 or at least its secure element, such that, when device transaction data 678 is received by commercial entity subsystem 400, commercial entity subsystem 400 may know which access information (e.g., which of access information 155$a$, 155$b$, 156$k$, 151$k$, and/or 158$k$) to use at step 629. For example, commercial entity subsystem 400 may have access to multiple access keys 155$a$/155$b$ and/or multiple ISD keys 156$k$, each one of which may be particular to a specific device 100 or to a specific secure element.

Moreover, before or after step 629, after receiving device transaction data 678 communicated at step 628, step 629 of process 600 may include commercial entity subsystem 400 validating the validation data of validation response data 674 that device 100 may have included in device transaction data 678. For example, in response to receiving such device transaction data 678, commercial entity subsystem 400 may be operative to identify at least a portion or all of validation response data 674 from that device transaction data 678 and to confirm that the validation data of that received device transaction data 678 is currently stored at commercial entity subsystem 400, or, more particularly, in some embodiments, to confirm that the validation data of that received device transaction data 678 is currently stored at commercial entity subsystem 400 against a validation session identifier of the received device transaction data 678 and/or against a merchant identifier of the received device transaction data 678 (e.g., in table 430) at step 630 (e.g., similarly to step 516 of process 500). In some embodiments, such a stored link between the validation data and one or both of the validation session identifier and a merchant identifier may be maintained for only a limited amount of time before the link is automatically cleared, such that electronic device 100 may be limited to a certain duration of time within which it must receive validation response data 674 at step 624 and then send device transaction data 678 at step 628 to commercial entity subsystem 400 for enabling secure device data 677 of device transaction data 678 to be secured by commercial entity subsystem 400 for carrying out the particular secure data transaction with the validated merchant online resource (e.g., commercial entity subsystem 400 may be operative to remove such an association between the validation data and validation session identifier and/or merchant identifier at commercial entity subsystem 400 after a certain period of time (e.g., remove the link from table 430 no more than 10 minutes after the link is created), which may increase the security of the transaction). Additionally or alternatively, a stored link between the validation data and one or both of the validation session identifier and a merchant identifier may also be associated at step 622 with any suitable specific potential transaction identification information that may be made available to commercial entity subsystem 400 by merchant subsystem 200 during one or more of steps 614 and 620 (e.g., as a portion of challenge request data 664 and/or of challenge response data 670), such as identification of a specific type of secure data to be shared between device 100 and merchant subsystem 200 (e.g., currency and value amount and payment type for a financial transaction, and similar specific potential transaction identification information may also be made available to commercial entity subsystem 400 by electronic device 100 as a portion of the device transaction data 678 of step 628, such that step 630 may also include commercial entity subsystem 400 confirming that the specific potential transaction identification information currently stored against the validation data received at step 614 and/or step 620 (e.g., as stored in table 430 at step 616 and/or step 622) is at least similar to the specific potential transaction identification information received at step 628. For example, if at step 622, particular validation data is stored against specific potential transaction identification information associated with the potential transaction that is indicative of a financial transaction of 5 U.S. dollars, but then specific potential transaction identification information received along with that particular validation data by commercial entity subsystem 400 at step 628 is indicative of a financial transaction of 2,000 U.S. dollars, then commercial entity subsystem 400 may be operative to not validate the validation data of device transaction data 678 due to the magnitude of the discrepancy between the $5 and $2,000. Therefore, even if the validation data and the validation session identifier and/or merchant identifier of device transaction data 678 received at step 628 may be confirmed to be actively linked at commercial entity subsystem 400 (e.g., in table 430), the validation data may not be validated if other data that may be associated with that link is not satisfied by device transaction data 678 (e.g., if any suitable characteristic of the secure data transaction identified during steps 616-622 differs from that identified in device transaction data 678 of step 628 by any suitable amount (e.g., a percentage variance of a particular data type, such as by more than 10% of a financial transaction currency value or by more than 10% of the time frame for health data) or by a particular type (e.g., different types of data identified, such as the type of health data is different between the two instances of identified data (e.g., heart rate data vs. miles walked data, or biometric data vs. payment data, etc.) and/or the type of currency being used for a transaction is different between the two instances of identified data (e.g., dollars vs. yen, etc.) and/or the location of the shipping address of a payment transaction for a delivery of goods)). The data comparison may be between the data actually received for a particular transaction and aggregate past data for a particular merchant in order to detect certain instances that deviate from the expected norm (e.g., detect first transaction of biodata by a merchant that up until then had only transacted payment credential data, etc.), where the potential transaction identification information may be used to validate or detect fraud by the merchant and not necessarily with respect to the user device (e.g., aggregate data may be tracked for a merchant but not for a device in certain instances to respect privacy concerns of end users).

Next, at step 631, process 600 may include commercial entity subsystem 400 identifying a merchant key (e.g., merchant key 157) associated with the merchant that may have been identified by payment request data received at step 610 and/or the validation session and, thus, by device transaction data 678, and then re-encrypting at least a portion of device transaction data 678 using that merchant key. That is, after decrypting at least a portion of device transaction data 678 using suitable access information at step 629 (e.g., after decrypting secure device data 677 to realize device payment credential data 676 and any other information that may have been encrypted in secure device data 677 (e.g., validation response data 674)), commercial entity subsystem 400 may then, at step 631, re-encrypt at least a portion of device transaction data 678 (e.g., the token data and/or the crypto data of device payment credential data 676) with an appropriate merchant key that may be associated with merchant information identified in device transaction data 678 or that may be identified in table 430 to be associated with the linked validation data validated at step 630. For example, such a merchant key (e.g., merchant key 157) may be determined by comparing commercial entity merchant information identified using device transaction data 678 with data in table 430 of FIG. 1A. With this determined appropriate merchant key, commercial entity subsystem 400 may re-encrypt with that merchant key (e.g., merchant key 157) at least a portion of device transaction data 678 (e.g., the token data and/or the crypto data of device payment credential data 676) as encrypted merchant credential data 681. For example, encrypted merchant credential data 681 may include at least encrypted device payment credential data 676 from device transaction data 678 as well as any suitable transaction data, such as the purchase amount data or other suitable transaction data from or based on device transaction data 678 and/or potential transaction data 660. The merchant identification information from device transaction data 678 may not need to be included in encrypted merchant credential data 681 as that merchant identification may have already been used to determine the merchant key with which encrypted merchant credential data 681 may be encrypted at step 631. Encrypted merchant credential data 681 may be signed by commercial entity subsystem 400 in such a way that, when received by merchant subsystem 200, merchant subsystem 200 may establish commercial entity subsystem 400 as the creator of such encrypted merchant credential data 681 and/or may enable merchant subsystem 200 to ensure that such encrypted merchant credential data 681 has not been modified after being signed. Such encrypted merchant credential data 681 may be generated at step 631 and then transmitted to device 100 along with any other suitable data as secured transaction data 682 at step 632 (e.g., from server 410 of commercial entity subsystem 400 to communications component 106 of device 100 via path 65 of FIG. 1A).

Steps 631 and 632 may be operative to ensure that credential data transmitted from the commercial entity subsystem 400 as part of secured transaction data 682 of FIG. 1A (e.g., token data and/or crypto data of encrypted merchant credential data 681) may be encrypted in such a way that it cannot be decrypted by a portion of device 100 other than secure element 145. That is, credential data of secured transaction data 682 (e.g., token data and/or crypto data of encrypted merchant credential data 681) may be encrypted with a merchant key (e.g., merchant key 157) that may not be exposed to or otherwise accessible by any portion of device 100, including, in some embodiments, secure element 145. Moreover, credential data of secured transaction data 682 (e.g., token data and/or crypto data of encrypted merchant credential data 681) may be encrypted with a credential key 155a' that may not be exposed to or otherwise accessible by any portion of device 100 outside of secure element 145 (e.g., at step 626).

Secured transaction data 682 may then be forwarded on to merchant subsystem 200 as secured transaction data 684 (e.g., via communications path 15 or as a contactless proximity-based communication 5) at step 634. Alternatively, merchant credential data 681 may be communicated to merchant subsystem 200 from commercial entity subsystem 400 without being communicated via device 100 (not shown). One, some, or all portions of potential transaction data 660 may be carried through device 100 and/or commercial entity subsystem 400 to secured transaction data 682 and/or to secured transaction data 684, such that certain identifiers of the potential transaction may be identified by each of the entities during process 600, including, but not limited to, (i) specific merchant information, such as a unique merchant identifier of the merchant (i.e., "Merchant A") and/or identification of the particular merchant resource being used (e.g., the particular merchant application 113'), (ii) specific transaction information, such as identification of a specific currency to be used to pay for the transaction (e.g., yen, pounds, dollars, etc.) and/or identification of a specific amount of a currency to be paid for the transaction (i.e., "Price C") and/or identification of the particular product or service to be purchased or rented or otherwise paid for (i.e., "Product B") and/or identification of a default or initial shipping address to be used (i.e., "Shipping D"), (iii) information indicative of the one or more types of payment methods acceptable to the merchant for the transaction (e.g., a list of payment cards that may be used for the purchase (e.g., MasterCard but not Visa)) or selected by device 100 (i.e., "Credential X"), (iv) a unique merchant-based transaction identifier (e.g., any suitable data element, such as a 3 or 4 character alphanumeric string, that may be randomly or uniquely generated by merchant subsystem 200 for association with the transaction being conducted), (v) a unique user device-based transaction identifier (e.g., any suitable data element, such as a 3 or 4 character alphanumeric string, that may be randomly or uniquely generated by device 100 for association with the transaction being conducted), (vi) a unique merchant online resource validation session identifier), and/or the like.

Once merchant credential data 681 including payment credential data 675/676 is received by merchant subsystem 200 (e.g., as secured transaction data 684 at step 634), process 600 may also include step 636 at which merchant subsystem 200 may be configured to generate and transmit payment data 686 to acquiring bank subsystem 300 (e.g., via communication path 25 between merchant subsystem 200 and acquiring bank subsystem 300 of FIG. 1A), where data 686 may include payment information and an authorization request that may be indicative of the secured device payment credential data of device 100 and the merchant's purchase price for the product or service (e.g., as may be included in or otherwise associated with secured transaction data 684 or as may be otherwise associated with the transaction as known by merchant subsystem 200 (e.g., by potential transaction data 660 (e.g., based on a unique transaction identifier))). For example, at step 636, merchant subsystem 200 may leverage its known merchant key 157 to at least partially decrypt merchant credential data 681 of secured transaction data 684 such that payment data 686 may include the secured payment credential data of credential SSD 154a encrypted with its credential key 155a' (e.g., data 676) but not with a key that is not available to financial institution subsystem 350.

If payment data 686 is transmitted to acquiring bank subsystem 300 at step 636, then, at step 638, acquiring bank subsystem 300 may forward authorization request information from payment data 686 to financial institution subsystem 350 as authorization request data 688 (e.g., via communication path 35 between acquiring bank subsystem 300 and financial institution subsystem 350 of FIG. 1A). Next, at step 640, when issuing bank subsystem 370 of financial institution subsystem 350 receives an authorization request (e.g., directly from acquiring bank subsystem 300 as data 688 at step 640, or indirectly via payment network subsystem 360 as data 405), the payment information (e.g., payment credential data 675 of device 100 as encrypted by credential key 155*a*' by secure element 145 of device 100 (e.g., data 676)) and the purchase amount, each of which may be included in the authorization request data 688, as well as in data 682, 684, and/or 686, may be decrypted (e.g., using credential key 155*a*' at financial institution subsystem 350) and analyzed to determine if the account associated with the commerce credential has enough credit to cover the purchase amount. If sufficient funds are not present, issuing bank subsystem 370 may decline the requested transaction by transmitting a negative authorization response to acquiring bank subsystem 300. However, if sufficient funds are present, issuing bank subsystem 370 may approve the requested transaction by transmitting a positive authorization response to acquiring bank subsystem 300 and the financial transaction may be completed. Either type of authorization response may be provided by user financial subsystem 350 to acquiring bank subsystem 300 as authorization response transaction status data 690 at step 640 of process 600 (e.g., directly from issuing bank subsystem 370 to acquiring bank subsystem 300 via communication path 35, or from payment network subsystem 360 to acquiring bank subsystem 300 based on authorization response data 415 that may be provided to payment network subsystem 360 from issuing bank subsystem 370 via communication path 45 of FIG. 1A). Next, in response to receiving authorization response transaction status data 690 at step 640, process 600 may also include acquiring bank subsystem 300 or any other suitable subsystem sharing such authorization response transaction status data with merchant subsystem 200 as authorization response transaction status data 692 at step 642, which may then be shared with device 100 (e.g., using the merchant resource or otherwise) as confirmed transaction status data 694 at step 644. Such confirmed transaction status data may be configured to provide any suitable confirmation data to device 100, such as confirmation data 317 of screen 190*d* of FIG. 3D. If the transaction is successful, the confirmed transaction status data may be operative to close the transaction at device 100 at step 644. Additionally or alternatively, if the transaction is not successful, the confirmed transaction status data may or may not be operative to close the transaction (e.g., close the transaction if no valid funds available or if device identified as fraudulent, but keep open and allow updates if a non-valid shipping address is determined). Any non-transaction-terminating transaction status data may allow the payment process to continue until the process is cancelled by an application, the process is cancelled by a user, or the process is completed.

Therefore, merchant subsystem 200 may be configured to process secured transaction data 684 or any other carrier of merchant credential data 681 in any suitable way. For example, to obtain device payment credential data from merchant credential data 681, merchant subsystem 200 may verify that a signature property of the received merchant credential data 681 is valid and that commercial entity subsystem 400 is the signer of that signature. Merchant subsystem 200 may use any suitable technique to determine which merchant key (e.g., which merchant public key 157) may have been used by commercial entity subsystem 400 to construct merchant credential data 681. Then, merchant subsystem 200 may retrieve the corresponding merchant private key (e.g., a merchant private key 157 at merchant subsystem 200) and use that retrieved key to de-encapsulate and/or decrypt encrypted merchant credential data 681 to recover encrypted data 676. Then such data 676 may be provided to the appropriate payment network 360, which may leverage the appropriate credential key 155*a*' of financial institution subsystem 350 to de-encapsulate and/or decrypt encrypted device payment credential data 676 to recover device payment credential data 675 (e.g., to recover the token data and/or the crypto data of device payment credential data 675 for validating device payment credential data 675 (e.g., to independently generate the crypto data based on the token data of received device payment credential data 675, compare that generated crypto data to the crypto data of the received device payment credential data 675, and either validate or reject the transaction based on the comparison)).

It is understood that the steps shown in process 600 of FIG. 6 are only illustrative and that existing steps may be modified or omitted, additional steps may be added, and the order of certain steps may be altered. Although not shown, secured transaction data may be communicated from commercial entity subsystem 400 directly to merchant subsystem 200 (e.g., via communications path 85 and not via device 100 at steps 632 and 634) or directly to financial institution subsystem 350 (e.g., via communications path 55 and not via device 100 and/or not via merchant subsystem 200 and/or not via acquiring bank 300 at steps 632-638). Additionally or alternatively, although not shown, secured transaction data may be communicated from device 100 directly to financial institution subsystem 350 (e.g., not via merchant subsystem 200). It is to be understood that if any validation step of process 600 were to fail, such failure may be communicated to one or more suitable entities. For example, if the validation of challenge request data 664 were to fail at step 616 and/or if the validation of challenge response data 670 were to fail at step 622 and/or if the validation of the validation data of validation response data 674 of device transaction data 678 were to fail at step 630, such failure may be shared by commercial entity subsystem 400 with merchant subsystem 200 and/or with electronic device 100 so that device 100 may cancel the potential transaction with merchant subsystem 200 and potentially remove the merchant online resource from device 100. After a user of device 100 may choose certain secure data to use for a secure data transaction at step 625 (e.g., certain payment credential data of a particular payment credential), the remaining steps of process 600 may occur transparent to that user (e.g., steps 626-644 may occur without any further user interaction with device 100 and may seem instantaneous to a user of device 100). Process 600 may appear to a user of device 100 as if, after step 625, secure device data is automatically and instantaneously sent to merchant subsystem 200 and the status of the transaction may be confirmed to device 100 (e.g., by merchant subsystem 200 and/or commercial entity subsystem 400). Additionally or alternatively, the validation of a merchant online resource may occur transparent to device 100 (e.g., steps 614-624 if not also step 612 may occur without any user interaction with device 100 and may seem instantaneous to a user of device 100 after step 610). Alternatively, in some embodiments, process 600 may occur altogether transparent to a user of device 100 (e.g., where device 100 may be configured to automatically determine when a secure device transaction ought to occur and to automatically receive validation response data and/or to automatically send device transaction data and/or to automatically receive and/or send secured transaction data for a secure device transaction without any active user interaction with device 100, while the merchant online resource may still be validated during a validation session initiated and carried out for that particular secure device transaction). For example, as mentioned, device 100 may be configured to determine that a particular product ought to be purchased and to interact with one or more merchants in order to obtain associated potential transaction data from at least one particular merchant for that particular product (e.g., device 100 may be a home appliance that may be configured to determine that an appliance product must be purchased (e.g., detect that more laundry detergent is needed by a washing machine or detect a calendar event pre-set by a user to buy more detergent on a particular date) and may automatically identify a particular merchant offering the best deal for that product and may automatically interact with that merchant to obtain potential transaction data for purchasing that product from that merchant), all automatically and without any active interaction by a user of device 100. After which, device 100 and/or the particular merchant may be operative to automatically initiate the validation session of step 612.

In some embodiments, steps 618-622 may be skipped after a challenge request has been validated at step 616 and, instead, validation data may be generated and stored at step 616 rather than challenge data. Therefore, in some embodiments, steps 614 and 616 may be adequate to validate a merchant online resource for a particular validation session. In some embodiments, the challenge data generated at step 616 may be different than the validation data generated at step 622. For example, the challenge data may be long enough (e.g., a string of data of a suitable length, such as 10 or more characters) to provide enough randomness for enabling a significantly robust challenge to merchant subsystem 200 with challenging data 668, whereas the validation data may be shorter than the challenge data (e.g., the validation data may be a string of data of a length shorter than that of the challenge data, such as 6 characters) to provide enough randomness for enabling proof of session validation and/or to satisfy any suitable standard (e.g., to satisfy a data length requirement of the Europay MasterCard Visa ("EMV") standard) with validation response data 674. Alternatively, the challenge data and the validation data may be the same and reused at both step 616 and step 622. The validation data (e.g., a nonce) of validation response data 674 may be generated and provided by commercial entity subsystem 400 to device 100 at step 624 based on a successful validation of a challenge of merchant subsystem 200 and not just based on a determination that a payment transaction is to occur between device 100 and a merchant. When device 100 may be communicating with merchant subsystem 200 via a native application on device 100 that may be specific to the merchant, then merchant application 113 may be provided by such an application. However, when device 100 may be communicating with merchant subsystem 200 via an internet browser application or hybrid application that may or may not be not specific to a merchant but that may be pointed to a website managed by a merchant (e.g., on a server under the control of the merchant), then merchant application 113 may be a layout engine software component (e.g., WebKit) that may forward communications on to a website of the merchant (e.g., via communications component 106). For example, such an application 113 of device 100 may be a conduit for any device transaction data to be provided to merchant subsystem 200.

Alternative embodiments of certain portions of process 600 may now be described with respect to different merchant-configurations. Merchant subsystem 200 may be equipped to handle a secure transaction of process 600 with varying degrees of control. In a first merchant-configuration, where merchant subsystem 200 may retain control of the entire process, merchant subsystem 200 may be operative to handle not only the validation of the merchant online resource (e.g., at steps 614 and 616 and/or at steps 618 and 620, merchant subsystem 200 itself may communicate with commercial entity subsystem 400 for validating the merchant online resource) but also the decryption of secure data encrypted by commercial entity subsystem 400 (e.g., at step 636, merchant subsystem 200 may leverage a merchant key 157 to at least partially decrypt merchant credential data 681 of secured transaction data 684). In such a first merchant-configuration, merchant subsystem 200 may act as its own payment service provider ("PSP") and may be the only subsystem to communicate with commercial entity subsystem 400 for registering and validating an online resource in process 600, as may be typical for larger merchants with high volume (e.g., Amazon.com). Alternatively, in a second merchant-configuration, merchant subsystem 200 may relinquish payment decryption responsibilities to any suitable merchant-partner subsystem, such as a PSP subsystem 310, which may be shown in FIGS. 1A and 6 as being a portion of acquiring bank 300. In such a second merchant-configuration, merchant subsystem 200 may be operative to handle the validation of the merchant online resource (e.g., at step 614 and/or at steps 618 and 620, merchant subsystem 200 itself may communicate with commercial entity subsystem 400 for validating the merchant online resource) but PSP subsystem 310 may be operative to handle the decryption of secure data encrypted by commercial entity subsystem 400 (e.g., at step 638, PSP subsystem 310 may leverage a merchant key 157 to at least partially decrypt merchant credential data 681 of payment data 686). In such a second merchant-configuration, merchant subsystem 200 may use a distinct third-party back-end PSP for its payment decryption such that both merchant subsystem 200 and PSP subsystem 310 may communicate with commercial entity subsystem 400 for registering an online resource in process 600, as may be typical for smaller merchants that may utilize a payment service provider (e.g., an acquiring bank (e.g., Chase Paymentech) or smaller PSPs (e.g., Stripe, Braintree, First Data, etc.) that may be operative to communicate with multiple acquiring banks, card, and payment networks and/or to manage such technical connections and relationships with the external network and bank accounts on behalf of merchant subsystem 200, thereby making merchant subsystem 200 less dependent on financial institutions). PSP subsystem 310 of such a second merchant-configuration may be hidden from a user of device 100, who may only interface with an online resource of merchant subsystem 200 (e.g., at screens 190a-190d of FIGS. 3A-3D). Alternatively, in a third merchant-configuration, merchant subsystem 200 may relinquish online resource validation responsibilities and payment decryption responsibilities to any suitable merchant-partner subsystem, such as a PSP subsystem 310. In such a third merchant-configuration, PSP subsystem 310 may be operative to handle not only the validation of the merchant online resource (e.g., at step 614, PSP subsystem 310 itself may communicate challenge request data 664 with commercial entity subsystem 400 for validating the merchant online resource (e.g., in response to PSP subsystem 310 receiving session initiation data 662 from merchant subsystem 200)) but also the decryption of secure data encrypted by commercial entity subsystem 400 (e.g., at step 638, PSP subsystem 310 may leverage a merchant key 157 to at least partially decrypt merchant credential data 681 of payment data 686). In such a third merchant-configuration, merchant subsystem 200 may use a distinct third-party front-end PSP for the validation and payment decryption such that both merchant subsystem 200 and PSP subsystem 310 may communicate with commercial entity subsystem 400 for registering and validating an online resource in process 600, as may be typical for "long tail" merchants that may rely on a third party payment service provider to carry out the entire checkout and payment process on their behalf (e.g., Stripe Checkout may be provided by a PSP of Stripe, Inc.). A distinct third-party front-end PSP subsystem 310 may provide an embeddable payment form (e.g., as may be hosted on a server of PSP subsystem 310, such as a Java script of PSP subsystem 310 embedded into a merchant resource of merchant subsystem 200) for desktop, tablet, and mobile devices that may work within a web resource of merchant subsystem 200 for a customer to make a payment via that payment form of PSP subsystem 310 without a customer (e.g., user of device 100) being redirected away from the web resource of merchant subsystem 200 to complete the transaction or the customer may be re-directed away from a web resource of merchant subsystem 200 to a web resource of PSP subsystem 310 to complete the process (e.g., PayPal.com). PSP subsystem 310 of such a third merchant-configuration may be operative to manage and operate a PSP online resource, which may be similar to a merchant online resource, but that may be utilized by a merchant online resource that is not equipped to process payments itself, for example, where website merchant online resource 113 may direct a user of device 100 interfacing with that website merchant online resource 113 to an interface of a website PSP online resource 113 that may be embedded within any portion of website merchant online resource 113 or that a user may be re-directed to from any suitable portion of website merchant online resource 113 (e.g., any suitable portions of one or more of screens 190*a*-190*d* of FIGS. 3A-3D may be provided by a website PSP online resource rather than by a website merchant online resource). Therefore, merchant subsystem 200 and PSP subsystem 310 (e.g., acquirer subsystem 300) may together provide a single robust processing subsystem 299 of system 1 or may be used as distinct entities of system 1 depending on the configuration of system 1 and the capabilities of merchant subsystem 200.

Registering a merchant online resource with commercial entity subsystem 400 may include merchant subsystem 200, alone or in combination with PSP subsystem 310 (e.g., depending on which of the three merchant-configurations is employed), enrolling with commercial entity subsystem 400 so as to be operative to validate the online resource with commercial entity subsystem 400 and also to decrypt credential data as encrypted by commercial entity subsystem 400. For example, step 606 may not only include merchant keys 157 being shared between commercial entity subsystem 400 and merchant subsystem 200 or PSP subsystem 310 with respect to one or more merchant identifiers 167 associated with an online resource, where such keys 157 may be used for encrypting data at commercial entity subsystem 400 (e.g., at step 631) and decrypting that data at merchant subsystem 200 or PSP subsystem 310 (e.g., at step 636 or step 638), but also may include a certificate 177 being shared between commercial entity subsystem 400 and merchant subsystem 200 or PSP subsystem 310 with respect to one or more merchant identifiers 167 associated with the online resource, where certificate 177 may be used for validating the online resource (e.g., at steps 614 and step 616).

As just one example, at step 606, a first certificate signing request ("CSR") for shared keys for an online resource (e.g., a website merchant online resource 113) may be generated and communicated to commercial entity subsystem 400. This first CSR for shared keys may include at least one merchant identifier 167 associated with the online resource, such as a fully qualified domain name ("FQDN") (e.g., a web domain that may specify its exact location, including root and subdomains (e.g., DNS hostname)) of the online resource and/or any other suitable merchant identifier that may be linked to the domain of the online resource and/or any other suitable identifier of any suitable merchant-partner that may be associated with the online resource (e.g., a PSP identifier if merchant subsystem 200 may use a PSP for decrypting credential data encrypted by commercial entity subsystem 400). Commercial entity subsystem 400 may respond to the first CSR for shared keys at step 606 by facilitating a key pair (e.g., public and private merchant keys 157) being a shared secret between commercial entity subsystem 400 and merchant subsystem 200 or PSP subsystem 310 that may be associated with one or more of the merchant identifiers 167 of the first CSR. For example, a first merchant key 157 of the key pair may be stored in table 430 of commercial entity subsystem 400 against or otherwise in association with one, some, or each of the merchant identifiers of the first CSR for the merchant online resource, while a second merchant key 157 of the key pair may be stored at merchant subsystem 200 and/or at a PSP subsystem 310 against or otherwise in association with one, some, or each of the merchant identifiers of the first CSR for the merchant online resource. One or more merchant identifiers may be associated with a particular merchant online resource 113, such as a first merchant identifier 167 uniquely associated with the particular merchant online resource 113 (e.g., an FQDB if a web resource merchant online resource 113) and/or a second merchant identifier 167 associated with each merchant online resource 113 of a particular merchant subsystem 200. Additionally or alternatively, one or more merchant keys may be associated with a particular merchant identifier or with a particular merchant online resource 113. All such merchant key and merchant identifier associations may be stored by or otherwise accessible to commercial entity subsystem 400 (e.g., in one or more tables 430) at one or more instances of step 606. In the first merchant-configuration, merchant subsystem 200 may generate and provide such a first CSR to commercial entity subsystem 400, and merchant subsystem 200 may store merchant key 157 against or otherwise in association with one, some, or each of the merchant identifiers 167 of the first CSR for the online resource. In the second and third merchant-configurations, PSP subsystem 310 or merchant subsystem 200 may generate such a first CSR, while either PSP subsystem 310 or merchant subsystem 200 may provide such a first CSR to commercial entity subsystem 400, and PSP subsystem 310 may receive from commercial entity subsystem 400 (e.g., directly or via merchant subsystem 200) merchant key 157 and store merchant key 157 against or otherwise in association with one, some, or each of the merchant identifiers 167 of the first CSR for the online resource.

Additionally, at step 606, a second CSR for a certificate for the online resource (e.g., a website merchant online resource 113) may be generated and communicated to commercial entity subsystem 400. This second CSR for a certificate may include at least one merchant identifier 167 associated with the online resource, such as at least one merchant identifier 167 of the first CSR or otherwise (e.g., the FQDN of the online resource or any other suitable merchant identifier that may be linked to the domain of the online resource) and/or any other suitable identifier of any suitable merchant-partner that may be associated with the online resource (e.g., a PSP identifier if merchant subsystem 200 may use a PSP subsystem for validating the online resource). Commercial entity subsystem 400 may respond to the second CSR for a certificate at step 606 by facilitating certificate 177 being generated and shared between commercial entity subsystem 400 and merchant subsystem 200 or PSP subsystem 310, where certificate 177 may include one, some, or all of the merchant identifiers 167 of the second CSR and may be generated (e.g., by commercial entity subsystem 400) using a merchant key of the first CSR for the merchant online resource (e.g., as may be identified by one or more of the merchant identifiers of the second CSR). For example, certificate 177 for the online resource of the second CSR may be stored in table 430 of commercial entity subsystem 400 against or otherwise in association with one, some, or each of the merchant identifiers of the second CSR for the online resource, while certificate 177 may also be stored at merchant subsystem 200 and/or at a PSP subsystem 310 thereof against or otherwise in association with one, some, or each of the merchant identifiers of the second CSR for the online resource. Certificate 177 may be any suitable digital certificate, such as a transport layer security ("TLS") certificate or a secure sockets layer ("SSL") certificate. In both the first merchant-configuration and the second merchant-configuration, merchant subsystem 200 may generate and provide such a second CSR to commercial entity subsystem 400, and merchant subsystem 200 may store certificate 177 against or otherwise in association with one, some, or each of the merchant identifiers 167 of the second CSR for the online resource. In the third merchant-configuration, PSP subsystem 310 and/or merchant subsystem 200 may generate such a second CSR and may provide such a second CSR to commercial entity subsystem 400, and PSP subsystem 310 may store certificate 177 against or otherwise in association with one, some, or each of the merchant identifiers 167 of the second CSR for the online resource, where this process for providing PSP subsystem 310 with certificate 177 may be done without respect to merchant subsystem 200 and may be done prior to merchant subsystem 200 forming a partnership with PSP subsystem 310 (e.g., PSP subsystem 310 may be a trusted PSP of commercial entity subsystem 400 and provided with certificate 177 prior to merchant subsystem 200 partnering with PSP subsystem 310 for providing a front-end PSP model where a payment is occurring via PSP subsystem 310 and a domain of PSP subsystem 310). Merchant subsystem 200 may provide to commercial entity subsystem 400 a PSP-provided domain and request confirmation from commercial entity subsystem 400 that PSP subsystem 310 is trusted and has a certificate 177 with that domain.

Additionally, at step 606, before, during, or after the handling of either or both of the first CSR and the second CSR, ownership of a domain (e.g., FQDN) of the website online resource by merchant subsystem 200 or by merchant-partner PSP subsystem 310 may be verified or otherwise proven to commercial entity subsystem 400 (e.g., as described with respect to step 501). Any one of the first CSR for keys, the second CSR for certificate, and the domain verification may occur before or after any other one of the first CSR for keys, the second CSR for certificate, and the domain verification when registering an online resource. However, in some embodiments, verifying a domain prior to processing a second CSR for certificate may enable an easier and/or more efficient registration process. In both the first merchant-configuration and the second merchant-configuration, merchant subsystem 200 may share the FQDN of a website merchant online resource being enrolled with commercial entity subsystem 400, commercial entity subsystem 400 may provide any suitable file (e.g., such as a JSON file) to merchant subsystem 200, merchant subsystem 200 may sign that file (e.g., with a shared merchant key 157) and host that file on the FQDN, and then commercial entity subsystem 400 may access that signed file from the FQDN and unsign the file (e.g., with a shared merchant key 157) to confirm that the accessed file matches the file shared with merchant subsystem 200 and that any associated thresholds have been met (e.g., duration of time, etc.). In the third merchant-configuration, PSP subsystem 310 may share the FQDN of a website online resource (e.g., a website online resource of the PSP) being enrolled with commercial entity subsystem 400, commercial entity subsystem 400 may provide any suitable file (e.g., such as a JSON file) to PSP subsystem 310, PSP subsystem 310 may sign that file (e.g., with a shared merchant key 157) and host that file on the FQDN, and then commercial entity subsystem 400 may access that signed file from the FQDN and unsign the file (e.g., with a shared merchant key 157) to confirm that the accessed file matches the file shared with PSP subsystem 310 and that any associated thresholds have been met (e.g., duration of time, etc.). In the third merchant-configuration, merchant subsystem 200 may be operative to communicate data to commercial entity subsystem 400 indicative of the partnership between merchant subsystem 200 and PSP subsystem 310, such that commercial entity subsystem 400 may be operative to confirm the validity of PSP subsystem 310 to merchant subsystem 200 and to store an association between a merchant identifier 167 of merchant subsystem 200 and the FQDN and/or certificate 177 of PSP subsystem 310 (e.g., in table 430) for any suitable use during other portions of process 600. In some embodiments, merchant key(s) 157 provided to PSP subsystem 310 for the second and third merchant-configurations may be globally used by PSP subsystem 310 for decrypting data with respect to any partner merchant subsystem 200. Alternatively, merchant key(s) 157 provided to PSP subsystem 310 for the second and third merchant-configurations may be specific to a particular partner merchant subsystem 200, whereby merchant subsystem 200 may communicate with commercial entity subsystem 400 (e.g., with the first CSR for keys) and may then enable PSP subsystem 310 to receive such merchant key(s) 157 specific to that merchant subsystem 200 (e.g., directly from commercial entity subsystem 400 or from merchant subsystem 200), where such merchant key(s) 157 may be stored or otherwise associated with any suitable merchant identifier 167 of merchant subsystem 200 at commercial entity subsystem 400 (e.g., in table 430) and/or at PSP subsystem 310. This may enable a merchant specific merchant key 157 to be invalidated at commercial entity subsystem 400 when a particular merchant subsystem is no longer trusted by commercial entity subsystem 400 while still enabling other merchant specific keys of PSP subsystem 310 to be used with respect to other merchant subsystems. In some embodiments, one or more APIs may be provided for enabling PSP subsystem 310 to interface directly with commercial entity subsystem 400 for allowing PSP subsystem 310 to share with commercial entity subsystem 400 any merchant keys 157 and/or certificate 177 that may be specific to a particular partner merchant subsystem 200 of PSP subsystem 310 without requiring merchant subsystem 200 to be involved directly in that process (e.g., such that PSP subsystem 310 may onboard a merchant with commercial entity subsystem 400 as a proxy for that merchant). Certificate 177 may also be global to PSP subsystem 310 or specific to a particular partner merchant subsystem 200.

Therefore, step 606 and/or step 501, may include not only a domain of an online resource being verified by commercial entity subsystem 400 but also a merchant identifier 167 associated with or the same as that domain of the online resource being stored against both a merchant key 157 and a certificate 177 at commercial entity subsystem 400 and at merchant subsystem 200 and/or at merchant-partner PSP subsystem 310 for enrolling the online resource at commercial entity subsystem 400. A verified FQDN and/or any other suitable merchant identifier 167 of an online resource may thus be stored against a merchant key 157 and a certificate 177 at commercial entity subsystem 400 and at merchant subsystem 200 and/or at PSP subsystem 310 (e.g., at step 606 of process 600 and/or at step 501 of process 500) for not only enabling the validation of the FQDN of the online resource during a validation session (e.g., at steps 614 and 616 of process 600 and/or at step 506 of process 500) but also for enabling the encryption of secure data by commercial entity subsystem 400 (e.g., at step 631 of process 600 and/or at step 518 of process 500) and the counterpart decryption of that encrypted secure data by merchant subsystem 200 or PSP subsystem 310 (e.g., at step 636 or step 638 of process 600 and/or after step 522 of process 500). For example, in both the first merchant-configuration and the second merchant-configuration, in response to merchant subsystem 200 receiving any suitable merchant online resource validation session initiation data 662 from device 100 at step 612 for initiating a validation session of a merchant online resource 113, where such validation session initiation data 662 may include an identifier of the online resource (e.g., the FQDN of the merchant online resource being accessed by device 100), merchant subsystem 200 may be operative to communicate any suitable challenge request data 664, including certificate 177 received by merchant subsystem 200 at step 606 and stored against that FQDN of validation session initiation data 662, to commercial entity subsystem 400 at step 614 for validating the merchant online resource for the particular secure data transaction to be carried out (e.g., the financial payment transaction as identified at step 610 and/or step 612). Alternatively, in the third merchant-configuration, in response to PSP subsystem 310 receiving any suitable online resource validation session initiation data 662 from device 100 at step 612 for initiating a validation session of a PSP online resource 113, where such validation session initiation data 662 may include an identifier of the online resource (e.g., the FQDN of the PSP online resource being accessed by device 100), PSP subsystem 310 may be operative to communicate any suitable challenge request data 664, including certificate 177 received by PSP subsystem 310 at step 606 and stored against that FQDN of validation session initiation data 662, to commercial entity subsystem 400 at step 614 for validating the PSP online resource for the particular secure data transaction to be carried out (e.g., the financial payment transaction as identified at step 610 and/or step 612). Such challenge request data 664 communicated to commercial entity subsystem 400 from merchant subsystem 200 or PSP subsystem 310 at step 614 may include any suitable data for attempting to prove the validity of the online resource to commercial entity subsystem 400, including, but not limited to, certificate 177, which may include the FQDN and/or any other suitable identifier associated with the online resource, as generated by commercial entity subsystem 400 at step 606, and any other suitable data (e.g., data identifying device 100 and/or data identifying the particular secure data transaction to be carried out (e.g., the financial payment transaction as identified at step 610 and/or step 612, which may be referred to herein as potential transaction identification information, and which may be used during any suitable portions of process 600 for providing any additional layer(s) of security to the current data transaction process and/or for providing any additional security (e.g., fraud detection) services for future data transactions).

At step 616 of process 600, in response to commercial entity subsystem 400 receiving any suitable challenge request data 664 with certificate 177 from merchant subsystem 200 or PSP subsystem 310 at step 614, commercial entity subsystem 400 may be operative to validate the online resource 113 identified by a merchant identifier 167 of the challenge request. For example, in both the first merchant-configuration and the second merchant-configuration, in response to commercial entity subsystem 400 receiving any suitable challenge request data 664 with certificate 177 from merchant subsystem 200 at step 614, commercial entity subsystem 400 may be operative to verify and check certificate 177 of the received challenge request data 664 to ensure its trust is still valid and has not expired through any suitable process(es) (e.g., certificate 177 may be received by commercial entity subsystem 400 in data 664 and then commercial entity subsystem 400 may be operative to determine whether or not that certificate 177 is known to commercial entity subsystem 400 (e.g., stored in table 430) and whether that certificate 177 is still trusted and/or whether that certificate 177 has not expired). Next, if the received certificate 177 is verified, an FQDN and/or another merchant identifier 167 may be extracted from the received certificate 177 and cross-checked with any FQDN and certificate 177 associations stored in table 430 of commercial entity subsystem 400 to ensure that the FQDN of the received certificate 177 is registered. For example, at step 616, commercial entity subsystem 400 may be operative to attempt to confirm that the online resource 113 identified by a merchant identifier 167 of received challenge request data 664 is a valid and registered online resource at commercial entity subsystem 400, which may be confirmed by identifying that merchant identifier 167 in table 430 (e.g., to determine that the merchant identifier 167 has been registered with commercial entity subsystem 400 (e.g., at step 606) and that such registration is still valid (e.g., that commercial entity subsystem 400 has not removed merchant identifier 167 from table 430 or flagged merchant identifier 167 in table 430 for being suspicious or otherwise no longer trusted)). Similarly, in the third merchant-configuration, in response to commercial entity subsystem 400 receiving any suitable challenge request data 664 with certificate 177 from PSP subsystem 310 at step 614, commercial entity subsystem 400 may be operative to verify and check certificate 177 of the received challenge request data 664 to ensure its trust is still valid and has not expired and, if the received certificate 177 is verified, an FQDN and another merchant identifier 167 and a PSP identifier may be extracted from the received certificate 177 such that it may then be determined whether the identified PSP is authorized to transact on behalf of the identified merchant as well as whether the extracted FQDN is registered to the other extracted merchant identifier at commercial entity subsystem 400 to fully validate the request of step 614. A merchant identifier 167 may be a global merchant identifier for a particular merchant subsystem 200 (e.g., a single merchant identifier 167 may be used to identify a native app merchant online resource and a website merchant online resource of merchant subsystem 200, and/or a single FQDN may be associated with multiple merchant subsystems (e.g., an FQDN of a PSP may be used by multiple merchant subsystems)). An FQDN and at least one other identifier, such as a unique identifier of a specific merchant subsystem 200 and/or of a specific PSP subsystem 310, may both be extracted from a certificate 177 and confirmed that those two are already associated with each other at commercial entity subsystem 400 (e.g., in table 430), as may have been done at step 606. After any suitable validation of received challenge request data 664 by commercial entity subsystem 400 (e.g., after verification of received certificate 177 and/or validation of an FQDN of received certificate 177 and/or confirmation of authorized relationship between an identified PSP and an identified merchant of received certificate 177), commercial entity subsystem 400 may also be operative, at step 616, to generate any suitable validation data and to store that validation data against any suitable identifier data of the received challenge request data 664. For example, after any suitable validation of received challenge request data 664 at step 616, commercial entity subsystem 400 may also be operative at step 616 to generate any suitable validation data (e.g., any suitable random data via entropy and/or any suitable cryptographic nonce (e.g., similar to validation data of step 622 described above)) and a validation session identifier (e.g., any suitable alphanumeric string or any other suitable identifier that may uniquely identify the current online resource validation session to commercial entity subsystem 400 (e.g., as may be generated by device 100 at step 612 or by merchant subsystem 200 or PSP subsystem 310 at step 614 or by commercial entity subsystem 400 at step 616)), and then commercial entity subsystem 400 may store that validation data against one or both of the validation session identifier and a merchant identifier of challenge request data 664 in any suitable data structure (e.g., in table 430 or otherwise) accessible to commercial entity subsystem 400 at step 616. Therefore, in certain embodiments, a validation session identifier may be generated by commercial entity subsystem 400 such that commercial entity subsystem 400 may ensure that the validation session identifier is unique to a particular validation process being carried out by commercial entity subsystem 400, at least with respect to a particular merchant identifier. However, if a validation session identifier is generated by merchant subsystem 200 or PSP subsystem 310, commercial entity subsystem 400 may confirm that such a validation session identifier is unique to a merchant identifier of the validation session prior to enabling that validation session identifier to be used for that particular validation session. Otherwise, commercial entity subsystem 400 may reject the validation session identifier and request a new one be generated by merchant subsystem 200 or PSP subsystem 310. Such a stored link or association between such validation data and identifier data of the validation session (e.g., the validation session identifier and/or a merchant identifier of challenge request data 664) may be later used by commercial entity subsystem 400 to further secure the secure data transaction to be carried out (e.g., at step 630). Moreover, in some embodiments, any or all of the potential transaction identification information of challenge request data 664 may also be stored against or otherwise associated with the validation data and identifier data at step 616.

In any one of the first, second, and third merchant-configurations, after such a step 616, steps 618, 620, and 622 may be skipped, as the online resource may be validated in a single set of steps 614 and 616, and process 600 may then include step 624, where commercial entity subsystem 400 may be operative to generate and communicate any suitable validation response data 674. For example, validation response data 674 may be a session object that may include the validation data of step 616 along with any other suitable data, including, but not limited to, the validation session identifier (e.g., the validation session identifier generated at step 616), one or more merchant identifiers (e.g., any or each merchant identifier of challenge request data 664 (e.g., FQDN, other merchant identifier, PSP identifier, etc.) and/or as may otherwise be associated at commercial entity subsystem 400 (e.g., in table 430) with the online resource being validated during the validation session), certificate 177 of challenge request data 664, and/or the like. In some embodiments, as shown in FIG. 6, such validation response data 674 may be communicated from commercial entity subsystem 400 directly to electronic device 100 (e.g., via communications path 65 using any suitable communications protocol), where data identifying electronic device 100 (e.g., device identifier 119) may be associated or otherwise included in validation session initiation data 662 and/or challenge request data 664 or otherwise so that commercial entity subsystem 400 may communicate validation response data 674 to the proper electronic device 100. Alternatively, in some embodiments (not shown), validation response data 674 may be communicated from commercial entity subsystem 400 to electronic device 100 via merchant subsystem 200 (e.g., in the first or second merchant-configurations) and/or via PSP subsystem 310 (e.g., in the third merchant-configuration), whereby merchant subsystem 200 and/or PSP subsystem 310 may receive validation response data 674 from commercial entity subsystem 400 and then pass at least a portion of validation response data 674 on to electronic device 100. The session object of validation response data 674 may be signed by commercial entity subsystem 400 (e.g., in an HTTP header or otherwise) with an access key associated with commercial entity subsystem 400 that may also be accessible to electronic device 100 (e.g., access key 155a, access key 155b, CRS 151k, and/or ISD key 156k of secure element 145 or any key that may be known to a device application (e.g., card management application 103b)), such that device 100 may validate the signature upon receiving the signed validation data to confirm that commercial entity subsystem 400 generated validation response data 674 rather than another entity subsystem that may not be trusted by electronic device 100 and/or to prevent another entity without access to such an access key (e.g., merchant subsystem 200 and/or PSP subsystem 310) from using the signed validation data while still enabling that other entity to receive and forward on such signed validation data to device 100.

In any one of the first, second, and third merchant-configurations, if a user of device 100 is willing and able to select or confirm a particular payment credential for use in funding the potential transaction in response to potential transaction data 660 (e.g., payment request data) received at step 610 and validation response data 674 has been received by electronic device 100 at step 624 (e.g., data that may be indicative of the success of the merchant online resource validation session of steps 612-616), process 600 may proceed to step 625 where process 600 may include, after any session identifier consistency has been identified (e.g., at step 625, mentioned above), receiving intent and authentication by a user of device 100 to utilize a specific credential for carrying out the potential transaction for a particular merchant, product, price, and shipping destination based on potential transaction data 660 (e.g., through user selection of authentication prompt 315 of FIG. 3C). In some embodiments, in addition to or as an alternative to step 625 including session identifier consistency being verified prior to such intent and authentication, step 625 may include domain consistency being verified prior to such intent and authentication. For example, in response to device 100 receiving validation response data 674 at step 624, device 100 may be operative to compare a domain identifier of such validation response data 674 (e.g., an FQDN of validation response data 674) with a domain identifier currently in an address bar of an online resource of device 100. For example, a web kit of device 100 (e.g., online resource application 113) may receive validation response data 674 and relay that validation response data 674 to a pass kit of device 100 (e.g., card management application 103b) along with a domain identifier (e.g., an FQDN) currently being targeted by the web kit. Then, the pass kit may validate the signature (if any) of the received validation response data 674 (e.g., using an access key of device 100), extract a domain identifier (e.g., FQDN) from validation response data 674, and then compare that extracted domain identifier with the domain identifier identified by and provided from the web kit (e.g., the FQDN of the java script currently hosted by the web kit of device 100 (e.g., the FQDN of a merchant online resource in the first and second merchant-configurations and the FQDN of a PSP online resource in the third merchant-configuration)), which may enable device 100 to confirm that response data 674 is associated with the same online resource that is being currently accessed by device 100 (e.g., to avoid a replay attack). After any suitable session identifier consistency and/or any suitable domain identifier consistency has been verified at step 625, intent and authentication may be received at step 625 for a particular payment credential. Then, for each one of the first, second, and third merchant-configurations, steps 626-629 may occur as described above, where any or all suitable portions of validation response data 674 (e.g., session identifier, validation data (e.g., nonce), FQDN, and/or any other suitable merchant identifier or PSP identifier, and/or any other data (e.g., at least a portion of certificate 177)) may be included along with secure device data 677 and transaction data 660 as device transaction data 678.

In any one of the first, second, and third merchant-configurations, commercial entity subsystem 400 may be operative at step 630 to validate the validation data of validation response data 674 that device 100 may have included in device transaction data 678. For example, in response to receiving such device transaction data 678, commercial entity subsystem 400 may be operative to identify at least a portion or all of validation response data 674 from that device transaction data 678 and to confirm that the validation data of that received device transaction data 678 is currently stored at commercial entity subsystem 400, or, more particularly, in some embodiments, to confirm that the validation data of that received device transaction data 678 is currently stored at commercial entity subsystem 400 against a validation session identifier of the received device transaction data 678 and/or against a merchant identifier (e.g., FQDN) of the received device transaction data 678 (e.g., in table 430) at step 630 (e.g., similarly to step 516 of process 500). Such a stored link between the validation data and one or both of the validation session identifier and a merchant identifier may be maintained for only a limited amount of time before the link is automatically cleared, such that electronic device 100 may be limited to a certain duration of time within which it must receive validation response data 674 at step 624 and then send device transaction data 678 at step 628 to commercial entity subsystem 400 for enabling secure device data 677 of device transaction data 678 to be secured by commercial entity subsystem 400 for carrying out the particular secure data transaction with the validated merchant online resource (e.g., commercial entity subsystem 400 may be operative to remove such an association between the validation data and validation session identifier and/or merchant identifier at commercial entity subsystem 400 after a certain period of time (e.g., remove the link from table 430 no more than 10 minutes after the link is created), which may increase the security of the transaction). Additionally or alternatively, a stored link between the validation data and one or both of the validation session identifier and a merchant identifier may also be associated at step 622 with any suitable specific potential transaction identification information that may be made available to commercial entity subsystem 400 by merchant subsystem 200 or PSP subsystem 310 at step 614 (e.g., as a portion of challenge request data 664), such as identification of a specific type of secure data to be shared between device 100 and merchant subsystem 200 or PSP subsystem 310 (e.g., currency and value amount and payment type for a financial transaction, and similar specific potential transaction identification information may also be made available to commercial entity subsystem 400 by electronic device 100 as a portion of the device transaction data 678 of step 628, such that step 630 may also include commercial entity subsystem 400 confirming that the specific potential transaction identification information currently stored against the validation data received at step 614 (e.g., as stored in table 430 at step 616) is at least similar to the specific potential transaction identification information received at step 628.

Next, at step 631, process 600 may include commercial entity subsystem 400 identifying a merchant key (e.g., merchant key 157) associated with the merchant subsystem 200 or PSP subsystem 310 (e.g., the subsystem that may have generated the first CSR for keys at step 606 for the online resource of the validation session). That is, after decrypting at least a portion of device transaction data 678 using suitable access information at step 629 (e.g., after decrypting secure device data 677 to realize device payment credential data 676 and any other information that may have been encrypted in secure device data 677), commercial entity subsystem 400 may then, at step 631, re-encrypt at least a portion of device transaction data 678 (e.g., the token data and/or the crypto data of device payment credential data 676) with an appropriate merchant key 157 of merchant subsystem 200 (e.g., for the first merchant-configuration) or with an appropriate merchant key 157 of PSP subsystem 310 (e.g., for the second and third merchant-configurations) as encrypted merchant credential data 681, where that appropriate merchant key 157 may be identified at commercial entity subsystem 400 using any suitable identifier data of the validation data that may be included in data 678 and using any pre-stored association associated with that identifier data (e.g., in table 430, as may be defined during step 606). For example, encrypted merchant credential data 681 may include at least encrypted device payment credential data 676 from device transaction data 678 as well as any suitable transaction data, such as the purchase amount data or other suitable transaction data from or based on device transaction data 678 and/or potential transaction data 660. Encrypted merchant credential data 681 may be signed by commercial entity subsystem 400 in such a way that, when received by merchant subsystem 200 or PSP subsystem 310, that subsystem may establish commercial entity subsystem 400 as the creator of such encrypted merchant credential data 681 and/or may enable that subsystem to ensure that such encrypted merchant credential data 681 has not been modified after being signed. Such encrypted merchant credential data 681 may be generated at step 631 and then transmitted to device 100 along with any other suitable data as secured transaction data 682 at step 632 (e.g., from server 410 of commercial entity subsystem 400 to communications component 106 of device 100 via path 65 of FIG. 1A).

Steps 631 and 632 may be operative to ensure that credential data transmitted from the commercial entity subsystem 400 as part of secured transaction data 682 of FIG. 1A (e.g., token data and/or crypto data of encrypted merchant credential data 681) may be encrypted in such a way that it cannot be decrypted by a portion of device 100 other than secure element 145. That is, credential data of secured transaction data 682 (e.g., token data and/or crypto data of encrypted merchant credential data 681) may be encrypted with a merchant key (e.g., merchant key 157) that may not be exposed to or otherwise accessible by any portion of device 100, including, in some embodiments, secure element 145. Moreover, credential data of secured transaction data 682 (e.g., token data and/or crypto data of encrypted merchant credential data 681) may be encrypted with a credential key 155a' that may not be exposed to or otherwise accessible by any portion of device 100 outside of secure element 145.

In the first and second merchant-configurations, secured transaction data 682 may then be forwarded on by device 100 to merchant subsystem 200 as secured transaction data 684 (e.g., via communications path 15 or as a contactless proximity-based communication 5) at step 634, or, alternatively, merchant credential data 681 may be communicated to merchant subsystem 200 from commercial entity subsystem 400 without being communicated via device 100 (not shown). One, some, or all portions of potential transaction data 660 may be carried through device 100 and/or commercial entity subsystem 400 to secured transaction data 682 and/or to secured transaction data 684, such that certain identifiers of the potential transaction may be identified by each of the entities during process 600.

Once merchant credential data 681 including payment credential data 675/676 is received by merchant subsystem 200 (e.g., as secured transaction data 684 at step 634), process 600 may also include step 636 at which merchant subsystem 200 may be configured to generate and transmit payment data 686. In the first merchant-configuration, for example, at step 636, merchant subsystem 200 may leverage its known merchant key 157 to at least partially decrypt merchant credential data 681 of secured transaction data 684 such that payment data 686 may include the secured payment credential data of credential SSD 154a encrypted with its credential key 155a' (e.g., data 676) but not with a key that is not available to financial institution subsystem 350, and then such data 686 may be communicated by merchant subsystem 200 to any suitable subsystem (e.g., acquiring bank subsystem 300 and/or PSP subsystem 310). Alternatively, in the second merchant-configuration, for example, at step 636, merchant subsystem 200 may forward re-encrypted merchant credential data 681 of secured transaction data 684 to PSP subsystem 310 as payment data 686, and PSP subsystem 310 may then leverage its known merchant key 157 to at least partially decrypt that re-encrypted merchant credential data 681 of payment data 686. Alternatively, in the third merchant-configuration, secured transaction data 682 may be forwarded on by device 100 to PSP subsystem 310 (e.g., using the PSP online resource that may be currently accessed by device 100), and PSP subsystem 310 may then leverage its known merchant key 157 to at least partially decrypt the re-encrypted merchant credential data 681 of that forwarded secured transaction data. The remainder of process 600 may proceed as described above with respect to steps 638-644, with the appropriate one(s) of merchant subsystem 200 and PSP subsystem 310 communicating data with device 100 pursuant to the applicable merchant-configuration.

Figure 7:
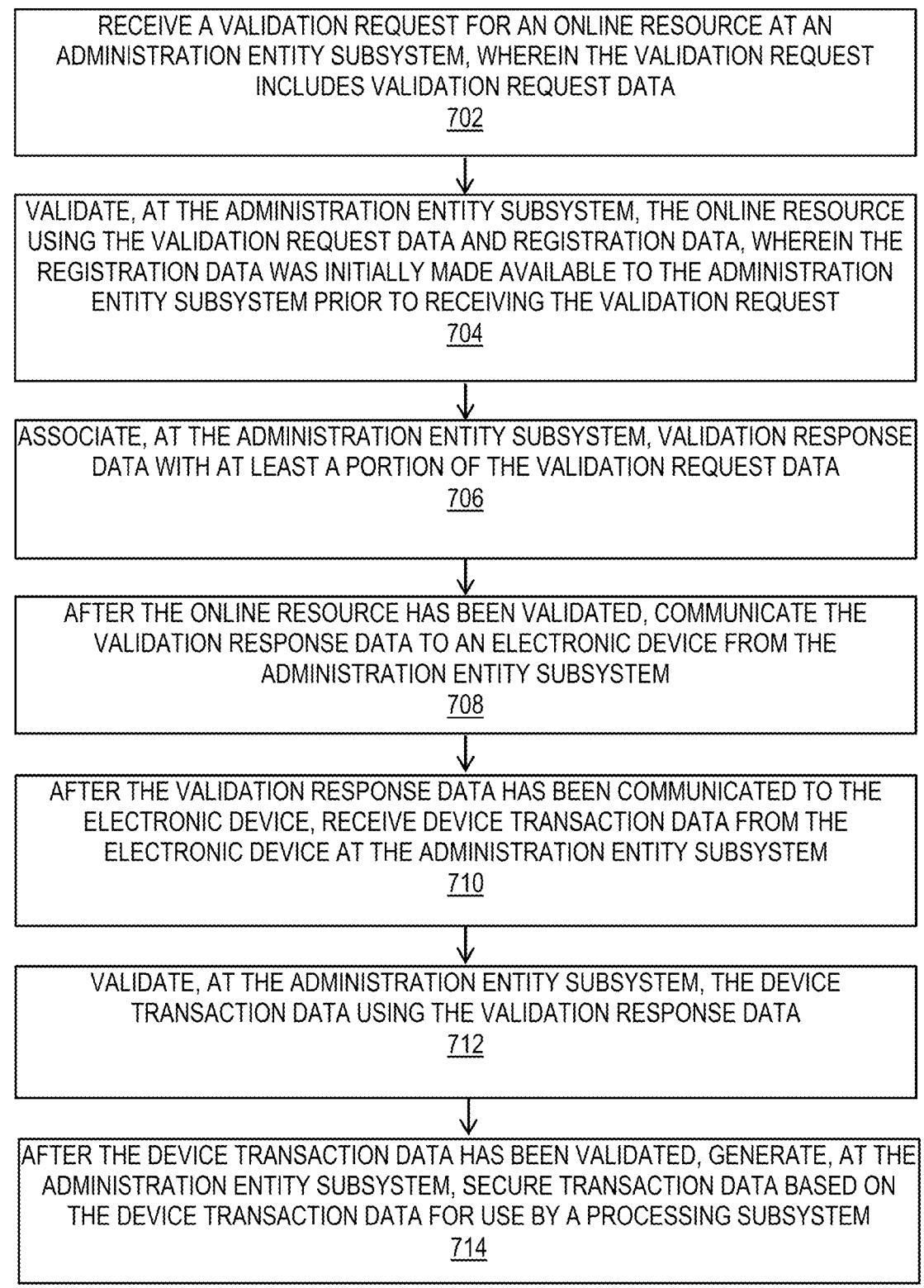

Description of FIG. 7

FIG. 7 is a flowchart of an illustrative process 700 for using an administration entity subsystem to conduct a secure transaction between a processing subsystem and an electronic device communicatively coupled to the processing subsystem via an online resource run on the electronic device. At step 702 of process 700, the administration entity subsystem may receive a validation request for the online resource, wherein the validation request may include validation request data (e.g., commercial entity subsystem 400 may receive challenge request data 664 at step 614 and/or challenge response data 670 at step 620 of process 600). At step 704 of process 700, the administration entity subsystem may validate the online resource using the validation request data and registration data, wherein the registration data may be initially made available to the administration entity subsystem prior to receiving the validation request (e.g., commercial entity subsystem 400 may validate an online resource 113 using challenge request data 664 and registration data from step 606 at step 616 of process 600 and/or using challenge response data 670 and registration data from step 606 at step 622 of process 600). At step 706 of process 700, the administration entity subsystem may associate validation response data with at least a portion of the validation request data (e.g., commercial entity subsystem 400 may associate validation data against identifier data at step 616 and/or at step 622 of process 600). At step 708 of process 700, the administration entity subsystem may communicate the validation response data to the electronic device (e.g., commercial entity subsystem 400 may communicate validation data as a portion of validation response data 674 to electronic device 100 at step 624 of process 600). At step 710 of process 700, the administration entity subsystem may receive device transaction data from the electronic device (e.g., commercial entity subsystem 400 may receive device transaction data 678 from electronic device 100 at step 628 of process 600). At step 712 of process 700, the administration entity subsystem may validate the device transaction data using the validation response data (e.g., commercial entity subsystem 400 may validate validation data of device transaction data 678 at step 630 of process 600 using validation response data 674). At step 714 of process 700, after the device transaction data has been validated, the administration entity subsystem may generate secure transaction data based on the device transaction data for use by the processing subsystem (e.g., commercial entity subsystem 400 may generate merchant credential data 681 based on device transaction data 678 at step 631 of process 600).

It is understood that the steps shown in process 700 of FIG. 7 are only illustrative and that existing steps may be modified or omitted, additional steps may be added, and the order of certain steps may be altered.

Figure 8:
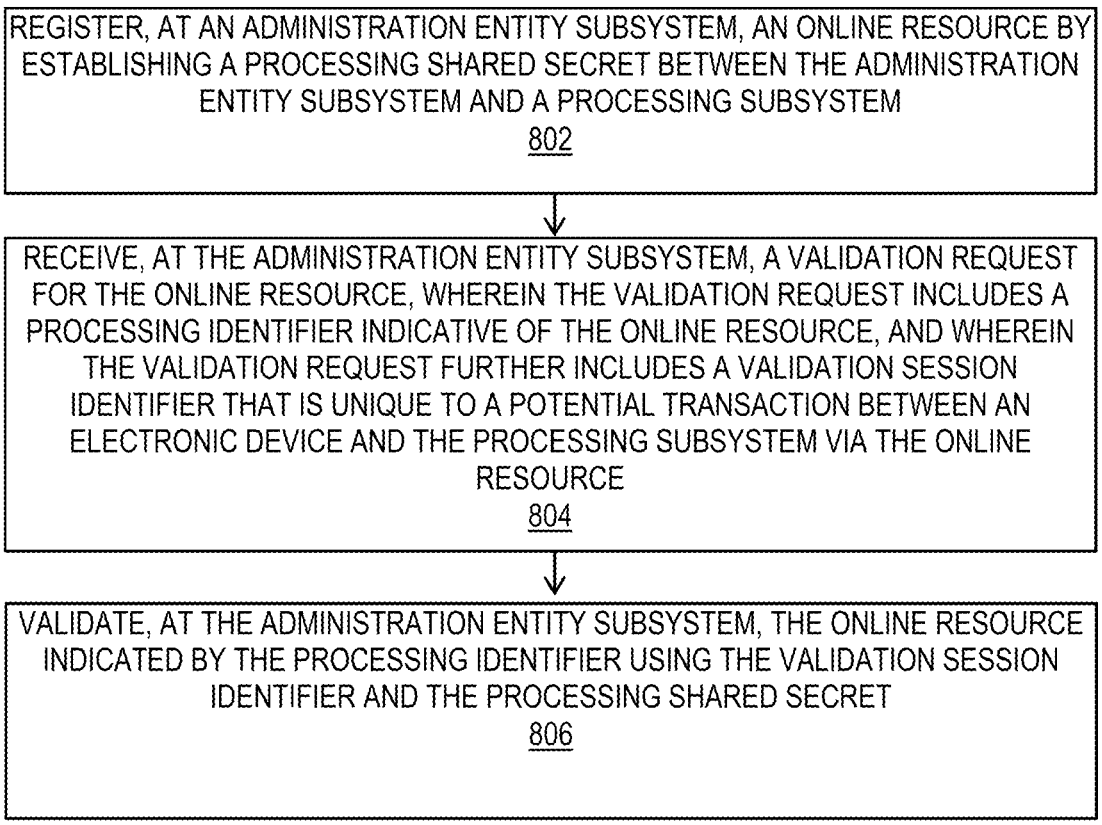

Description of FIG. 8

FIG. 8 is a flowchart of an illustrative process 800 for using an administration entity subsystem to enable a secure transaction between a processing subsystem and an electronic device communicatively coupled to the processing subsystem via an online resource run on the electronic device. At step 802 of process 800, the administration entity subsystem may register the online resource by establishing a processing shared secret between the administration entity subsystem and the processing subsystem (e.g., commercial entity subsystem 400 may register online resource 113 by establishing a shared secret with merchant subsystem 200 at step 606 of process 600). At step 804 of process 800, the administration entity subsystem may receive a validation request for the online resource, wherein the validation request may include a processing identifier indicative of the online resource, and wherein the validation request may further include a validation session identifier that is unique to a potential transaction between the electronic device and the processing subsystem via the online resource (e.g., commercial entity subsystem 400 may receive challenge request data 664 with a merchant identifier and a session identifier at step 614 and/or challenge response data 670 with a merchant identifier and a session identifier at step 620 of process 600). At step 806 of process 800, the administration entity subsystem may validate the online resource indicated by the processing identifier using the validation session identifier and the processing shared secret (e.g., commercial entity subsystem 400 may validate online resource 113 using challenge request data 664 and registration data from step 606 at step 616 of process 600 and/or using challenge response data 670 and registration data from step 606 at step 622 of process 600).

It is understood that the steps shown in process 800 of FIG. 8 are only illustrative and that existing steps may be modified or omitted, additional steps may be added, and the order of certain steps may be altered.

Figure 9:
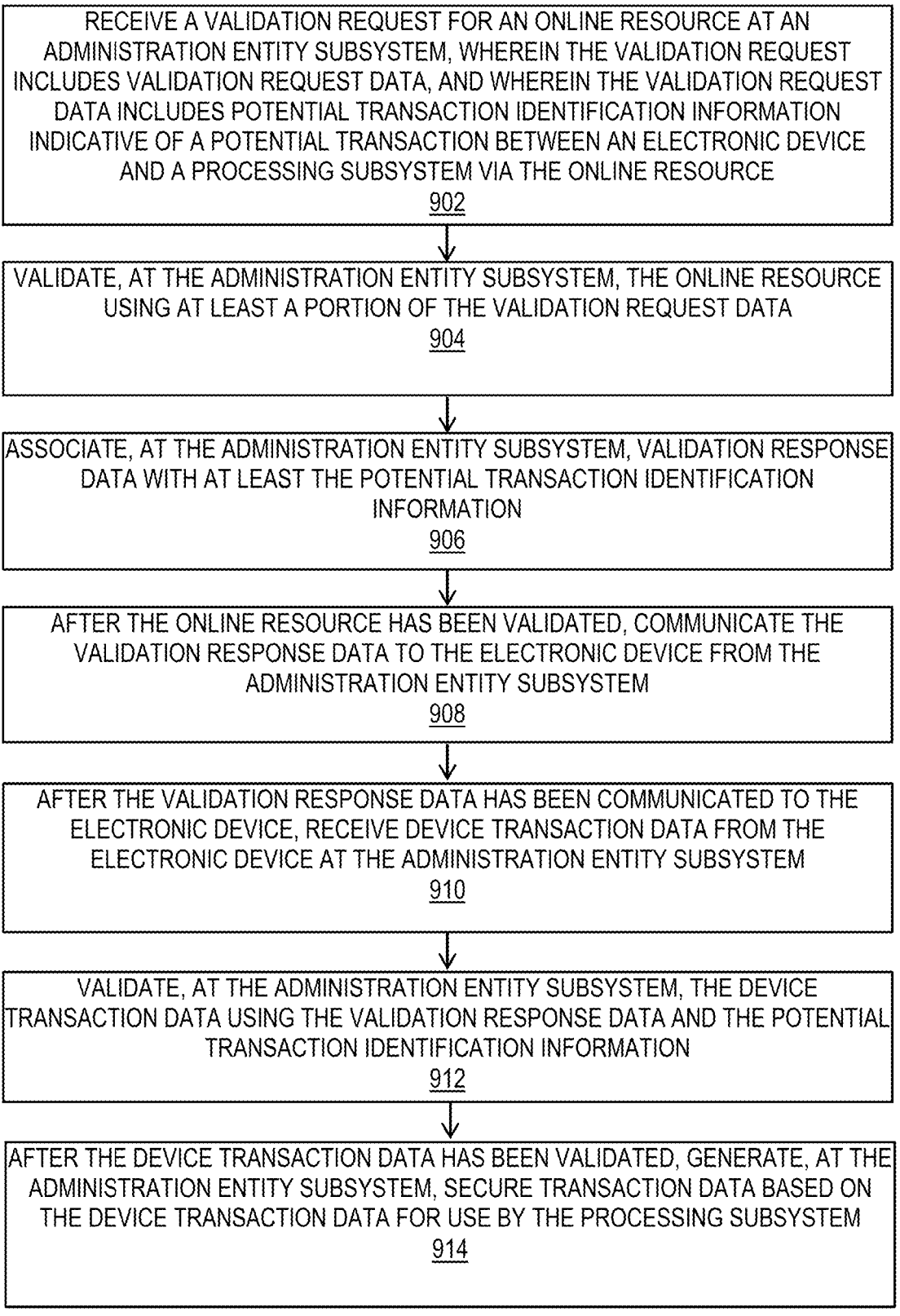

Description of FIG. 9

FIG. 9 is a flowchart of an illustrative process 900 for using an administration entity subsystem to conduct a secure transaction between a processing subsystem and an electronic device communicatively coupled to the processing subsystem via an online resource run on the electronic device. At step 902 of process 900, the administration entity subsystem may receive a validation request for the online resource, wherein the validation request may include validation request data, and wherein the validation request data may include potential transaction identification information indicative of a potential transaction between the electronic device and the processing subsystem via the online resource (e.g., commercial entity subsystem 400 may receive challenge request data 664 at step 614 and/or challenge response data 670 at step 620 of process 600). At step 904 of process 900, the administration entity subsystem may validate the online resource using at least a portion of the validation request data (e.g., commercial entity subsystem 400 may validate an online resource 113 using challenge request data 664 at step 616 of process 600 and/or using challenge response data 670 at step 622 of process 600). At step 906 of process 900, the administration entity subsystem may associate validation response data with at least the potential transaction identification information (e.g., commercial entity subsystem 400 may associate validation data against potential transaction identification information at step 616 and/or at step 622 of process 600). At step 908 of process 900, the administration entity subsystem may communicate the validation response data to the electronic device (e.g., commercial entity subsystem 400 may communicate validation data as a portion of validation response data 674 to electronic device 100 at step 624 of process 600). At step 910 of process 900, the administration entity subsystem may receive device transaction data from the electronic device (e.g., commercial entity subsystem 400 may receive device transaction data 678 from electronic device 100 at step 628 of process 600). At step 912 of process 900, the administration entity subsystem may validate the device transaction data using the validation response data and the potential transaction identification information (e.g., commercial entity subsystem 400 may validate validation data of device transaction data 678 at step 630 of process 600 using validation response data 674 and potential transaction identification information). At step 914 of process 900, after the device transaction data has been validated, the administration entity subsystem may generate secure transaction data based on the device transaction data for use by the processing subsystem (e.g., commercial entity subsystem 400 may generate merchant credential data 681 based on device transaction data 678 at step 631 of process 600).

It is understood that the steps shown in process 900 of FIG. 9 are only illustrative and that existing steps may be modified or omitted, additional steps may be added, and the order of certain steps may be altered.

Further Description of Embodiments

When a credential of a secure element of device 100 is appropriately enabled (e.g., commerce credential data associated with an enabled applet 153*a* of credential SSD 154*a*) so as to be provided as payment credential data of transaction data (e.g., as a contactless proximity-based communication to merchant terminal 220 and/or as an online-based communication to merchant server 210), acquiring bank subsystem 300 may utilize such payment credential data for completing a financial transaction with financial institution subsystem 350. For example, after a user of device 100 has chosen a product for purchase and has appropriately enabled a specific credential of device 100 to be used for payment, merchant subsystem 200 may receive payment credential data indicative of payment credential data for the specific credential. Merchant server 210 and/or merchant terminal 220 may be provided by any suitable merchant or merchant agent of merchant subsystem 200 that may provide a product or service to a user of an end-user electronic device in response to device 100 providing payment credential data. Based on such received payment credential data (e.g., as data 684), merchant subsystem 200 may be configured to generate and transmit data 686 to acquiring bank subsystem 300 (e.g., via communications path 25 between merchant subsystem 200 and acquiring bank subsystem 300), where data 686 may include payment credential data and an authorization request that may be indicative of the device payment credential and the merchant's purchase price for the product or service. Also known as a payment processor or acquirer, acquiring bank subsystem 300 may be a banking partner of the merchant associated with merchant subsystem 200, and acquiring bank subsystem 300 may be configured to work with financial institution subsystem 350 to approve and settle credential transactions attempted to be funded by device 100 with payment credential data. Acquiring bank subsystem 300 may then forward the authorization request from payment data 686 to financial institution subsystem 350 as authorization request data 688 (e.g., via communications path 35 between acquiring bank subsystem 300 and financial institution subsystem 350).

Payment network subsystem 360 and issuing bank subsystem 370 may be a single entity or separate entities. For example, American Express may be both a payment network subsystem 360 and an issuing bank subsystem 370. In contrast, Visa and MasterCard may be payment networks 360, and may work in cooperation with issuing banks 370, such as Chase, Wells Fargo, Bank of America, and the like. Financial institution subsystem 350 may also include one or more acquiring banks, such as acquiring bank subsystem 300. For example, acquiring bank subsystem 300 may be the same entity as issuing bank subsystem 370. One, some, or all components of acquiring bank subsystem 300 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of payment network subsystem 360 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of issuing bank subsystem 370 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. In the case of payment network subsystem 360 and issuing bank subsystem 370 being separate entities, payment network subsystem 360 may receive data 690 from acquiring bank subsystem 300 and may then forward a request to issuing bank subsystem 370 as data 405 (e.g., via a communication path 45 between payment network subsystem 360 and issuing bank subsystem 370). In the case of payment network subsystem 360 and issuing bank subsystem 370 being the same entity, acquiring bank subsystem 300 may submit data 690 directly to issuing bank subsystem 370. Furthermore, payment network subsystem 360 may respond to acquiring bank subsystem 300 on behalf of issuing bank subsystem 370 (e.g., according to conditions agreed upon between payment network subsystem 360 and issuing bank subsystem 370). By interfacing between acquiring bank subsystem 300 and issuing bank subsystem 370, payment network subsystem 360 may reduce the number of entities that each acquiring bank subsystem 300 and each issuing bank subsystem 370 may have to interact with directly. That is, to minimize direct integration points of financial institution subsystem 350, payment network subsystem 360 may act as an aggregator for various issuing banks 370 and/or various acquiring banks 300. Financial institution subsystem 350 may also include one or more acquiring banks, such as acquiring bank subsystem 300. For example, acquiring bank subsystem 300 may be the same entity as issuing bank subsystem 370.

When issuing bank subsystem 370 receives an authorization request (e.g., directly from acquiring bank subsystem 300 as data 688 or indirectly via payment network subsystem 360 as data 405), the payment information (e.g., commerce credential information of device 100) and the purchase amount included in the authorization request may be analyzed to determine if the account associated with the commerce credential has enough credit to cover the purchase amount. If sufficient funds are not present, issuing bank subsystem 370 may decline the requested transaction by transmitting a negative authorization response to acquiring bank subsystem 300. However, if sufficient funds are present, issuing bank subsystem 370 may approve the requested transaction by transmitting a positive authorization response to acquiring bank subsystem 300 and the financial transaction may be completed. Either type of authorization response may be provided by user financial subsystem 350 to acquiring bank subsystem 300 as authorization response data or transaction status data 690 (e.g., transaction status data 690 may be provided directly from issuing bank subsystem 370 to acquiring bank subsystem 300 via communications path 35, or transaction status data 690 may be provided from payment network subsystem 360 to acquiring bank subsystem 300 based on authorization response data or transaction status data 415 that may be provided to payment network subsystem 360 from issuing bank subsystem 370 via communications path 45).

As mentioned, and as shown in FIG. 2, electronic device 100 can include, but is not limited to, a music player (e.g., an iPod™ available by Apple Inc. of Cupertino, California), video player, still image player, game player, other media player, music recorder, movie or video camera or recorder, still camera, other media recorder, radio, medical equipment, domestic or commercial appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, modem, router, printer, or any combination thereof. In some embodiments, electronic device 100 may perform a single function (e.g., a device dedicated to conducting secure data transactions) and, in other embodiments, electronic device 100 may perform multiple functions (e.g., a device that conducts secure data transactions, plays music, and receives and transmits telephone calls). Electronic device 100 may be any portable, mobile, hand-held, or miniature electronic device that may be configured to conduct financial transactions wherever a user travels. Some miniature electronic devices may have a form factor that is smaller than that of hand-held electronic devices, such as an iPod™. Illustrative miniature electronic devices can be integrated into various objects that may include, but are not limited to, watches (e.g., an Apple Watch™ by Apple Inc.), rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated on one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., one or more subsystems or other components of system 1) using any suitable communications protocol. For example, communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be referred to as an online communications component when operative to communicate any suitable data to any remote server or other suitable entity (e.g., to any suitable internet connection). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, haptic output components (e.g., rumblers, vibrators, etc.), or combinations thereof.

As a specific example, electronic device 100 may include a display output component as output component 112. Such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103, an application 113, and/or an application 143. Each application 103/113/143 may include, but is not limited to, one or more operating system applications, firmware applications, media playback applications, media editing applications, NFC low power mode applications, biometric feature-processing applications, or any other suitable applications. For example, processor 102 may load application 103/113/143 as a user interface program to determine how instructions or data received via an input component 110 or other component of device 100 may manipulate the way in which information may be stored and/or provided to the user via an output component 112. Application 103/113/143 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contactless proximity-based transactions or communications between electronic device 100 and merchant subsystem 200 (e.g., merchant payment terminal 220). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, NFC component 120 may allow for close range communication at relatively high data rates (e.g., 370 Mbps), and may comply with any suitable standards, such as the TransferJet™ protocol. Communication between NFC component 120 and merchant subsystem 200 may occur within any suitable close range distance between the NFC component and merchant subsystem 200 (see, e.g., distance D of FIGS. 1 and 1A between NFC component 120 and merchant payment terminal 220), such as a range of approximately 2 to 4 centimeters, and may operate at any suitable frequency (e.g., 13.56 MHz). For example, such close range communication of an NFC component may take place via magnetic field induction, which may allow the NFC component to communicate with other NFC devices and/or to retrieve information from tags having radio frequency identification ("RFID") circuitry. Such an NFC component may provide a manner of acquiring merchandise information, transferring payment information, and otherwise communicating with an external device (e.g., communicating between NFC component 120 and merchant terminal 220).

NFC component 120 may include any suitable modules for enabling contactless proximity-based communication between electronic device 100 and merchant subsystem 200. As shown in FIG. 2, for example, NFC component 120 may include an NFC device module 130, an NFC controller module 140, and an NFC memory module 150.

NFC device module 130 may include an NFC data module 132, an NFC antenna 134, and an NFC booster 136. NFC data module 132 may be configured to contain, route, or otherwise provide any suitable data that may be transmitted by NFC component 120 to merchant subsystem 200 as part of a contactless proximity-based or NFC communication 5. Additionally or alternatively, NFC data module 132 may be configured to contain, route, or otherwise receive any suitable data that may be received by NFC component 120 from merchant subsystem 200 as part of a contactless proximity-based communication (e.g., communication 5 between NFC component 120 and merchant terminal 220).

NFC transceiver or NFC antenna 134 may be any suitable antenna or other suitable transceiver circuitry that may generally enable communication of communication from NFC data module 132 to merchant subsystem 200 and/or to NFC data module 132 from subsystem 200. Therefore, NFC antenna 134 (e.g., a loop antenna) may be provided specifically for enabling the contactless proximity-based communication capabilities of NFC component 120.

Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi, Bluetooth™, cellular, or GPS communication between electronic device 100 and another remote entity, while NFC component 120 may leverage antenna 116 to enable contactless proximity-based or NFC communication between NFC data module 132 of NFC device module 130 and another entity (e.g., merchant subsystem 200). In such embodiments, NFC device module 130 may include NFC booster 136, which may be configured to provide appropriate signal amplification for data of NFC component 120 (e.g., data within NFC data module 132) so that such data may be appropriately transmitted by shared antenna 116 as communication to subsystem 200. For example, shared antenna 116 may require amplification from booster 136 before antenna 116 (e.g., a non-loop antenna) may be properly enabled for communicating contactless proximity-based or NFC communication between electronic device 100 and merchant subsystem 200 (e.g., more power may be needed to transmit NFC data using antenna 116 than may be needed to transmit other types of data using antenna 116).

NFC controller module 140 may include at least one NFC processor module 142. NFC processor module 142 may operate in conjunction with NFC device module 130 to enable, activate, allow, and/or otherwise control NFC component 120 for communicating an NFC communication between electronic device 100 and merchant subsystem 200. NFC processor module 142 may exist as a separate component, may be integrated into another chipset, or may be integrated with processor 102, for example, as part of a system on a chip ("SoC"). As shown in FIG. 2, NFC processor module 142 of NFC controller module 140 may be used to run one or more applications, such as an NFC low power mode or wallet application 143 that may help dictate the function of NFC component 120. Application 143 may include, but is not limited to, one or more operating system applications, firmware applications, NFC low power applications, or any other suitable applications that may be accessible to NFC component 120 (e.g., application 103/113). NFC controller module 140 may include one or more protocols, such as the Near Field Communication Interface and Protocols ("NFCIP-1"), for communicating with another NFC device (e.g., merchant subsystem 200). The protocols may be used to adapt the communication speed and to designate one of the connected devices as the initiator device that controls the near field communication.

NFC controller module 140 may control the near field communication mode of NFC component 120. For example, NFC processor module 142 may be configured to switch NFC device module 130 between a reader/writer mode for reading information (e.g., communication 5) from NFC tags (e.g., from merchant subsystem 200) to NFC data module 132, a peer-to-peer mode for exchanging data (e.g., communication 5) with another NFC enabled device (e.g., merchant subsystem 200), and a card emulation mode for allowing another NFC enabled device (e.g., merchant subsystem 200) to read information (e.g., communication 5) from NFC data module 132. NFC controller module 140 also may be configured to switch NFC component 120 between active and passive modes. For example, NFC processor module 142 may be configured to switch NFC device module 130 (e.g., in conjunction with NFC antenna 134 or shared antenna 116) between an active mode where NFC device module 130 may generate its own RF field and a passive mode where NFC device module 130 may use load modulation to transfer data to another device generating an RF field (e.g., merchant subsystem 200). Operation in such a passive mode may prolong the battery life of electronic device 100 compared to operation in such an active mode. The modes of NFC device module 130 may be controlled based on preferences of a user and/or based on preferences of a manufacturer of device 100, which may be defined or otherwise dictated by an application running on device 100 (e.g., application 103 and/or application 143).

NFC memory module 150 may operate in conjunction with NFC device module 130 and/or NFC controller module 140 to allow for NFC communication between electronic device 100 and merchant subsystem 200. NFC memory module 150 may be embedded within NFC device hardware or within an NFC integrated circuit ("IC"). NFC memory module 150 may be tamper resistant and may provide at least a portion of a secure element. For example, NFC memory module 150 may store one or more applications relating to NFC communications (e.g., application 143) that may be accessed by NFC controller module 140. For example, such applications may include financial payment applications, secure access system applications, loyalty card applications, and other applications, which may be encrypted. In some embodiments, NFC controller module 140 and NFC memory module 150 may independently or in combination provide a dedicated microprocessor system that may contain an operating system, memory, application environment, and security protocols intended to be used to store and execute sensitive applications on electronic device 100. NFC controller module 140 and NFC memory module 150 may independently or in combination provide at least a portion of a secure element 145, which may be tamper resistant. For example, such a secure element 145 may be configured to provide a tamper-resistant platform (e.g., as a single or multiple chip secure microcontroller) that may be capable of securely hosting applications and their confidential and cryptographic data (e.g., applet 153 and key 155) in accordance with rules and security requirements that may be set forth by a set of well-identified trusted authorities (e.g., an authority of financial institution subsystem and/or an industry standard, such as GlobalPlatform). NFC memory module 150 may be a portion of memory 104 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems. Secure element 145 may be a highly secure, tamper-resistant hardware component within a chip, which may be used for storing sensitive data or applications on electronic device 100. At least a portion of secure element 145 may be provided in a removable circuit card, such as a universal integrated circuit card ("UICC") or a subscriber identity module ("SIM") card, that may be used in electronic devices 100 compatible within global system for mobile communications ("GSM") networks, universal mobile telecommunications systems ("UMTS") and/or long-term evolution ("LTE") standard networks. Alternatively or additionally, at least a portion of secure element 145 may be provided in an integrated circuit that may be embedded into electronic device 100 during manufacturing of device 100. Alternatively or additionally, at least a portion of secure element 145 may be provided in a peripheral device that can be plugged into, inserted into, or otherwise coupled to electronic device 100, such as a micro secure digital ("SD") memory card.

As shown in FIG. 2, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., commercial entity subsystem 400 and/or financial institution subsystem 350) may store keys and/or other suitable information for creating or otherwise provisioning one or more credentials (e.g., commerce credentials associated with various credit cards, bank cards, gift cards, access cards, transit passes, digital currency (e.g., bitcoin and associated payment networks), etc.) on electronic device 100 (e.g., via communications component 106), for credential content management, and/or for security domain management. A specific supplemental security domain ("SSD") 154 (e.g., SSD 154a) may be associated with a particular TSM and at least one specific commerce credential (e.g., a specific credit card credential or a specific public transit card credential) that may provide specific privileges or payment rights to electronic device 100. For example, a first payment network subsystem 360 (e.g., Visa) may be the TSM for first SSD 154a and applet 153a of first SSD 154a may be associated with a commerce credential managed by that first payment network subsystem 360, while a second payment network subsystem 360 (e.g., MasterCard) may be the TSM for another SSD 154.

Security features may be provided for enabling use of NFC component 120 (e.g., for enabling activation of commerce credentials provisioned on device 100) that may be particularly useful when transmitting confidential payment information, such as credit card information or bank account information of a credential, from electronic device 100 to merchant subsystem 200. Such security features also may include a secure storage area that may have restricted access. For example, user authentication via personal identification number ("PIN") entry or via user interaction with a biometric sensor may need to be provided to access the secure storage area (e.g., for a user to alter a life cycle state of a security domain element of the secure element). In certain embodiments, some or all of the security features may be stored within NFC memory module 150. Further, security information, such as an authentication key, for communicating with subsystem 200 may be stored within NFC memory module 150. In certain embodiments, NFC memory module 150 may include a microcontroller embedded within electronic device 100.

Merchant terminal 220 of merchant subsystem 200 of FIG. 1A may include a reader for detecting, reading, or otherwise receiving an NFC communication from electronic device 100 (e.g., communication 5 when device 100 comes within a certain distance or proximity of merchant terminal 220). Accordingly, it is noted that an NFC communication between such a merchant terminal and electronic device 100 may occur wirelessly and, as such, may not require a clear "line of sight" between the respective devices. As mentioned, NFC device module 130 may be passive or active. When passive, NFC device module 130 may only be activated when within a response range of a suitable reader of such a merchant terminal. For instance, a reader of such a merchant terminal may emit a relatively low-power radio wave field that may be used to power an antenna utilized by NFC device module 130 (e.g., shared antenna 116 or NFC-specific antenna 134) and, thereby, enable that antenna to transmit suitable NFC communication information (e.g., credit card credential information) from NFC data module 132, via antenna 116 or antenna 134, to such a merchant terminal as an NFC communication. When active, NFC device module 130 may incorporate or otherwise have access to a power source local to electronic device 100 (e.g., power supply 108) that may enable shared antenna 116 or NFC-specific antenna 134 to actively transmit NFC communication information (e.g., credit card credential information) from NFC data module 132, via antenna 116 or antenna 134, to merchant terminal 220 as an NFC communication, rather than reflect radio frequency signals, as in the case of a passive NFC device module 130. Merchant terminal 220 may be provided by a merchant of merchant subsystem 200 (e.g., in a store of the merchant for selling products or services directly to the user of device 100 at the store). While NFC component 120 has been described with respect to near field communication, it is to be understood that component 120 may be configured to provide any suitable contactless proximity-based mobile payment or any other suitable type of contactless proximity-based communication between electronic device 100 and such a merchant terminal. For example, NFC component 120 may be configured to provide any suitable short-range communication, such as those involving electromagnetic/electrostatic coupling technologies.

While NFC component 120 has been described with respect to near field communication, it is to be understood that component 120 may be configured to provide any suitable contactless proximity-based mobile payment or any other suitable type of contactless proximity-based communication between electronic device 100 and merchant subsystem 200. For example, NFC component 120 may be configured to provide any suitable short-range communication, such as those involving electromagnetic/electrostatic coupling technologies. Alternatively, in some embodiments, NFC component 120 of device 100 may be configured to include any suitable components for enabling data available to processor 102 or any other part of device 100 to be communicated as any suitable contactless proximity-based communication between NFC component 120 of device 100 and merchant terminal 220 of merchant subsystem 200, but NFC component 120 may or may not include a secure element operative to securely store credential applets for generating secure credential data on device 100 for securely funding a financial transaction like the credential data of process 600.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing). It is to be understood that any device 100 may be provided as a combination of two or more devices working in conjunction with one another (e.g., a cellular telephone and a smart watch communicatively coupled via any suitable proximate communications protocol (e.g., BlueTooth™)).

As mentioned, and as shown in FIG. 3, one specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. Input component 110a may include a button that, when pressed, may cause a "home" screen or menu of a currently running application to be displayed by device 100. Input component 110b may be a button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100. Each one of input components 110a-110e may be a mechanical input component, such as a button supported by a dome switch, a sliding switch, a control pad, a key, a knob, a scroll wheel, or any other suitable form.

An output component 112a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 3, GUI 180 may be configured to display a first screen 190. One or more of user input components 110a-110i may be used to navigate through GUI 180. For example, one user input component 110 may include a scroll wheel that may allow a user to select one or more graphical elements or icons 182 of GUI 180. Icons 182 may also be selected via a touch screen I/O component 114a that may include display output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 182 may represent various layers, windows, screens, templates, elements, and/or other components that may be displayed in some or all of the areas of display component 112a upon selection by the user. Furthermore, selection of a specific icon 182 may lead to a hierarchical navigation process. For example, selection of a specific icon 182 may lead to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon 182 labeled with a "Merchant App" textual indicator 181 (i.e., specific icon 183) is selected, device 100 may launch or otherwise access a specific merchant application and may display screens of a specific user interface that may include one or more tools or features for interacting with device 100 in a specific manner. For each application, screens may be displayed on display output component 112a and may include various user interface elements (e.g., screens 190a-190d of FIGS. 3A-3D). Additionally or alternatively, for each application, various other types of non-visual information may be provided to a user via various other output components 112 of device 100. The operations described with respect to various GUIs 180 may be achieved with a wide variety of graphical elements and visual schemes. Therefore, the described embodiments are not intended to be limited to the precise user interface conventions adopted herein. Rather, embodiments may include a wide variety of user interface styles.

Electronic device 100 also may include various other I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, California I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker.

Electronic device 100 may also include at least one haptic or tactile output component 112c (e.g., a rumbler), a camera and/or scanner input component 110h (e.g., a video or still camera, and/or a bar code scanner or any other suitable scanner that may obtain product identifying information from a code, such as a bar code, a QR code, or the like), and a biometric input component 110i (e.g., a fingerprint reader or other feature recognition sensor, which may operate in conjunction with a feature-processing application that may be accessible to electronic device 100 for authenticating a user). As shown in FIG. 3, at least a portion of biometric input component 110i may be incorporated into or otherwise combined with input component 110a or any other suitable input component 110 of device 100. For example, biometric input component 110i may be a fingerprint reader that may be configured to scan the fingerprint of a user's finger as the user interacts with mechanical input component 110a by pressing input component 110a with that finger. As another example, biometric input component 110i may be a fingerprint reader that may be combined with touch input component 110f of touch screen I/O component 114a, such that biometric input component 110i may be configured to scan the fingerprint of a user's finger as the user interacts with touch screen input component 110f by pressing or sliding along touch screen input component 110f with that finger. Moreover, as mentioned, electronic device 100 may further include NFC component 120, which may be communicatively accessible to subsystem 200 via antenna 116 and/or antenna 134 (not shown in FIG. 3). NFC component 120 may be located at least partially within housing 101, and a mark or symbol 121 can be provided on the exterior of housing 101 that may identify the general location of one or more of the antennas associated with NFC component 120 (e.g., the general location of antenna 116 and/or antenna 134).

One, some, or all of the processes described with respect to FIGS. 1-9 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

FURTHER APPLICATIONS OF DESCRIBED CONCEPTS

While there have been described systems, methods, and computer-readable media for validating online access to secure device functionality, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method for facilitating transactions, the method comprising, by a computing device:
  interfacing with a merchant subsystem to cause the merchant subsystem to issue, to a commercial entity subsystem, a request to validate the merchant subsystem;
  receiving, from the merchant subsystem, transaction data in conjunction with initializing a transaction;
  receiving, from the commercial entity subsystem, first validation data that indicates the commercial entity subsystem has validated the merchant subsystem in response to the request;
  generating a package that includes (i) at least a portion of the transaction data received from the merchant subsystem, (ii) at least a portion of the first validation data received from the commercial entity subsystem, and (iii) secure data gathered at the computing device;
  identifying an encryption key that is accessible to the commercial entity subsystem;
  encrypting the package using the encryption key to produce an encrypted package;
  providing the encrypted package to the commercial entity subsystem;
  receiving encrypted secure data from the commercial entity subsystem in response to the commercial entity subsystem accessing and authenticating at least a portion of the package; and
  providing the encrypted secure data to the merchant subsystem to complete the transaction.

2. The method of claim 1, wherein validating the merchant subsystem comprises the commercial entity subsystem:
  receives, from the merchant subsystem, a challenge request that includes a merchant identifier that is associated with (1) the merchant subsystem, and (2) a merchant online resource of the computing device, wherein the challenge request includes a signature established using a merchant key associated with the merchant subsystem,
  obtains the merchant key based on the merchant identifier, and
  validates the signature using the merchant key.

3. The method of claim 2, wherein, prior to receiving the challenge request, the commercial entity subsystem receives, during a registration process with the merchant subsystem, (1) the merchant identifier, and (2) the merchant key.

4. The method of claim 2, wherein the transaction data includes a validation session identifier:
  established between the computing device and the merchant subsystem in conjunction with initializing the transaction, and
  provided by the merchant subsystem to the commercial entity subsystem in the challenge request.

5. The method of claim 4, wherein the validation session identifier is associated with the merchant key for a threshold amount of time.

6. The method of claim 1, wherein the secure data includes:
  payment credential data to be used in a financial transaction, or
  health data to be used in a health transaction.

7. The method of claim 1, wherein the encrypted secure data is encrypted with a merchant key associated with the merchant subsystem.

8. The method of claim 1, wherein the secure data enables the commercial entity subsystem to validate the computing device.

9. A non-transitory computer readable storage medium configured to store instructions that, when executed by at least one processor included in a computing device, cause the computing device to facilitate transactions, by carrying out steps that include:
  interfacing with a merchant subsystem to cause the merchant subsystem to issue, to a commercial entity subsystem, a request to validate the merchant subsystem;
  receiving, from the merchant subsystem, transaction data in conjunction with initializing a transaction;
  receiving, from the commercial entity subsystem, first validation data that indicates the commercial entity subsystem has validated the merchant subsystem in response to the request;
  generating a package that includes (i) at least a portion of the transaction data received from the merchant subsystem, (ii) at least a portion of the first validation data received from the commercial entity subsystem, and (iii) secure data gathered at the computing device;
  identifying an encryption key that is accessible to the commercial entity subsystem;
  encrypting the package using the encryption key to produce an encrypted package;
  providing the encrypted package to the commercial entity subsystem;
  receiving encrypted secure data from the commercial entity subsystem in response to the commercial entity subsystem accessing and authenticating at least a portion of the package; and
  providing the encrypted secure data to the merchant subsystem to complete the transaction.

10. The non-transitory computer readable storage medium of claim 9, wherein validating the merchant subsystem comprises the commercial entity subsystem:
  receives, from the merchant subsystem, a challenge request that includes a merchant identifier that is associated with (1) the merchant subsystem, and (2) a merchant online resource of the computing device, wherein the challenge request includes a signature established using a merchant key associated with the merchant subsystem,
  obtains the merchant key based on the merchant identifier, and
  validates the signature using the merchant key.

11. The non-transitory computer readable storage medium of claim 10, wherein, prior to receiving the challenge request, the commercial entity subsystem receives, during a registration process with the merchant subsystem, (1) the merchant identifier, and (2) the merchant key.

12. The non-transitory computer readable storage medium of claim 10, wherein the transaction data includes a validation session identifier:
- established between the computing device and the merchant subsystem in conjunction with initializing the transaction, and
- provided by the merchant subsystem to the commercial entity subsystem in the challenge request.

13. The non-transitory computer readable storage medium of claim 12, wherein the validation session identifier is associated with the merchant key for a threshold amount of time.

14. The non-transitory computer readable storage medium of claim 9, wherein the secure data includes:
- payment credential data to be used in a financial transaction, or health data to be used in a health transaction.

15. A computing device configured to facilitate transactions, the computing device comprising:
- at least one processor; and
- at least one memory storing instructions that, when executed by the at least one processor, cause the computing device to carry out steps that include:
  - interfacing with a merchant subsystem to cause the merchant subsystem to issue, to a commercial entity subsystem, a request to validate the merchant subsystem;
  - receiving, from the merchant subsystem, transaction data in conjunction with initializing a transaction;
  - receiving, from the commercial entity subsystem, first validation data that indicates the commercial entity subsystem has validated the merchant subsystem in response to the request;
  - generating a package that includes (i) at least a portion of the transaction data received from the merchant subsystem, (ii) at least a portion of the first validation data received from the commercial entity subsystem, and (iii) secure data gathered at the computing device;
  - identifying an encryption key that is accessible to the commercial entity subsystem;
  - encrypting the package using the encryption key to produce an encrypted package;
  - providing the encrypted package to the commercial entity subsystem;
  - receiving encrypted secure data from the commercial entity subsystem in response to the commercial entity subsystem accessing and authenticating at least a portion of the package; and
  - providing the encrypted secure data to the merchant subsystem to complete the transaction.

16. The computing device of claim 15, wherein validating the merchant subsystem comprises the commercial entity subsystem:
- receives, from the merchant subsystem, a challenge request that includes a merchant identifier that is associated with (1) the merchant subsystem, and (2) a merchant online resource of the computing device, wherein the challenge request includes a signature established using a merchant key associated with the merchant subsystem,
- obtains the merchant key based on the merchant identifier, and
- validates the signature using the merchant key.

17. The computing device of claim 16, wherein, prior to receiving the challenge request, the commercial entity subsystem receives, during a registration process with the merchant subsystem, (1) the merchant identifier, and (2) the merchant key.

18. The computing device of claim 16, wherein the transaction data includes a validation session identifier:
- established between the computing device and the merchant subsystem in conjunction with initializing the transaction, and
- provided by the merchant subsystem to the commercial entity subsystem in the challenge request.

19. The computing device of claim 18, wherein the validation session identifier is associated with the merchant key for a threshold amount of time.

20. The computing device of claim 15, wherein the secure data includes:
- payment credential data to be used in a financial transaction, or
- health data to be used in a health transaction.

* * * * *